United States Patent
Xu et al.

(10) Patent No.: US 11,647,207 B2
(45) Date of Patent: May 9, 2023

(54) INTER PREDICTION METHOD AND APPARATUS

(71) Applicant: Huawei Technologies Co., Ltd., Guangdong (CN)

(72) Inventors: Weiwei Xu, Hangzhou (CN); Haitao Yang, Shenzhen (CN); Yin Zhao, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/249,189

(22) Filed: Feb. 23, 2021

(65) Prior Publication Data

US 2021/0185328 A1 Jun. 17, 2021

Related U.S. Application Data

(63) Continuation of application No. PCT/CN2019/107060, filed on Sep. 20, 2019.

(30) Foreign Application Priority Data

Sep. 21, 2018 (CN) .......................... 201811109950.2
Oct. 1, 2018 (WO) ................ PCT/CN2018/109233
Nov. 2, 2018 (CN) .......................... 201811303754.9

(51) Int. Cl.
*H04N 19/159* (2014.01)
*H04N 19/176* (2014.01)
*H04N 19/184* (2014.01)

(52) U.S. Cl.
CPC ......... *H04N 19/159* (2014.11); *H04N 19/176* (2014.11); *H04N 19/184* (2014.11)

(58) Field of Classification Search
CPC .. H04N 19/159; H04N 19/176; H04N 19/184; H04N 19/105; H04N 19/117;
(Continued)

(56) References Cited

U.S. PATENT DOCUMENTS

2009/0257492 A1 10/2009 Andersson et al.
2014/0036995 A1 2/2014 Wang et al.
(Continued)

FOREIGN PATENT DOCUMENTS

CN 101087415 A 12/2007
CN 101163249 A 4/2008
(Continued)

OTHER PUBLICATIONS

Xin Guoshan, Research on Enhanced Prediction and Postprocessing of Video Coding, Harbin Institute of Technology, 2012, Issue 05, 2 pages(abstract).
(Continued)

*Primary Examiner* — Nam D Pham
(74) *Attorney, Agent, or Firm* — Womble Bond Dickinson (US) LLP

(57) ABSTRACT

Inter prediction method and apparatus are disclosed to resolve problems in the conventional technology that prediction samples obtained in an inter prediction mode are spatially discontinuous, prediction efficiency is affected, and prediction residual energy is relatively high. The method includes: parsing a bitstream to obtain motion information of a to-be-processed picture block; performing motion compensation on the to-be-processed picture block based on the obtained motion information, to obtain a prediction block of the to-be-processed picture block, where the prediction block of the to-be-processed picture block includes a prediction value of a target sample; and performing weighting calculation on one or more reconstructed values of one or more reference samples and the prediction value of the target sample, to update the prediction value of the target sample, where the reference sample(s) have a preset spatial position relationship with the target sample.

14 Claims, 18 Drawing Sheets

(58) Field of Classification Search
CPC .... H04N 19/174; H04N 19/182; H04N 19/51; H04N 19/70; H04N 19/82; H04N 19/86; H04N 21/2343; H04N 21/4402; H04N 19/13; H04N 19/107; H04N 19/132; H04N 19/52

See application file for complete search history.

(56) References Cited

U.S. PATENT DOCUMENTS

| | | | |
|---|---|---|---|
| 2014/0078250 | A1 | 3/2014 | Zhang et al. |
| 2015/0104116 | A1 | 4/2015 | Salvador et al. |
| 2017/0318306 | A1 | 11/2017 | Sim et al. |
| 2018/0249156 | A1 | 8/2018 | Heo et al. |
| 2020/0021828 | A1* | 1/2020 | Cho ............... H04N 19/44 |
| 2021/0409727 | A1* | 12/2021 | Jang ............... H04N 19/159 |

FOREIGN PATENT DOCUMENTS

| | | |
|---|---|---|
| CN | 101222646 A | 7/2008 |
| CN | 101682781 A | 3/2010 |
| CN | 101877785 A | 11/2010 |
| CN | 102238391 A | 11/2011 |
| CN | 102595124 A | 7/2012 |
| CN | 103220488 A | 7/2013 |
| CN | 103581690 A | 2/2014 |
| CN | 104104961 A | 10/2014 |
| CN | 108141620 A | 6/2018 |
| CN | 108495135 A | 9/2018 |
| JP | 2007503775 A | 2/2007 |
| KR | 20180041211 A | 4/2018 |
| RU | 2595592 C2 | 8/2016 |
| WO | 2008004940 A1 | 1/2008 |
| WO | 2017065509 A2 | 4/2017 |
| WO | 2017075804 A1 | 5/2017 |

OTHER PUBLICATIONS

Jianle Chen et al., Algorithm Description of Joint Exploration Test Model 5 (JEM 5). Joint Video Exploration Team (JVET) of ITU-T SG 16 WP 3 and ISO/IEC JTC 1/SC 29/WG 11, 5th Meeting: Geneva, CH, Jan. 12, 20, 2017, JVET-E1001-v2, 44 pages.

Benjamin Bross et al., Versatile Video Coding (Draft 2). Joint Video Experts Team (JVET) of ITU-T SG 16 WP 3 and ISO/IEC JTC 1/SC 29/WG 11, 11th Meeting: Ljubljana, SI, Jul. 10, 18, 2018, JVET-K1001-v6, 141 pages.

Chao-Hsiung Hung et al., CE9:BIO gradient calculation improvement (Test 9.5.4). Joint Video Exploration Team (JVET) of ITU-T SG 16 WP 3 and ISO/IEC JTC 1/SC 29/WG 11, 11th Meeting: Ljubljana, Slovenia, Jul. 10, 20, 2017, JVET-K0119, 4 pages.

Ching-Yeh Chen et al., CE9.5.2: BIO with simplified gradient calculation, adaptive BIO granularity, and applying BIO to chroma components. Joint Video Experts Team (JVET) of ITU-T SG 16 WP 3 and ISO/IEC JTC 1/SC 29/WG 11, 11th Meeting: Ljubljana, SI, Jul. 10, 18, 2018, JVET-K0255-v1, 5 pages.

Semih Esenlik et al., Non-CE9: DMVR without Intermediate Buffers and with Padding. Joint Video Experts Team (JVET) of ITU-T SG 16 WP 3 and ISO/IEC JTC 1/SC 29/WG 11, 11th Meeting: Ljubljana, SI, Jul. 10, 18, 2018, JVET-K0275-v1, 4 pages.

Kenneth Andersson et al, Combined Intra Inter Prediction Coding Mode, VCEG-AD11, ITU—Telecommunications Standardization Sector Study Group 16 Question 6 Video Coding Experts Group (VCEG), 30th Meeting: Hangzhou, China, Oct. 20-27, 2006, 5 pages.

Xin Jin et al, Combined Inter-Intra Prediction for High Definition Video Coding, 2007, 4 pages.

Man-Shu Chiang, Chih-Wei Hsu Yu-Wen Huang, and Shaw-Min Lei, CE10. 1: Combined and multi-hypothesis prediction, Joint Video Experts Team (JVET) of ITU-T SG 16 WP 3 and ISO/IEC JTC 1/SC 29/WG 11, JVET-K0257-v1, 11th Meeting: Ljubljana, SI, Jul. 2018, pp. 1-6.

Jianle Chen, et al., Algorithm Description of Joint Exploration Test Model 7 (JEM 7), Joint Video Exploration Team (JVET) of ITU-T SG 16 WP3 and ISO/IEC JTC 1/SC 29/WG 11, JVET-G1001-v1, 7th Meeting: Torino, IT, Aug. 2017, pp. 23-28 (Citation showing well-known technology).

Weiwei Xu Biao Wang Haitao Yang Jianle Chen, CE10: Simplification on Combined Inter-Intra Prediction (test 10. 1. 3), Joint Video Experts Team (JVET) of ITU-T SG 16 WP 3 and ISO/IEC JTC 1/SC 29/WG 11, JVET-0290, 13th Meeting: Marrakech, MA, Jan. 2019, pp. 1-4.

* cited by examiner

Original merge candidate predicted motion vector list

| Merge index | List 1 | List 2 |
|---|---|---|
| 0 | mvL0_A, ref0 | - |
| 1 | - | mvL1_B, ref0 |
| 2 | | |
| 3 | | |
| 4 | | |

Merge candidate predicted motion vector list in which a combined candidate predicted motion vector is added

| Merge index | List 1 | List 2 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

Combined

Combined

Original merge candidate predicted motion vector list

| Merge index | List 1 | List 2 |
|---|---|---|
| 0 | mvL0_A, ref0 | - |
| 1 | - | mvL1_A, ref1 |
| 2 | | |
| 3 | | |
| 4 | | |

Merge candidate predicted motion vector list in which a scaled candidate predicted motion vector is added

| Merge index | List 1 | List 2 |
|---|---|---|
| 0 | mvL0_A, ref0 | - |
| 1 | - | mvL1_A, ref1 |
| 2 | mvL0_A, ref0 → | mvL0'_A, ref0' |
| 3 | mvL1'_A, ref1' ← | mvL1_A, ref1 |
| 4 | | |

Original merge candidate predicted motion vector list

| Merge index | List 1 | List 2 |
| --- | --- | --- |
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

Add a zero motion vector

Candidate predicted motion vector list in which the zero motion vector is added

| Merge index | List 1 | List 2 |
| --- | --- | --- |
| 0 | mvL0_A, ref0 | - |
| 1 | - | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

FIG. 12

INTER PREDICTION METHOD AND APPARATUS

CROSS-REFERENCE TO RELATED APPLICATIONS

This application is a continuation of International Application No. PCT/CN2019/107060, filed on Sep. 20, 2019, which claims priority to Chinese Patent Application No. 201811109950.2, filed on Sep. 21, 2018 and Chinese Patent Application No. 201811303754.9, filed on Nov. 2, 2018 and International Application No. PCT/CN2018/109233, filed on Oct. 1, 2018, the disclosures of which are incorporated herein by reference in their entireties.

TECHNICAL FIELD

Embodiments of this application relate to the field of video coding technologies, and in particular, to an inter prediction method and apparatus.

BACKGROUND

Digital video technologies may be widely used in various digital video apparatuses. A digital video apparatus may implement video coding technologies, for example, standards defined in MPEG-2, MPEG-4, ITU-T H.263, ITU-T H.264/MPEG-4 Part 10 advanced video coding (AVC), ITU-T H.265 (also referred to as high efficiency video coding (HEVC)), and video coding technologies described in extensions of these standards. The digital video apparatus sends, receives, encodes, decodes, and/or stores digital video information more effectively by implementing these video coding technologies.

Currently, inter prediction and intra prediction technologies are mainly used in video coding to eliminate temporal redundancy and spatial redundancy in a video. In the inter prediction technology, only a temporal correlation between same objects in adjacent frames of pictures is considered, but a spatial correlation is not considered. Consequently, prediction samples obtained in an existing inter prediction mode are spatially discontinuous. Further, prediction efficiency is affected, and prediction residual energy is relatively high.

SUMMARY

Embodiments of this application provide an inter prediction method and apparatus, to perform spatial filtering on an inter-coded prediction block, and improve coding efficiency.

To achieve the objectives, the following technical solutions are used in the embodiments of this application.

According to a first aspect, an inter prediction method is provided. The method includes: parsing a bitstream to obtain motion information of a to-be-processed picture block; performing motion compensation on the to-be-processed picture block based on the motion information, to obtain a prediction block of the to-be-processed picture block, where the prediction block of the to-be-processed picture block includes a prediction value of a target sample; and performing weighting calculation on one or more reconstructed values of one or more reference samples and the prediction value of the target sample, to update the prediction value of the target sample, where the reference sample has a preset spatial position relationship with the target sample.

Based on this solution, spatial filtering processing is performed on the prediction value of the target sample by using a neighboring reconstructed sample, to improve compression coding efficiency.

In an embodiment, the reference sample(s) include a reconstructed sample that has a same horizontal coordinate as the target sample and has a preset vertical coordinate difference to the target sample, or a reconstructed sample that has a same vertical coordinate as the target sample and has a preset horizontal coordinate difference to the target sample.

Based on this solution, filtering processing is performed on the target sample by using the reference sample that has the preset spatial position relationship with the target sample. In comparison with the conventional technology, coding efficiency is improved.

In an embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \begin{cases} \dfrac{w1 * predP(xP, yP) + w2 * recon(xN - M1, yP) + ((w1 + w2)/2)}{w1 + w2}, & xN > 0, \text{ and } yN = 0 \\[6pt] \dfrac{w3 * predP(xP, yP) + w4 * recon(xP, yN - M2) + ((w3 + w4)/2)}{w3 + w4}, & xN = 0, \text{ and } yN > 0 \\[6pt] \dfrac{w5 * predP(xP, yP) + w6 * recon(xN - M1, yP) + w7 * recon(xP, yN - M2) + ((w5 + w6 + w7)/2)}{w5 + w6 + w7} \\ xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP) and recon(xP,yN−M2) represent reconstructed values of reference samples at coordinate positions (xN−M1,yP) and (xP,yN−M2), respectively, w1, w2, w3, w4, w5, and w6 are preset constants, and M1 and M2 are preset positive integers.

Based on this solution, the updated prediction value of the target sample can be obtained through filtering processing.

In an embodiment, w1+w2=R1, w3+w4=R2, or w5+w6+w7=R3, where R1, R2, and R3 each are 2 raised to the power of n, and n is a non-negative integer.

Based on this solution, coding efficiency can be further improved.

It should be understood that R1, R2, and R3 each are 2 raised to the power of n. R1, R2, and R3 are the same or different, and this is not limited. For example, R1, R2, and R3 may be all 8, or R1, R2, and R3 may be 2, 4, and 16, respectively.

In another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \begin{cases} \dfrac{w1*predP(xP, yP) + w2*recon(xN - M1, yP) + w3*recon(xN - M2, yP) + ((w1 + w2 + w3)/2)}{w1 + w2 + w3}, & xN > 0, \text{ and } yN = 0 \\[2mm] \dfrac{w4*predP(xP, yP) + w5*recon(xP, yN - M3) + w6*recon(xP, yN - M4) + ((w4 + w5 + w6)/2)}{w4 + w5 + w6}, & xN = 0, \text{ and } yN > 0 \\[2mm] \dfrac{\begin{array}{c}w7*predP(xP, yP) + w8*recon(Xn - M1, yP) + w9*recon(xN - M2, yP) + \\ w10*recon(xP, yN - M3) + w11*recon(xP, yN - M4) + \\ ((w7 + w8 + w9 + w10 + w11)/2)\end{array}}{w7 + w8 + w9 + w10 + w11} \\ \quad xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP), recon(xN−M2,yP), recon(xP,yN−M3), and recon(xP,yN−M4) represent reconstructed values of the reference samples at coordinate positions (xN−M1,yP), (xN−M2,yP), (xP,yN−M3), and (xP,yN−M4), respectively, w1, w2, w3, w4, w5, w6, w7, w8, w9, w10, and w11 are preset constants, and M1, M2, M3, and M4 are preset positive integers.

Based on this solution, the updated prediction value of the target sample can be obtained through filtering processing.

In another embodiment, w1+w2+w3=S1, w4+w5+w6=S2, or w7+w8+w9+w10+w11=S3, where S1, S2, and S3 each are 2 raised to the power of n, and n is a non-negative integer.

Based on this solution, coding efficiency can be further improved.

It should be understood that S1, S2, and S3 each are 2 raised to the power of n. S1, S2, and S3 are the same or different, and this is not limited. For example, S1, S2, and S3 may be all 8, or S1, S2, and S3 may be 2, 4, and 16, respectively.

In yet another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \dfrac{w1*predP(xP, yP) + w2*recon(xN - M1, yP) + w3*recon(xP, yN - M2)}{w1 + w2 + w3}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon (xN−M1,yP), and recon(xP,yN−M2) represent reconstructed values of the reference samples at coordinate positions (xN−M1,yP) and (xP,yN−M2), respectively, w1, w2, and w3 are preset constants, and M1 and M2 are preset positive integers.

Based on this solution, the updated prediction value of the target sample can be obtained through filtering processing.

In yet another embodiment, w1+w2+w3=R, where R is 2 raised to the power of n, and n is a non-negative integer.

In still another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \dfrac{\begin{array}{c}w1*predP(xP, yP) + w2*recon(xN - M1, yP) + \\ w3*recon(Xn - M2, yP) + w4*recon(xP, xN - M3) + \\ w5*recon(xP, yN - M4)\end{array}}{w1 + w2 + w3 + w4 + w5}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP), recon(xN−M2,yP), recon(xP,yN−M3), and recon(xP,yN−M4) represent reconstructed values of the reference samples at coordinate positions (xN−M1,yP), (xN−M2,yP), (xP,yN−M3), and (xP,yN−M4), respectively, w1, w2, w3, w4, and w5 are preset constants, and M1, M2, M3, and M4 are preset positive integers.

Based on this solution, the updated prediction value of the target sample can be obtained through filtering processing.

In still another embodiment, w1+w2+w3+w4+w5=S, where S is 2 raised to the power of n, and n is a non-negative integer.

Based on this solution, coding efficiency can be further improved.

In an embodiment, the reference sample(s) include one or more of the following samples: a reconstructed sample that has a same horizontal coordinate as the target sample and that is adjacent to a top side of the to-be-processed picture block, a reconstructed sample that has a same vertical coordinate as the target sample and that is adjacent to a left side of the to-be-processed picture block, a top-right reconstructed sample of the to-be-processed picture block, a bottom-left reconstructed sample of the to-be-processed picture block, or a top-left reconstructed sample of the to-be-processed picture block.

Based on this solution, filtering processing is performed on the target sample by using the reference sample that has the preset spatial position relationship with the target sample. In comparison with the conventional technology, coding efficiency is improved.

In an embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$\mathrm{pred}Q(xP,yP) = (w1*\mathrm{pred}P(xP,yP) + w2*\mathrm{pred}P1(xP,yP) + ((w1+w2)/2))/(w1+w2)$$

where $\mathrm{pred}P1(xP,yP) = (\mathrm{pred}V(xP,yP) + \mathrm{pred}H(xP,yP) + nTbW*nTbH) >> (\mathrm{Log}\ 2(nTbW) + \mathrm{Log}\ 2(nTbH) + 1)$, $\mathrm{pred}V(xP,yP) = ((nTbH-1-yP)*p(xP, -1) + (yP+1)*p(-1, nTbH)) >> \mathrm{Log}\ 2(nTbW)$, $\mathrm{pred}H(xP,yP) = ((nTbW-1-xP)*p(-1, yP) + (xP+1)*p(nTbW, -1)) >> \mathrm{Log}\ 2(nTbH)$, coordinates of the target sample are (xP,yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1, yP), and p(nTbW, −1) represent reconstructed values of the reference samples at coordinate positions (xP, −1), (−1, nTbH), (−1, yP), and (nTbW, −1), respectively, w1 and w2 are preset constants, and nTbW and nTbH represent a width and a height of the to-be-processed picture block.

In an embodiment, the prediction value of the target sample is updated according to the following formula:

$$\mathrm{pred}Q(xP,yP) = (w1*\mathrm{pred}P(xP,yP) + w2*\mathrm{pred}V(xP,yP) + w3*\mathrm{pred}H(xP,yP) + ((w1+w2+w3)/2))/(w1+w2+w3)$$

where $\mathrm{pred}V(xP,yP) = ((nTbH-1-yP)*p(xP, -1) + (yP+1)*p(-1, nTbH) + nTbH/2) >> \mathrm{Log}\ 2(nTbH)$, $\mathrm{pred}H(xP,yP) = ((nTbW-1-xP)*p(-1, yP) + (xP+1)*p(nTbW, -1) + nTbW/2) >> \mathrm{Log}\ 2(nTbW)$, coordinates of the target sample are (xP, yP), coordinates of a top left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−, yP), and p(nTbW, −1) represent reconstructed values of the reference samples at coordinate positions (xP, −1), (−1, nTbH), (−1, yP), and (nTbW, −1), respectively, w1, w2, and w3 are preset constants, and nTbW and nTbH represent a width and a height of the to-be-processed picture block.

In another embodiment, the prediction value of the target sample is updated according to the following formula:

$$\mathrm{pred}Q(xP,yP) = (((w1*\mathrm{pred}P(xP,yP)) << (\mathrm{Log}\ 2(nTbW) + \mathrm{Log}\ 2(nTbH) + 1)) + w2*\mathrm{pred}V(xP,yP) + w3*\mathrm{pred}H(xP,yP) + ((w1+w2+w3)/2) << (\mathrm{Log}\ 2(nTbW) + \mathrm{Log}\ 2(nTbH) + 1)) / ((w1+w2+w3) << (\mathrm{Log}\ 2(nTbW) + \mathrm{Log}\ 2(nTbH) + 1))$$

where $\mathrm{pred}V(xP,yP) = ((nTbH-1-yP)*p(xP, -1) + (yP+1)*p(-1, nTbH)) << \mathrm{Log}\ 2(nTbW)$, $\mathrm{pred}H(xP,yP) = ((nTbW-1-xP)*p(-1, yP) + (xP+1)*p(nTbW, -1)) << \mathrm{Log}\ 2(nTbH)$, coordinates of the target sample are (xP,yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1, yP), and p(nTbW, −1) represent reconstructed values of the reference samples at coordinate positions (xP, −1), (−1, nTbH), (−1, yP), and (nTbW, −1), respectively, w1 and w2 are preset constants, and nTbW and nTbH represent a width and a height of the to-be-processed picture block.

Based on this solution, the updated prediction value of the target sample can be obtained through filtering processing.

In another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$\mathrm{pred}Q(xP,yP) = (w1*\mathrm{pred}P(xP,yP) + w2*\mathrm{pred}P1(xP,yP) + ((w1+w2)/2))/(w1+w2)$$

where $\mathrm{pred}P1(xP,yP) = (\mathrm{pred}V(xP,yP) + \mathrm{pred}H(xP,yP) + 1) >> 1$, $\mathrm{pred}V(xP,yP) = ((nTbH-1-(yP-yN))*\mathrm{recon}(xP,yN-1) + (yP-yN+1)*\mathrm{recon}(xN-1,yN+nTbH) + (nTbH>>1)) >> \mathrm{Log}\ 2(nTbH)$, $\mathrm{pred}H(xP,yP) = ((nTbW-1-(xP-xN))*\mathrm{recon}(xN-1,yP) + (xP-xN+1)*\mathrm{recon}(xN+nTbW,yN-1) + (nTbW>>1)) >> \mathrm{Log}\ 2(nTbW)$, coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP,yN−1), recon(xN−1,yN+nTbH), recon(xN−1,yP), and recon(xN+nTbW,yN−1) represent reconstructed values of the reference samples at coordinate positions (xP,yN−1), (xN−1,yN+nTbH), (xN−1, yP), and (xN+nTbW,yN−1), respectively, w1 and w2 are preset constants, and nTbW and nTbH represent a width and a height of the to-be-processed picture block.

Based on this solution, the updated prediction value of the target sample can be obtained through filtering processing.

In an embodiment, a sum of w1 and w2 is 2 raised to the power of n, and n is a non-negative integer.

Based on this solution, coding efficiency can be further improved.

In yet another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$\mathrm{pred}Q(xP, yP) = clip1Cmp$$
$$\left( \left( \begin{array}{c} \mathrm{refL}(xP, yP)*wL(xP) + \mathrm{refT}(xP, yP)*wT(yP) - \\ p(xN-1, yN-1)*wTL(xP, yP) + \\ (64 - wL(xP) - wT(yP) + wTL(xP, yP))*\mathrm{pred}P(xP, yP) + 32 \end{array} \right) >> 6 \right)$$

where $\mathrm{refL}(xP,yP) = \mathrm{recon}(xN-1,yP)$, $\mathrm{refT}(xP,yP) = \mathrm{recon}(xP,yN-1)$, $wT(yP) = 32 >> (yP<<1) >> nScale$, $wL(xP) = 32 >> ((xP<<1) >> nScale)$, $wTL(xP,yP) = ((wL(xP) >> 4) + (wT(yP) >> 4))$, $nScale = ((\mathrm{Log}\ 2(nTbW) + \mathrm{Log}\ 2(nTbH) - 2) >> 2)$, coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP, yN−1), recon(xN−1,yP), and recon(xN−1,yN−1) represent reconstructed values of reference samples at coordinate positions (xP,yN−1), (xN−1,yP), and (xN−1,yN−1), respectively, nTbW and nTbH represent a width and a height of the to-be-processed picture block, and clip1Cmp represents a clipping operation.

Based on this solution, the updated prediction value of the target sample can be obtained through filtering processing.

In still another embodiment, the updating the prediction value of the target sample includes: performing weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \\ clip1Cmp\left(\left(\frac{refL(xP, yP)*wL(xP) + refT(xP, yP)*wT(yP) +}{(64 - wL(xP) - wT(yP))*predP(xP, yP) + 32}\right) >> 6\right)$$

where refL(xP,yP)=recon(xN−1,yP), refT(xP,yP)=recon(xP,yN−1), wT(yP)=32>>(yP<<1)>>nScale), wL(xP)=32>>((xP<<1)>>nScale), nScale=((Log 2(nTbW)+Log 2(nTbH)−2)>>2), coordinates of the target sample are (xP, yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−1,yP) and recon(xP,yN−1) represent reconstructed values of reference samples at coordinate positions (xN−1,yP) and (xP,yN−1), respectively, nTbW nTbH represent a width and a height of the to-be-processed picture block, and clip1Cmp represents a clipping operation.

Based on this solution, the updated prediction value of the target sample can be obtained through filtering processing.

In an embodiment, the performing weighting calculation on one or more reconstructed values of one or more reference samples and the prediction value of the target sample includes: when the reconstructed value of the reference sample is unavailable, determining, in a preset order, availability of samples adjacent to the top side and the left side of the to-be-processed picture block until a preset quantity of available reference samples are obtained; and performing weighting calculation on a reconstructed value of the available reference sample and the prediction value of the target sample.

Based on this solution, when the reconstructed value of the reference sample is unavailable, the reference samples that are located on the left of and above the to-be-processed picture block and whose reconstructed values are available can be searched for in the preset order. In this way, the prediction value of the target sample can be updated by using the reconstructed values of the available reference samples.

In an embodiment, the determining, in a preset order, availability of samples adjacent to the top side and the left side of the to-be-processed picture block until a preset quantity of available reference samples are obtained includes: obtaining the available reference samples in an order from coordinates (xN−1, yN+nTbH−1) to coordinates (xN−1, yN−1) and then from coordinates (xN, yN−1) to coordinates (xN+nTbW−1, yN−1).

Based on this solution, the reconstructed values of the available reference samples can be obtained.

In an embodiment, when there is at least one available reference sample in all reference samples, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If the reconstructed value of the reference sample (x, y) is unavailable in a set including a reference sample (xN−1, yN+nTbH−M), the reconstructed value of the reference sample (x, y) is set to a reconstructed value of a sample (x, y+1), where M is greater than or equal to 2 and less than or equal to nTbH+1. If the reconstructed value of the reference sample (x, y) is unavailable in a set including a reference sample (xN+N, yN−1), the reconstructed value of the reference sample (x, y) is set to a reconstructed value of a reference sample (x−1, y), where N is greater than or equal to 0 and less than or equal to nTbW−1.

Based on this solution, the reconstructed values of the available reference samples can be obtained.

In an embodiment, if a reconstructed value of a reference sample (xN−1, yN+nTbH−M) is unavailable, an available reference sample may be searched for in the preset order starting from the coordinates (xN−1, yN+nTbH−M), where M is greater than or equal to 1 and less than or equal to nTbH+1. If the available reference sample is B, the reconstructed value of the reference sample (xN−1, yN+nTbH−M) may be set to a reconstructed value of the reference sample B. If a reconstructed value of a reference sample with coordinates (xN+N, yN−1) is unavailable, an available reference sample may be searched for in the preset order starting from the coordinates (xN+N, yN−1), where N is greater than or equal to 0 and less than or equal to nTbW−1. If the available reference sample is C, the reconstructed value of the reference sample (xN+N, yN−1) may be set to a reconstructed value of the reference sample C.

Based on this solution, the reconstructed values of the available reference samples can be obtained.

In another embodiment, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If a reconstructed value of a reference sample (xN−1, yN+nTbH−M) is unavailable, an available reference sample may be searched for, in an order reverse to the preset order, starting from the coordinates (xN−1, yN+nTbH−M), where M is greater than 1 and less than or equal to nTbH+1. If the available reference sample is C, the reconstructed value of the reference sample (xN−1, yN+nTbH−M) may be set to a reconstructed value of the reference sample C. If a reconstructed value of a reference sample with coordinates (xN+N, yN−1) is unavailable, an available reference sample may be searched for, in an order reverse to the preset order, starting from the coordinates (xN+N, yN−1), where N is greater than or equal to 0 and less than or equal to nTbW−1. If the available reference sample is D, the reconstructed value of the reference sample (xN+N, yN−1) may be set to a reconstructed value of the reference sample D.

Based on this solution, the reconstructed values of the available reference samples can be obtained.

In an embodiment, if it is determined that all the samples adjacent to the top side and the left side of the to-be-processed picture block are unavailable, the reconstructed value of the reference sample is set to 1<<(bitDepth−1), where bitDepth represents a bit depth of a sample value of the reference sample.

Based on this solution, the reconstructed value of the reference sample can be set based on the bit depth when both the reconstructed value of the reference sample and a reconstructed value of a new reference sample are unavailable.

In an embodiment, before the performing weighting calculation on one or more reconstructed values of one or more reference samples and the prediction value of the target sample, the method includes: when the reference sample is located above the to-be-processed picture block, performing weighting calculation on the reconstructed value of the reference sample and reconstructed values of a left neighboring sample and a right neighboring sample of the reference sample; when the reference sample is located on the left of the to-be-processed picture block, performing weighting calculation on the reconstructed value of the reference sample and reconstructed values of a top neighboring sample and a bottom neighboring sample of the reference sample; and updating the reconstructed value of the reference sample by using a result of the weighting calculation.

Based on this solution, before filtering processing is performed on the target sample, filtering processing is performed on the reconstructed value of the reference sample. In this way, coding efficiency can be further improved, and a prediction residual can be reduced.

In an embodiment, before the performing motion compensation on the to-be-processed picture block based on the motion information, the method further includes: initially updating the motion information by using a first preset algorithm; and correspondingly, the performing motion compensation on the to-be-processed picture block based on the motion information includes: performing motion compensation on the to-be-processed picture block based on initially updated motion information.

Based on this solution, the motion information is updated before motion compensation is performed on the current block, and motion compensation is performed based on the updated motion information. In this way, a prediction residual can be reduced.

In an embodiment, after the prediction block of the to-be-processed picture block is obtained, the method further includes: pre-updating the prediction block by using a second preset algorithm; and correspondingly, the performing weighting calculation on one or more reconstructed values of one or more reference samples and the prediction value of the target sample includes: performing weighting calculation on the reconstructed value(s) of the reference sample(s) and a pre-updated prediction value of the target sample.

Based on this solution, the prediction block of the current block is pre-updated, and weighting calculation is performed based on the pre-updated prediction value and the reconstructed value of the reference sample. In this way, a prediction residual can be reduced.

In an embodiment, after the performing weighting calculation on one or more reconstructed values of one or more reference samples and the prediction value of the target sample, to update the prediction value of the target sample, the method further includes: updating the prediction value of the target sample by using a second preset algorithm.

Based on this solution, the prediction value that is of the target sample and that has undergone spatial filtering processing can be updated by using a preset algorithm. In this way, a prediction residual can be reduced.

In an embodiment, before the performing weighting calculation on one or more reconstructed values of one or more reference samples and the prediction value of the target sample, the method further includes: parsing the bitstream to obtain a prediction mode corresponding to the to-be-processed picture block; and determining that the prediction mode is a merge mode and/or an inter advanced motion vector prediction (inter AMVP) mode. It may be understood that the inter AMVP mode may also be referred to as an inter motion vector prediction (inter MVP) mode.

Based on this solution, the prediction mode corresponding to the to-be-processed picture block can be determined before filtering processing.

In another embodiment, before the performing weighting calculation on one or more reconstructed values of one or more reference samples and the prediction value of the target sample, the method further includes: parsing the bitstream to obtain update determining indication information of the to-be-processed picture block; and determining that the update determining indication information is used to indicate to update the prediction block of the to-be-processed picture block.

Based on this solution, the update determining indication information of the to-be-processed picture block can be obtained by parsing the bitstream, and it is determined that the prediction block of the to-be-processed picture block is to be updated.

In yet another embodiment, before the performing weighting calculation on one or more reconstructed values of one or more reference samples and the prediction value of the target sample, the method further includes: obtaining preset update determining indication information of the to-be-processed picture block; and determining that the update determining indication information is used to indicate to update the prediction block of the to-be-processed picture block.

Based on this solution, the update determining indication information of the to-be-processed picture block can be obtained, and it is determined, based on the update determining indication information, that the prediction block of the to-be-processed picture block is to be updated.

According to a second aspect, an inter prediction apparatus is provided, including: a parsing module, configured to parse a bitstream to obtain motion information of a to-be-processed picture block; a compensation module, configured to perform motion compensation on the to-be-processed picture block based on the motion information, to obtain a prediction block of the to-be-processed picture block, where the prediction block of the to-be-processed picture block includes a prediction value of a target sample; and a calculation module, configured to perform weighting calculation on one or more reconstructed values of one or more reference samples and the prediction value of the target sample, to update the prediction value of the target sample, where the reference sample has a preset spatial position relationship with the target sample.

In an embodiment, the reference sample(s) include a reconstructed sample that has a same horizontal coordinate as the target sample and has a preset vertical coordinate difference to the target sample, or a reconstructed sample that has a same vertical coordinate as the target sample and has a preset horizontal coordinate difference to the target sample.

In an embodiment, the calculation module is configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \begin{cases} \dfrac{w1*predP(xP, yP) + w2*recon(xN - M1, yP) + ((w1 + w2)/2)}{w1 + w2}, xN > 0, \text{ and } yN = 0 \\ \dfrac{w3*predP(xP, yP) + w4*recon(xP, yN - M2) + ((w3 + w4)/2)}{w3 + w4}, xN = 0, \text{ and } yN > 0 \\ \dfrac{w5*predP(xP, yP) + w6*recon(xN - M1, yP) + w7*recon(xP, yN - M2) + ((w5 + w6 + w7)/2)}{w5 + w6 + w7} \\ xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon (xN–M1,yP) and recon(xP,yN–M2) represent reconstructed values of the reference samples at coordinate positions (xN–M1,yP) and (xP,yN–M2), respectively, w1, w2, w3, w4, w5, and w6 are preset constants, and M1 and M2 are preset positive integers.

In an embodiment, w1+w2=R1, w3+w4=R2, or w5+w6+w7=R3, where R1, R2, and R3 each are 2 raised to the power of n, and n is a non-negative integer.

In another embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \begin{cases} \dfrac{w1*predP(xP, yP) + w2*recon(xN - M1, yP) + w3*recon(xN - M2, yP) + ((w1 + w2 + w3)/2)}{w1 + w2 + w3}, xN > 0, \text{ and } yN = 0 \\ \dfrac{w4*predP(xP, yP) + w5*recon(xP, yN - M3) + w6*recon(xP, yN - M4) + ((w4 + w5 + w6)/2)}{w4 + w5 + w6}, xN = 0, \text{ and } yN > 0 \\ w7*predP(xP, yP) + w8*recon(Xn - M1, yP) + w9*recon(xN - M2, yP) + \\ w10*recon(xP, yN - M3) + w11*recon(xP, yN - M4) + \\ \dfrac{((w7 + w8 + w9 + w10 + w11)/2)}{w7 + w8 + w9 + w10 + w11} \\ xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN–M1,yP), recon(xN–M2,yP), recon(xP,yN–M3), and recon(xP,yN–M4) represent reconstructed values of the reference samples at coordinate positions (xN–M1,yP), (xN–M2,yP), (xP,yN–M3), and (xP,yN–M4), respectively, w1, w2, w3, w4, w5, w6, w7, w8, w9, w10, and w11 are preset constants, and M1, M2, M3, and M4 are preset positive integers.

In another embodiment, w1+w2+w3=S1, w4+w5+w6=S2, or w7+w8+w9+w10+w11=S3, where S1, S2, and S3 each are 2 raised to the power of n, and n is a non-negative integer.

In yet another embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \dfrac{w1*predP(xP, yP) + w2*recon(xN - M1, yP) + w3*recon(xP, yN - M2)}{w1 + w2 + w3}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN–M1,yP) and recon(xP,yN–M2) represent reconstructed values of the reference samples at coordinate positions (xN–M1,yP) and (xP,yN–M2), respectively, w1, w2, and w3 are preset constants, and M1 and M2 are preset positive integers.

In yet another embodiment, w1+w2+w3=R, where R is 2 raised to the power of n, and n is a non-negative integer.

In still another embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \dfrac{\begin{array}{c}w1*predP(xP, yP) + w2*recon(xN - M1, yP) + \\ w3*recon(Xn - M2, yP) + w4*recon(xP, xN - M3) + \\ w5*recon(xP, yN - M4)\end{array}}{w1 + w2 + w3 + w4 + w5}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN–M1,yP), recon(xN–M2,yP), recon(xP,yN–M3), and recon(xP,yN–M4) represent reconstructed values of the reference samples at coordinate positions (xN–M1,yP), (xN–M2,yP), (xP,yN–M3), and (xP,yN–M4), respectively, w1, w2, w3, w4, and w5 are preset constants, and M1, M2, M3, and M4 are preset positive integers.

In still another embodiment, w1+w2+w3+w4+w5=S, where S is 2 raised to the power of n, and n is a non-negative integer.

In an embodiment, the reference sample(s) include one or more of the following samples: a reconstructed sample that has a same horizontal coordinate as the target sample and that is adjacent to a top side of the to-be-processed picture block, a reconstructed sample that has a same vertical coordinate as the target sample and that is adjacent to a left side of the to-be-processed picture block, a top-right reconstructed sample of the to-be-processed picture block, a bottom-left reconstructed sample of the to-be-processed picture block, or a top-left reconstructed sample of the to-be-processed picture block.

In an embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

predQ(xP,yP)=(w1*predP(xP,yP)+w2*predP1(xP,yP)+
    ((w1+w2)/2))/(w1+w2)

where predP1(xP,yP)=(predV(xP,yP)+predH(xP,yP)+nTbW*nTbH)>>(Log 2(nTbW)+Log 2(nTbH)+1), predV(xP,yP)=((nTbH−1−yP)*p(xP, −1)+(yP+1)*p(−1, nTbH))>>Log 2(nTbW), predH(xP,yP)=((nTbW−1−xP)*p(−1,yP)+(xP+1)*p(nTbW, −1))>>Log 2(nTbH), coordinates of the target sample are (xP,yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1, yP), and p(nTbW, −1) represent reconstructed values of the reference samples at coordinate positions (xP, −1), (−1, nTbH), (−1,yP), and (nTbW, −1), respectively, w1 and w2 are preset constants, and nTbW and nTbH represent a width and a height of the to-be-processed picture block.

In an embodiment, the prediction value of the target sample is updated according to the following formula:

predQ(xP,yP)=(w1*predP(xP,yP)+w2*predV(xP,yP)+
    w3*predH(xP,yP)+((w1+w2+w3)/2))/(w1+w2+
    w3)

where predV(xP,yP)=((nTbH−1−yP)*p(xP, −1)+(yP+1)*p(−1, nTbH)+nTbH/2)>>Log 2(nTbH), predH(xP,yP)=((nTbW−1−xP)*p (−1,yP)+(xP+1)*p(nTbW, −1)+nTbW/2)>>Log 2(nTbW), coordinates of the target sample are (xP, yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1,yP), and p(nTbW, −1) represent reconstructed values of the reference samples at coordinate positions (xP, −1), (−1, nTbH), (−1, yP), and (nTbW, −1), respectively, w1, w2, and w3 are preset constants, and nTbW and nTbH represent a width and a height of the to-be-processed picture block.

In an embodiment, the prediction value of the target sample is updated according to the following formula:

predQ(xP,yP)=(((w1*predP(xP,yP))<<(Log 2(nTbW)+
    Log 2(nTbH)+1))+w2*predV(xP,yP)+w3*predH
    (xP,yP)+(((w1+w2+w3)/2)<<(Log 2(nTbW)+Log
    2(nTbH)+1)))/(((w1+w2+w3)<<(Log 2(nTbW)+
    Log 2(nTbH)+1)))

where predV(xP,yP)=((nTbH−1−yP)*p(xP, −1)+(yP+1)*p(−1, nTbH))<<Log 2(nTbW), predH(xP,yP)=((nTbW−1−xP)*p(−1,yP)+(xP+1)*p(nTbW, −1))<<Log 2(nTbH), coordinates of the target sample are (xP,yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1,yP), and p(nTbW, −1) represent reconstructed values of the reference samples at coordinate positions (xP, −1), (−1, nTbH), (−1,yP), and (nTbW, −1), respectively, w1 and w2 are preset constants, and nTbW and nTbH represent a width and a height of the to-be-processed picture block.

In another embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

predQ(xP,yP)=(w1*predP(xP,yP)+w2*predP1(xP,yP)+
    ((w1+w2)/2))/(w1+w2)

where predP1(xP,yP)=(predV(xP,yP)+predH(xP,yP)+1)>>1, predV(xP,yP)=((nTbH−1−(yP−yN))*recon(xP,yN−1))+(yP−yN+1)*recon(xN−1,yN+nTbH)+(nTbH>>1))>>Log 2(nTbH), predH(xP,yP)=((nTbW−1−(xP−xN))*recon(xN−1,yP)+(xP−xN+1))*recon(xN+nTbW,yN−1)+(nTbW>>1))>>Log 2(nTbW), coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP,yN−1), recon(xN−1,yN+nTbH), recon(xN−1,yP), and recon(xN+nTbW,yN−1) represent reconstructed values of the reference samples at coordinate positions (xP,yN−1), (xN−1,yN+nTbH), (xN−1, yP), and (xN+nTbW,yN−1), respectively, w1 and w2 are preset constants, and nTbW and nTbH represent a width and a height of the to-be-processed picture block.

In an embodiment, a sum of w1 and w2 is 2 raised to the power of n, and n is a non-negative integer.

In an embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = clip1Cmp$$

$$\left( \left( \begin{array}{c} refL(xP, yP) * wL(xP) + refT(xP, yP) * wT(yP) - \\ p(xN-1, yN-1) * wTL(xP, yP) + \\ (64 - wL(xP) - wT(yP) + wTL(xP, yP)) * predP(xP, yP) + 32 \end{array} \right) >> 6 \right)$$

where refL(xP,yP)=recon(xN−1,yP), refT(xP,yP)=recon(xP,yN−1),wT(yP)=32>>(yP<<1)>>nScale), wL(xP)=32>>((xP<<1)>>nScale), wTL(xP,yP)=((wL(xP)>>4)+(wT(yP)>>4)), nScale=((Log 2(nTbW)+Log 2(nTbH)−2)>>2), coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP, yN−1), recon(xN−1,yP), and recon(xN−1,yN−1) represent reconstructed values of the reference samples at coordinate positions (xP,yN−1), (xN−1,yP), and (xN−1,yN−1), respectively, nTbW and nTbH represent a width and a height of the to-be-processed picture block, and clip1Cmp represents a clipping operation.

In an embodiment, the calculation module is further configured to perform weighting calculation based on the prediction value of the target sample before the updating and the reconstructed value of the reference sample, to obtain an updated prediction value of the target sample, where the updated prediction value of the target sample is obtained according to the following formula:

$$predQ(xP, yP) = \\ clip1Cmp\left(\left(\frac{refL(xP, yP) * wL(xP) + refT(xP, yP) * wT(yP) +}{(64 - wL(xP) - wT(yP)) * predP(xP, yP) + 32}\right) >> 6\right)$$

where refL(xP,yP)=recon(xN−1,yP), refT(xP,yP)=recon(xP,yN−1), wT(yP)=32>>(yP<<1)>>nScale), wL(xP)=32>>((xP<<1)>>nScale), nScale=((Log 2(nTbW)+Log 2(nTbH)−2)>>2), coordinates of the target sample are (xP, yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−1,yN−1) and recon(xP,yN−1) represent reconstructed values of the reference samples at coordinate positions (xN−1,yP) and (xP,yN−1), respectively, nTbW and nTbH represent a width and a height of the to-be-processed picture block, and clip1Cmp represents a clipping operation.

In an embodiment, the calculation module is further configured to: when the reconstructed value of the reference sample is unavailable, determine, in a preset order, availability of samples adjacent to the top side and the left side of the to-be-processed picture block until a preset quantity of available reference samples are obtained; and perform weighting calculation on a reconstructed value of the available reference sample and the prediction value of the target sample.

In an embodiment, the calculation module is configured to obtain the reconstructed value of the available reference sample in an order from coordinates (xN−1, yN+nTbH−1) to coordinates (xN−1, yN−1) and then from coordinates (xN, yN−1) to coordinates (xN+nTbW−1, yN−1).

In an embodiment, when there is at least one available reference sample in all reference samples, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If the reconstructed value of the reference sample (x, y) is unavailable in a set including a reference sample (xN−1, yN+nTbH−M), the reconstructed value of the reference sample (x, y) is set to a reconstructed value of a sample (x, y+1), where M is greater than or equal to 2 and less than or equal to nTbH+1. If the reconstructed value of the reference sample (x, y) is unavailable in a set including a reference sample (xN+N, yN−1), the reconstructed value of the reference sample (x, y) is set to a reconstructed value of a reference sample (x−1, y), where N is greater than or equal to 0 and less than or equal to nTbW−1.

In an embodiment, the calculation module is configured to: if a reconstructed value of a reference sample (xN−1, yN+nTbH−M) is unavailable, search for an available reference sample in the preset order starting from the coordinates (xN−1, yN+nTbH−M), where M is greater than or equal to 1 and less than or equal to nTbH+1. If the available reference sample is B, the reconstructed value of the reference sample (xN−1, yN+nTbH−M) may be set to a reconstructed value of the reference sample B. If a reconstructed value of a reference sample with coordinates (xN+N, yN−1) is unavailable, an available reference sample may be searched for in the preset order starting from the coordinates (xN+N, yN−1), where N is greater than or equal to 0 and less than or equal to nTbW−1. If the available reference sample is C, the reconstructed value of the reference sample (xN+N, yN−1) may be set to a reconstructed value of the reference sample C.

In an embodiment, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If a reconstructed value of a reference sample (xN−1, yN+nTbH−M) is unavailable, an available reference sample may be searched for, in an order reverse to the preset order, starting from the coordinates (xN−1, yN+nTbH−M), where M is greater than 1 and less than or equal to nTbH+1. If the available reference sample is C, the reconstructed value of the reference sample (xN−1, yN+nTbH−M) may be set to a reconstructed value of the reference sample C. If a reconstructed value of a reference sample with coordinates (xN+N, yN−1) is unavailable, an available reference sample may be searched for, in an order reverse to the preset order, starting from the coordinates (xN+N, yN−1), where N is greater than or equal to 0 and less than or equal to nTbW−1. If the available reference sample is D, the reconstructed value of the reference sample (xN+N, yN−1) may be set to a reconstructed value of the reference sample D.

In an embodiment, if it is determined that all the samples adjacent to the top side and the left side of the to-be-processed picture block are unavailable, the reconstructed value of the reference sample is set to 1<<(bitDepth−1), where bitDepth represents a bit depth of a sample value of the reference sample.

In an embodiment, the calculation module is further configured to: when the reference sample is located above the to-be-processed picture block, perform weighting calculation on the reconstructed value of the reference sample and reconstructed values of a left neighboring sample and a right neighboring sample of the reference sample; when the reference sample is located on the left of the to-be-processed picture block, perform weighting calculation on the reconstructed value of the reference sample and reconstructed values of a top neighboring sample and a bottom neighboring sample of the reference sample; and update the reconstructed value of the reference sample by using a result of the weighting calculation.

In an embodiment, the calculation module is further configured to initially update the motion information by using a first preset algorithm; and correspondingly, the compensation module is configured to perform motion compensation on the to-be-processed picture block based on initially updated motion information.

In an embodiment, the calculation module is further configured to pre-update the prediction block by using a second preset algorithm; and correspondingly, the calculation module is configured to perform weighting calculation on the reconstructed value(s) of the reference sample(s) and a pre-updated prediction value of the target sample.

In an embodiment, the calculation module is further configured to update the prediction value of the target sample by using a second preset algorithm.

In an embodiment, the parsing module is further configured to: parse the bitstream to obtain a prediction mode corresponding to the to-be-processed picture block; and determine that the prediction mode is a merge mode and/or an inter advanced motion vector prediction (inter AMVP) mode. It may be understood that the inter AMVP mode may also be referred to as an inter motion vector prediction (inter MVP) mode.

In an embodiment, the parsing module is further configured to: parse the bitstream to obtain update determining indication information of the to-be-processed picture block; and determine that the update determining indication information is used to indicate to update the prediction block of the to-be-processed picture block.

In an embodiment, the calculation module is further configured to: obtain preset update determining indication information of the to-be-processed picture block; and determine that the update determining indication information is used to indicate to update the prediction block of the to-be-processed picture block.

According to a third aspect of this application, a motion information prediction device is provided, including a processor and a memory that is coupled to the processor. The processor is configured to perform the method according to the first aspect.

According to a fourth aspect of this application, a computer-readable storage medium is provided. The computer-readable storage medium stores an instruction. When the instruction is run on a computer, the computer is enabled to perform the method according to the first aspect.

According to a fifth aspect of this application, a computer program product including an instruction is provided. When the instruction is run on a computer, the computer is enabled to perform the method according to the first aspect.

It should be understood that technical solutions in the second to the fifth aspects of this application are consistent with those in the first aspect of this application. Beneficial effects achieved in all the aspects and the corresponding embodiments of all the aspects are similar. Therefore, details are not described again.

BRIEF DESCRIPTION OF DRAWINGS

FIG. 12 is a schematic diagram of an example process of adding a zero motion vector to a merge-mode candidate predicted motion vector list;

DESCRIPTION OF EMBODIMENTS

The following clearly describes the technical solutions in the embodiments of this application with reference to the accompanying drawings in the embodiments of this application.

Figure 1:
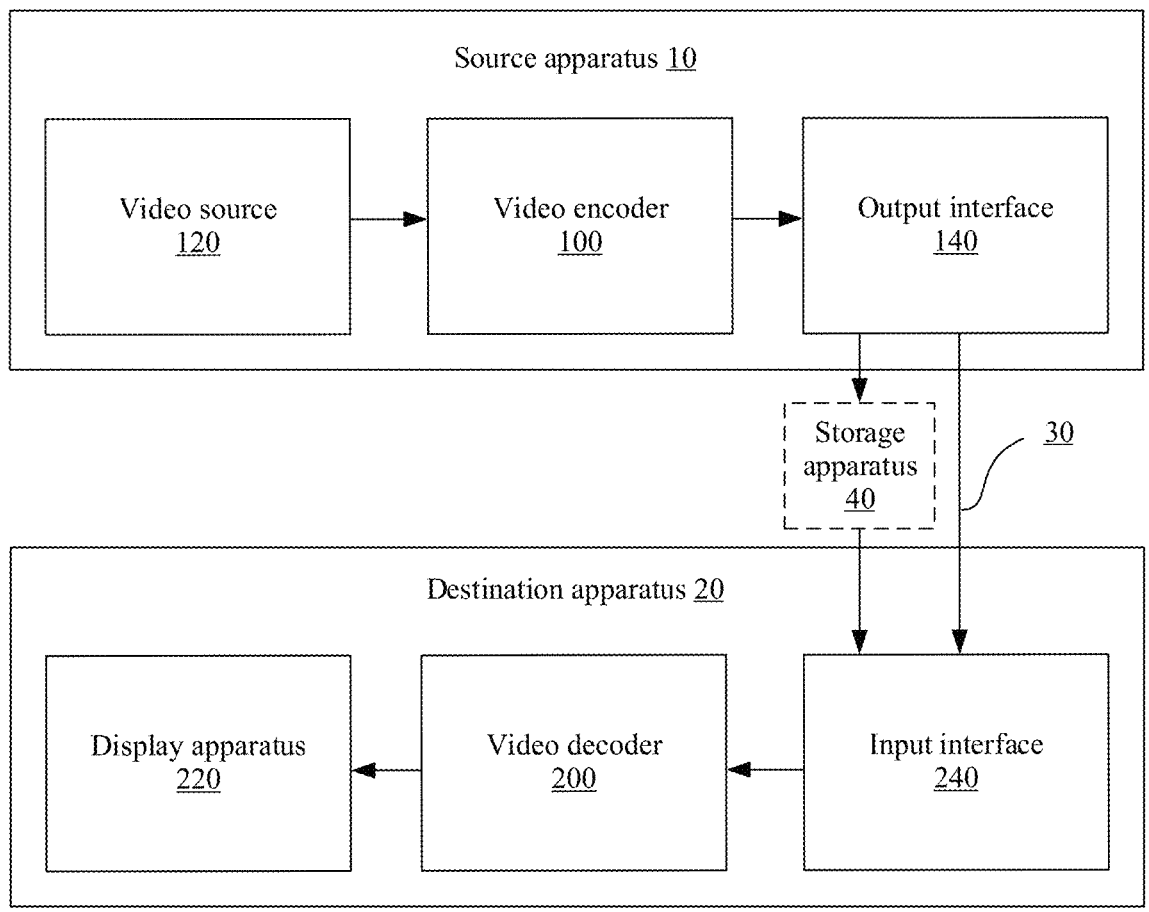
FIG. 1 is a block diagram of an example of a video coding system according to an embodiment.

FIG. 1 is a block diagram of an example of a video coding system according to an embodiment. As described herein, the term "video coder" usually refers to both a video encoder and a video decoder. In this application, the term "video coding" or "coding" may usually refer to video encoding or video decoding. A video encoder 100 and a video decoder 200 in the video coding system are configured to predict motion information, for example, a motion vector, of a current coded picture block or a subblock of a current coded picture block according to various method examples described based on any one of a plurality of new inter prediction modes provided in this application, so that the predicted motion vector approximates, to a greatest extent, to a motion vector obtained by using a motion estimation method, and a motion vector difference does not need to be transmitted during coding. Further, this improves coding performance.

As shown in FIG. 1, the video coding system includes a source apparatus 10 and a destination apparatus 20. The source apparatus 10 generates encoded video data. Therefore, the source apparatus 10 may be referred to as a video encoding apparatus. The destination apparatus 20 may decode the encoded video data generated by the source apparatus 10. Therefore, the destination apparatus 20 may be referred to as a video decoding apparatus. In various embodiments, the source apparatus 10, the destination apparatus 20, or both the source apparatus 10 and the destination apparatus 20 may include one or more processors and a memory coupled to the processor(s). The memory may include but is not limited to a random access memory (RAM), a read-only memory (ROM), an electrically erasable programmable read-only memory (EEPROM), a flash memory, or any other medium that can be used to store required program code in a form of an instruction or a data structure and that can be accessed by a computer, as described herein.

The source apparatus 10 and the destination apparatus 20 may include various apparatuses, including a desktop computer, a mobile computing apparatus, a notebook (for example, laptop) computer, a tablet computer, a set top box, a handheld telephone set, such as a smart phone, a television set, a camera, a display apparatus, a digital media player, a video game console, an in-vehicle computer, or the like.

The destination apparatus 20 may receive the encoded video data from the source apparatus 10 over a link 30. The link 30 may include one or more media or apparatuses that can transfer the encoded video data from the source apparatus 10 to the destination apparatus 20. In an embodiment, the link 30 may include one or more communications media that enable the source apparatus 10 to directly transmit the encoded video data to the destination apparatus 20 in real time. In this embodiment, the source apparatus 10 may modulate the encoded video data according to a communications standard (for example, a wireless communications protocol), and may transmit modulated video data to the destination apparatus 20. The communications media may include a wireless and/or wired communications medium, for example, a radio frequency (RF) spectrum or one or more physical transmission lines. The communications media may constitute a part of a packet-based network, and the packet-based network is, for example, a local area network, a wide area network, or a global network (for example, the internet). The communications media may include a router, a switch, a base station, or another device facilitating communication from the source apparatus 10 to the destination apparatus 20.

In another embodiment, the encoded data may be output to a storage apparatus 40 through an output interface 140. Similarly, the encoded data may be accessed from the storage apparatus 40 through an input interface 240. The storage apparatus 40 may include any one of a plurality of distributed data storage media or locally accessible data storage media, for example, a hard disk drive, a Blu-ray disc, a digital video disc (DVD), a compact disc read-only memory (CD-ROM), a flash memory, a volatile or non-volatile memory, or any other appropriate digital storage media configured to store the encoded video data.

In another embodiment, the storage apparatus 40 may correspond to a file server or another intermediate storage apparatus capable of storing the encoded video generated by the source apparatus 10. The destination apparatus 20 may access the stored video data from the storage apparatus 40 through streaming transmission or downloading. The file server may be any type of server that can store the encoded video data and transmit the encoded video data to the destination apparatus 20. In an embodiment, the file server includes a network server (for example, used for a website), a file transfer protocol (FTP) server, a network-attached storage (NAS) apparatus, or a local disk drive. The destination apparatus 20 may access the encoded video data through any standard data connection (including an internet connection). The standard data connection may include a wireless channel (for example, a wireless fidelity (Wi-Fi) connection), a wired connection (for example, a digital subscriber line (DSL), or a cable modem), or a combination of a wireless channel and a wired connection, where the combination is suitable for accessing the encoded video data stored on the file server. The encoded video data may be transmitted from the storage apparatus 40 through streaming transmission, downloading transmission, or a combination thereof.

A motion vector prediction technology in this application is applicable to video coding to support a plurality of multimedia applications, for example, over-the-air television broadcasting, cable television transmission, satellite television transmission, video streaming transmission (for example, through the internet), encoding of video data stored in a data storage medium, decoding of video data stored in a data storage medium, or another application. In some embodiments, the video coding system may be configured to support unidirectional or bidirectional video transmission, to support applications such as video streaming transmission, video playback, video broadcasting, and/or videotelephony.

The video coding system described in FIG. 1 is merely an example, and the technologies of this application are applicable to video coding settings (for example, video encoding or video decoding) that do not necessarily include any data communication between an encoding apparatus and a decoding apparatus. In another embodiment, data is retrieved from a local memory, streamed over a network, or the like. The video encoding apparatus may encode data and store the data in a memory, and/or the video decoding apparatus may retrieve data from the memory and decode the data. In some embodiments, encoding and decoding are performed by apparatuses that do not communicate with each other, but simply encode data and store the data in a memory and/or retrieve data from the memory and decode the data.

In the embodiment shown in FIG. 1, the source apparatus 10 includes a video source 120, a video encoder 100, and the output interface 140. In some embodiments, the output interface 140 may include a modulator/demodulator (e.g., a modem) and/or a transmitter. The video source 120 may include a video capture apparatus (for example, a video camera), a video archive including previously captured video data, a video feed-in interface for receiving video data from a video content provider, and/or a computer graphics system for generating video data, or a combination of the foregoing video data sources.

The video encoder 100 may encode video data from the video source 120. In some embodiments, the source apparatus 10 directly transmits the encoded video data to the destination apparatus 20 through the output interface 140. In other examples, the encoded video data may be further stored in the storage apparatus 40, so that the destination apparatus 20 subsequently accesses the encoded video data for decoding and/or playback.

In the embodiment shown in FIG. 1, the destination apparatus 20 includes the input interface 240, a video decoder 200, and a display apparatus 220. In some examples, the input interface 240 includes a receiver and/or a modem. The input interface 240 may receive the encoded video data over the link 30 and/or from the storage apparatus 40. The display apparatus 220 may be integrated with the destination apparatus 20 or may be located outside the destination apparatus 20. Generally, the display apparatus 220 displays decoded video data. The display apparatus 220 may include a plurality of types of display apparatuses, for example, a liquid crystal display (LCD), a plasma display, an organic light-emitting diode (OLED) display, or another type of display apparatus.

In some embodiments, although not shown in FIG. 1, the video encoder 100 and the video decoder 200 may be integrated with an audio encoder and an audio decoder respectively, and may include an appropriate multiplexer-demultiplexer (MUX-DEMUX) unit or other hardware and software, to encode both audio and a video in a same data stream or separate data streams. In some embodiments, if applicable, the MUX-DEMUX unit may comply with the international telecommunication union (ITU) H.223 multiplexer protocol or another protocol, such as the user datagram protocol (UDP).

The video encoder 100 and the video decoder 200 each may be implemented as any one of a plurality of circuits, for example, one or more microprocessors, digital signal processors (DSP), application-specific integrated circuits (ASIC), field programmable gate arrays (FPGA), discrete logic, hardware, or any combination thereof. If this application is implemented partially by using software, the apparatus may store an instruction for the software in an appropriate non-volatile computer-readable storage medium, and may use one or more processors to execute the instruction in hardware, to implement the technologies in this application. Any one of the foregoing content (including hardware, software, a combination of hardware and software, and the like) may be considered as one or more processors. The video encoder 100 and the video decoder 200 each may be included in one or more encoders or decoders. Either the encoder or the decoder may be integrated as a part of a combined encoder/decoder (codec) in a corresponding apparatus.

In this application, the video encoder 100 may be generally referred to as an apparatus that "signals" or "sends" some information to another apparatus such as the video decoder 200. The term "signal" or "send" may generally refer to transmission of a syntax element and/or other data used to decode compressed video data. The transmission may be performed in real time or almost in real time. Alternatively, the communication may be performed after a period of time, for example, performed when a syntax element in an encoded bitstream is stored in a computer-readable storage medium during encoding. Then, the decoding apparatus may retrieve the syntax element at any time after the syntax element is stored in the medium.

JCT-VC has developed the H.265 high efficiency video coding (HEVC) standard. HEVC standardization is based on an evolved model of a video decoding apparatus, where the model is referred to as an HEVC test model (HEVC model (HM)). A latest H.265 standard document is available at http://www.itu.int/rec/T-REC-H.265. A latest version of the standard document is H.265 (December 2016), and the standard document is incorporated herein by reference in its entirety. In HM, it is assumed that the video decoding apparatus has several additional capabilities relative to an existing algorithm in ITU-TH.264/AVC. For example, H.264 provides nine intra prediction coding modes, whereas HM can provide up to 35 intra prediction coding modes.

JVET is committed to developing the H.266 standard. An H.266 standardization process is based on an evolved model of the video decoding apparatus, where the model is referred to as an H.266 test model. H.266 algorithm descriptions are available at http://phenix.int-evey.fr/jvet, and latest algorithm descriptions are included in JVET-F1001-v2. A document of the algorithm descriptions is incorporated herein by reference in its entirety. In addition, reference software for a JEM test model is available at https://jvet.hhi.fraunhofer.de/svn/svn_HMJEMSoftware/, and is also incorporated herein by reference in its entirety.

Generally, as described in an HM working model, a video frame or picture may be split into a sequence of tree blocks or largest coding units (LCUs) including both luma samples and chroma samples. The LCU is also referred to as a coding tree unit (CTU). A tree block has a function similar to that of a macroblock in the H.264 standard. A slice includes several consecutive tree blocks in a decoding order. The video frame or picture may be partitioned into one or more slices. Each tree block may be split into coding units based on a quadtree. For example, a tree block serving as a root node of the quadtree may be split into four child nodes, and each child node may also serve as a parent node and be split into four other child nodes. A final non-splittable child node serving as a leaf node of the quadtree includes a decoding node, for example, a decoded video block. A maximum quantity of times that the tree block can be split and a minimum size of the decoding node may be defined in syntax data associated with a decoded bitstream.

A coding unit includes a decoding node, a prediction unit (PU), and a transform unit (TU) associated with the decoding node. A size of the CU corresponds to a size of the decoding node, and a shape of the CU needs to be a square. The size of the CU may range from 8×8 pixels to a maximum of 64×64 pixels or may be a larger tree block size. Each CU may include one or more PUs and one or more TUs. For example, syntax data associated with the CU may describe partitioning of one CU into one or more PUs. Partitioning modes may vary when the CU is encoded based on a skip or direct mode, encoded based on an intra prediction mode, or encoded based on an inter prediction mode. The PU obtained through partitioning may be in a non-square shape. For example, the syntax data associated with the CU may alternatively describe partitioning of one CU into one or more TUs based on the quadtree. The TU may be in a square or non-square shape.

The HEVC standard allows TU-based transform. TUs may be different for different CUs. A size of a TU is usually set based on a size of a PU within a given CU defined for a partitioned LCU. However, a case may not always be like this. The size of the TU is usually the same as or less than the size of the PU. In some embodiments, a quadtree structure referred to as a "residual quadtree" (RQT) may be used to partition a residual sample corresponding to the CU into smaller units. A leaf node of the RQT may be referred to as a TU. A pixel difference associated with the TU may be transformed to generate a transform coefficient, and the transform coefficient may be quantized.

Generally, the PU includes data related to a prediction process. For example, when the PU is encoded based on an intra prediction mode, the PU may include data describing the intra prediction mode corresponding to the PU. In another embodiment, when the PU is encoded based on an inter prediction mode, the PU may include data defining a motion vector of the PU. For example, the data defining the motion vector of the PU may describe a horizontal component of the motion vector, a vertical component of the motion vector, resolution (for example, ¼ sample precision or ⅛ sample precision) of the motion vector, a reference picture to which the motion vector points, and/or a reference picture list (for example, a list 0, a list 1, or a list C) of the motion vector Generally, transform and quantization processes are used for the TU. A given CU including one or more PUs may also include one or more TUs. After prediction, the video encoder 100 may calculate a residual value corresponding to the PU. The residual value includes a pixel difference. The pixel difference may be transformed into a transform coefficient, and the transform coefficient is quantized and undergoes TU scanning to generate a serialized transform coefficient for entropy decoding. In this application, the term "video block" is usually used to indicate a decoding node of a CU. In some specific applications, in this application, the term "video block" may also be used to indicate a tree block, such as an LCU or a CU, including a decoding node, a PU, and a TU.

A video sequence usually includes a series of video frames or pictures. For example, a group of pictures (GOP) includes a series of video pictures, or one or more video pictures. The GOP may include syntax data in header information of the GOP, in header information of one or more of the pictures, or elsewhere, and the syntax data describes a quantity of pictures included in the GOP. Each slice of a picture may include slice syntax data describing a coding mode for the corresponding picture. The video encoder 100 usually performs an operation on a video block in a video slice, to encode the video data. The video block may correspond to the decoding node in the CU. A size of the video block may be fixed or variable, and may vary with a specified decoding standard.

In an embodiment, HM supports prediction for PUs with a variety of sizes. Assuming that a size of a given CU is 2N×2N, HM supports intra prediction for a PU with a size of 2N×2N or N×N, and inter prediction for a symmetric PU with a size of 2N×2N, 2N×N, N×2N, or N×N. HM also supports asymmetric partitioning for inter prediction for PU sizes of 2N×nU, 2N×nD, nL×2N, or nR×2N. In asymmetric partitioning, the CU is not partitioned in one direction, and is partitioned into two parts in the other direction, where one part accounts for 25% of the CU and the other part accounts for 75% of the CU. The part accounting for 25% of the CU is indicated by an indicator including "n" followed by "U (Up)", "D (Down)", "L (Left)", or "R (Right)". Therefore, for example, "2N×nU" refers to a horizontally partitioned 2N×2N CU, with a 2N×0.5N PU at the top and a 2N×1.5N PU at the bottom.

In this application, "N×N" and "N multiplied by N" is used interchangeably to indicate a pixel size of a video block in a vertical dimension and a horizontal dimension, for example, 16×16 pixels or 16 multiplied by 16 pixels. Generally, a 16×16 block has 16 pixels in a vertical direction (y=16) and 16 pixels in a horizontal direction (x=16). Similarly, an N×N block has N pixels in a vertical direction and N pixels in a horizontal direction, where N is a non-negative integer value. Pixels in a block may be arranged in rows and columns. In addition, in a block, a quantity of pixels in a horizontal direction and a quantity of pixels in a vertical direction may be not necessarily the same. For example, a block may include N×M pixels, where M is not necessarily equal to N.

After intra or inter prediction decoding is performed on the PU of the CU, the video encoder 100 may calculate residual data of the TU in the CU. The PU may include pixel data in a spatial domain (also referred to as a pixel domain). The TU may include a coefficient in a transform domain after transform (for example, discrete cosine transform (DCT), integer transform, wavelet transform, or conceptually similar transform) is applied to residual video data. The residual data may correspond to a pixel difference between pixels of an unencoded picture and a prediction value corresponding to the PU. The video encoder 100 may generate a TU including residual data of the CU, and then transform the TU to generate a transform coefficient of the CU.

After performing any transform to generate transform coefficients, the video encoder 100 may quantize the transform coefficients. Quantization refers to, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value through rounding, where n is greater than m.

The JEM model further improves a video picture coding structure. For example, a block coding structure referred to as a "quadtree plus binary tree" (QTBT) structure is introduced. Without using concepts such as CU, PU, and TU in HEVC, the QTBT structure supports a more flexible CU split shape. A CU may be in a square shape or in a rectangular shape. Quadtree split is first performed on a CTU, and binary tree split is further performed on a leaf node of the quadtree. In addition, there are two split modes in binary tree split: symmetric horizontal partitioning and symmetric vertical partitioning. A leaf node of a binary tree is referred to as a CU. The CU in the JEM model cannot be further split during prediction and transform. In other words, the CU, the PU, and the TU in the JEM model have a same block size. In the existing JEM model, a maximum CTU size is 256×256 luma pixels.

In some embodiments, the video encoder 100 may scan the quantized transform coefficient in a predefined scanning order to generate a serialized vector that can be entropy encoded. In other embodiments, the video encoder 100 may perform adaptive scanning. After scanning the quantized transform coefficient to generate a one-dimensional vector, the video encoder 100 may perform entropy encoding on the one-dimensional vector by using context-based adaptive variable-length coding (CAVLC), context-based adaptive binary arithmetic coding (CABAC), syntax-based context-adaptive binary arithmetic coding (SBAC), probability interval partitioning entropy (PIPE) coding, or another entropy coding method. The video encoder 100 may further perform entropy encoding on the syntax element associated with the encoded video data, for the video decoder 200 to decode the video data.

To perform CABAC, the video encoder 100 may assign a context in a context model to a to-be-transmitted symbol. The context may be related to whether an adjacent value of the symbol is non-zero. To perform CAVLC, the video encoder 100 may select a variable-length code of the to-be-transmitted symbol. A codeword in variable-length coding (VLC) may be constructed, so that a shorter code corresponds to a more probable symbol and a longer code corresponds to a less probable symbol. In this way, compared with using equal-length codewords for all to-be-transmitted symbols, using the VLC can reduce a bit rate. A probability in CABAC may be determined based on the context assigned to the symbol.

In this embodiment, the video encoder may perform inter prediction to reduce temporal redundancy between pictures. As described above, a CU may have one or more prediction units PUs depending on different video compression coding standards. In other words, a plurality of PUs may belong to one CU, or a PU and a CU have a same size. In an embodiment, when a CU and a PU have a same size, a partitioning mode corresponding to the CU is that the CU is not partitioned, or the CU is partitioned into one PU, and the PU is uniformly used for description. When the video encoder performs inter prediction, the video encoder may signal motion information of the PU to the video decoder. For example, the motion information of the PU may include a reference picture index, a motion vector, and a prediction direction indicator. The motion vector may indicate a displacement between a picture block (also referred to as a video block, a pixel block, a pixel set, or the like) of the PU and a reference block of the PU. The reference block of the PU may be a part of a reference picture similar to the picture block of the PU. The reference block may be located in a reference picture indicated by the reference picture index and the prediction direction indicator.

To reduce a quantity of coding bits required to represent the motion information of the PU, the video encoder may generate a candidate predicted motion vector (MV) list for each PU based on a merge prediction mode or an advanced motion vector prediction mode. Each candidate predicted motion vector in the candidate predicted motion vector list for the PU may indicate motion information. Motion information indicated by some candidate predicted motion vectors in the candidate predicted motion vector list may be based on motion information of other PUs. If a candidate predicted motion vector indicates motion information of one of a specified spatial candidate predicted motion vector at position or a specified temporal candidate predicted motion vector at position, the candidate predicted motion vector may be referred to as an "original" candidate predicted motion vector in this application. For example, in a merge mode, also referred to as the merge prediction mode in this specification, there may be five original spatial candidate predicted motion vectors at positions and one original temporal candidate predicted motion vector at position. In some examples, the video encoder may generate additional candidate predicted motion vectors by combining some motion vectors from different original candidate predicted motion vectors, modifying an original candidate predicted motion vector, or inserting only a zero motion vector as a candidate predicted motion vector. The additional candidate predicted motion vectors are not considered as original candidate predicted motion vectors, and may be referred to as artificially generated candidate predicted motion vectors in this application.

The technologies in this application usually include a technology for generating a candidate predicted motion vector list on the video encoder and a technology for generating the same candidate predicted motion vector list on the video decoder. The video encoder and the video decoder may generate the same candidate predicted motion vector list by implementing a same technology for constructing the candidate predicted motion vector list. For example, the video encoder and the video decoder may construct lists with a same quantity of candidate predicted motion vectors (for example, five candidate predicted motion vectors). The video encoder and the video decoder may first consider spatial candidate predicted motion vectors (for example, adjacent blocks in a same picture) and then consider temporal candidate predicted motion vectors (for example, candidate predicted motion vectors in different pictures), and finally may consider artificially generated candidate predicted motion vectors, until a required quantity of candidate predicted motion vectors are added to the lists. According to the technologies in this application, during construction of the candidate predicted motion vector list, a pruning operation may be performed on some types of candidate predicted motion vectors, to remove a repeated candidate predicted motion vector from the candidate predicted motion vector list, but may not be performed on other types of candidate predicted motion vectors, to reduce decoder complexity. For example, for a set of spatial candidate predicted motion vectors and for a temporal candidate predicted motion vector, the pruning operation may be performed to remove a candidate predicted motion vector with same motion information from the candidate predicted motion vector list. However, an artificially generated candidate predicted motion vector may be added to the candidate predicted motion vector list without being pruned.

After generating the candidate predicted motion vector list for the PU of the CU, the video encoder may select a candidate predicted motion vector from the candidate predicted motion vector list and output a candidate predicted motion vector index in a bitstream. The selected candidate predicted motion vector may be a candidate predicted motion vector for generating a motion vector that most closely matches a prediction value of a target PU that is being decoded. The candidate predicted motion vector index may indicate a position of the selected candidate predicted motion vector in the candidate predicted motion vector list. The video encoder may further generate a prediction picture block of the PU based on a reference block indicated by the motion information of the PU. The motion information of the PU may be determined based on motion information indicated by the selected candidate predicted motion vector. For example, in the merge mode, the motion information of the PU may be the same as the motion information indicated by the selected candidate predicted motion vector. In the AMVP mode, the motion information of the PU may be determined based on a motion vector difference for the PU and the motion information indicated by the selected candidate predicted motion vector. The video encoder may generate one or more residual picture blocks of the CU based on the prediction picture block of the PU of the CU and an original picture block of the CU. Then, the video encoder may encode the residual picture block(s) and output the residual picture block(s) in the bitstream.

The bitstream may include data identifying the selected candidate predicted motion vector in the candidate predicted motion vector list for the PU. The video decoder may determine the motion information of the PU based on the motion information indicated by the selected candidate predicted motion vector in the candidate predicted motion vector list for the PU. The video decoder may identify one or more reference blocks of the PU based on the motion information of the PU. After identifying the reference block(s) of the PU, the video decoder may generate the prediction picture block of the PU based on the reference block(s) of the PU. The video decoder may reconstruct the picture block of the CU based on the prediction picture block of the PU of the CU and the residual picture block(s) of the CU.

For ease of explanation, in this application, a position or a picture block may be described as a position or a picture block having various spatial relationships with a CU or a PU. The description may be explained as follows: The position or the picture block has various spatial relationships with a picture block associated with the CU or the PU. In addition, in this application, a PU currently being decoded by the video decoder may be referred to as a current PU, and also be referred to as a current to-be-processed picture block. In this application, a CU currently being decoded by the video decoder may be referred to as a current CU. In this application, a picture currently being decoded by the video decoder may be referred to as a current picture. It should be understood that this application is also applicable to a case in which a PU and a CU have a same size or a PU is a CU. The PU is uniformly used for description.

As briefly described above, the video encoder 100 may generate the prediction picture block and the motion information of the PU of the CU through inter prediction. In many examples, motion information of a given PU may be the same as or similar to motion information of one or more neighboring PUs (namely, a PU whose picture block is spatially or temporally adjacent to a picture block of the given PU). Because the neighboring PU often has similar motion information, the video encoder 100 may encode the motion information of the given PU based on the motion information of the neighboring PU. Encoding the motion information of the given PU based on the motion information of the neighboring PU can reduce a quantity of coding bits in the bitstream that are required for indicating the motion information of the given PU.

The video encoder 100 may encode the motion information of the given PU based on the motion information of the neighboring PU in various manners. For example, the video encoder 100 may indicate that the motion information of the given PU is the same as the motion information of the neighboring PU. In this application, the merge mode may be used to indicate that the motion information of the given PU is the same as or may be derived from the motion information of the neighboring PU. In another embodiment, the video encoder 100 may calculate a motion vector difference (MVD) for the given PU. The MVD indicates a difference between a motion vector of the given PU and a motion vector of the neighboring PU. The video encoder 100 may include the MVD instead of the motion vector of the given PU in the motion information of the given PU. In the bitstream, a quantity of coding bits required for representing the MVD is less than a quantity of coding bits required for representing the motion vector of the given PU. In this application, the advanced motion vector prediction mode may be used to indicate that the motion information of the given PU is signaled to the decoder side by using the MVD and an index value that is used for identifying a candidate motion vector.

To signal, based on the merge mode or the AMVP mode, the motion information of the given PU to the decoder side, the video encoder 100 may generate a candidate predicted motion vector list for the given PU. The candidate predicted motion vector list may include one or more candidate predicted motion vectors. Each of the candidate predicted motion vectors in the candidate predicted motion vector list for the given PU may indicate motion information. The motion information indicated by each candidate predicted motion vector may include a motion vector, a reference picture index, and a prediction direction indicator. The candidate predicted motion vectors in the candidate predicted motion vector list may include an "original" candidate predicted motion vector. Each of the candidate predicted motion vectors indicates motion information in one of specified candidate predicted motion vectors at positions within a PU different from the given PU.

After generating the candidate predicted motion vector list for the PU, the video encoder 100 may select one candidate predicted motion vector from the candidate predicted motion vector list that is used for the PU. For example, the video encoder may compare each candidate predicted motion vector with a PU that is being decoded and may select a candidate predicted motion vector with required rate-distortion costs. The video encoder 100 may output a candidate predicted motion vector index for the PU. The candidate predicted motion vector index may identify a position of the selected candidate predicted motion vector in the candidate predicted motion vector list.

In addition, the video encoder 100 may generate a prediction picture block of the PU based on a reference block indicated by the motion information of the PU. The motion information of the PU may be determined based on motion information indicated by the selected candidate predicted motion vector in the candidate predicted motion vector list for the PU. For example, in the merge mode, the motion information of the PU may be the same as the motion information indicated by the selected candidate predicted motion vector. In the AMVP mode, the motion information of the PU may be determined based on the motion vector difference for the PU and the motion information indicated by the selected candidate predicted motion vector. As described above, the video encoder 100 may process the prediction picture block of the PU.

When the video decoder 200 receives the bitstream, the video decoder 200 may generate a candidate predicted motion vector list for each PU of the CU. The candidate predicted motion vector list generated by the video decoder 200 for the PU may be the same as the candidate predicted motion vector list generated by the video encoder 100 for the PU. A syntax element obtained by parsing the bitstream may indicate the position of the selected candidate predicted motion vector in the candidate predicted motion vector list for the PU. After generating the candidate predicted motion vector list for the PU, the video decoder 200 may generate the prediction picture block of the PU based on the reference block(s) indicated by the motion information of the PU. The video decoder 200 may determine the motion information of the PU based on the motion information indicated by the selected candidate predicted motion vector in the candidate predicted motion vector list for the PU. The video decoder 200 may reconstruct the picture block of the CU based on the prediction picture block of the PU and the residual picture block of the CU.

It should be understood that, in an embodiment, on the decoder side, constructing the candidate predicted motion vector list and parsing the bitstream to obtain the position of the selected candidate predicted motion vector in the candidate predicted motion vector list are independent of each other, and may be performed in any order or in parallel.

In another embodiment, on the decoder side, the position of the selected candidate predicted motion vector in the candidate predicted motion vector list is first obtained by parsing the bitstream, and then the candidate predicted motion vector list is constructed based on the position obtained through parsing. In this embodiment, it is not necessary to construct all candidate predicted motion vector lists, and only a candidate predicted motion vector list in the position obtained through parsing needs to be constructed, provided that the candidate predicted motion vector in the position can be determined. For example, when it is obtained, by parsing the bitstream, that the selected candidate predicted motion vector is a candidate predicted motion vector whose index is 3 in the candidate predicted motion vector list, only a candidate predicted motion vector list including a candidate predicted motion vector whose index is 0 to the candidate predicted motion vector whose index is 3 needs to be constructed, and the candidate predicted motion vector whose index is 3 can be determined. This can reduce complexity and improve decoding efficiency.

Figure 2:
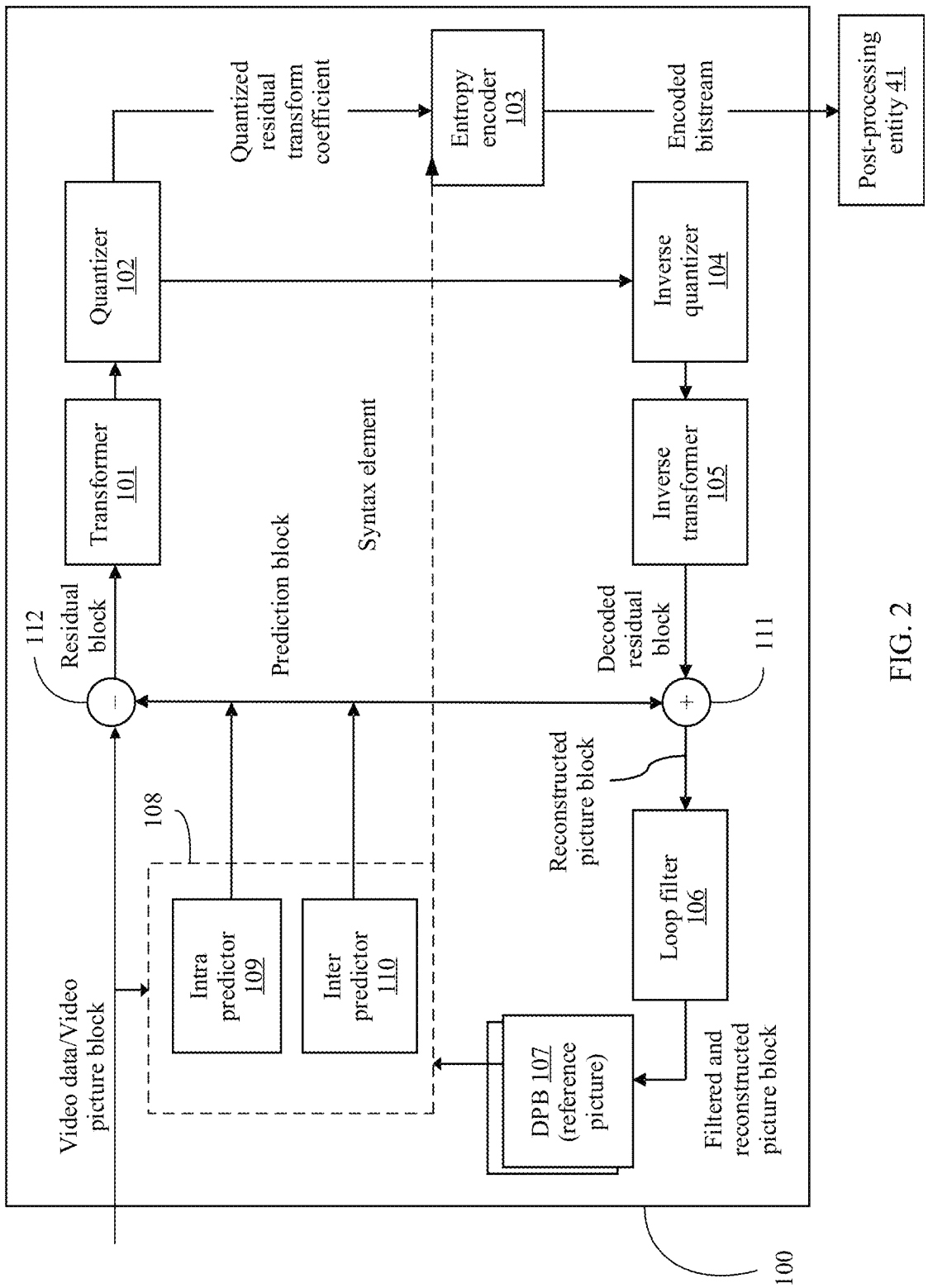
FIG. 2 is a system block diagram of an example of a video encoder according to an embodiment.

FIG. 2 is a block diagram of an example of a video encoder 100 according to an embodiment. The video encoder 100 is configured to output a video to a post-processing entity 41. The post-processing entity 41 represents an example of a video entity that can process encoded video data from the video encoder 100. For example, the video entity is a media aware network element (MANE) or a splicing apparatus/an editing apparatus. In some embodiments, the post-processing entity 41 may be an example of a network entity. In some embodiments, the post-processing entity 41 and the video encoder 100 may be components of separate apparatuses. In other embodiments, functions of the post-processing entity 41 may be performed by a same apparatus including the video encoder 100. In an example, the post-processing entity 41 is an example of the storage apparatus 40 in FIG. 1.

In the embodiment shown in FIG. 2, the video encoder 100 includes a prediction processing unit 108, a filter unit 106, a decoded picture buffer (DPB) 107, a summator 112, a transformer 101, a quantizer 102, and an entropy encoder 103. The prediction processing unit 108 includes an inter predictor 110 and an intra predictor 109. To reconstruct a picture block, the video encoder 100 further includes an inverse quantizer 104, an inverse transformer 105, and a summator 111. The filter unit 106 is intended to represent one or more loop filters, for example, a deblocking filter, an adaptive loop filter (ALF), and a sample adaptive offset (SAO) filter. Although the filter unit 106 is shown as an in-loop filter in FIG. 2, in another embodiment, the filter unit 106 may be implemented as a post-loop filter. In an embodiment, the video encoder 100 may further include a video data memory and a partitioning unit (which is not shown in the figure).

The video data memory may store video data to be encoded by a component of the video encoder 100. The video data stored in the video data memory may be obtained from a video source 120. The DPB 107 may be a reference picture memory that stores reference video data used by the video encoder 100 to encode video data in an intra coding mode or an inter coding mode. The video data memory and the DPB 107 may include any one of a plurality of types of memory apparatuses, for example, a dynamic random access memory (DRAM) including a synchronous dynamic random access memory (SDRAM), a magnetic random access memory (MRAM), a resistive random access memory (RRAM), or another type of memory apparatus. The video data memory and the DPB 107 may be provided by a same memory apparatus or separate memory apparatuses. In various embodiments, the video data memory may be integrated onto a chip together with other components of the video encoder 100, or may be disposed outside the chip relative to those components.

As shown in FIG. 2, the video encoder 100 receives video data, and stores the video data in the video data memory. The partitioning unit partitions the video data into several picture blocks, and may further partition these picture blocks into smaller blocks, for example, partition these picture blocks based on a quadtree structure or a binary tree structure. The partitioning may further include partitioning into slices, tiles, or other larger units. The video encoder 100 is usually a component that encodes a picture block in a to-be-encoded video slice. The slice may be partitioned into a plurality of picture blocks (and may be partitioned into a picture block set that is referred to as a tile). The prediction processing unit 108 may select one of a plurality of possible coding modes used for a current picture block, for example, select one of a plurality of intra coding modes or one of a plurality of inter coding modes. The prediction processing unit 108 may provide an obtained intra-coded or inter-coded block for the summator 112 to generate a residual block, and provide an obtained intra-coded or inter-coded block for the summator 111 to reconstruct an encoded block that is used as a reference picture.

The intra predictor 109 in the prediction processing unit 108 may perform intra prediction encoding on a to-be-encoded current block relative to one or more neighboring blocks that are in a same frame or slice as the current picture block, to remove spatial redundancy. The inter predictor 110 in the prediction processing unit 108 may perform inter prediction encoding on the current picture block relative to one or more prediction blocks in one or more reference pictures, to remove temporal redundancy.

In an embodiment, the inter predictor 110 may be configured to determine an inter prediction mode used to encode the current picture block. For example, the inter predictor 110 may calculate rate-distortion values infor various inter prediction modes in a candidate inter prediction mode set through rate-distortion analysis, and select an inter prediction mode with an optimal rate-distortion feature from the candidate inter prediction mode set. The rate-distortion analysis is usually used to determine an amount of distortion (or an error) between an encoded block and an original unencoded block from which the encoded block is generated through encoding, and a bit rate (namely, a quantity of bits) used to generate the encoded block. For example, the inter predictor 110 may determine that an inter prediction mode, in the candidate inter prediction mode set, used to encode the current picture block at a minimum bit rate distortion cost is an inter prediction mode used to perform inter prediction on the current picture block.

The inter predictor 110 is configured to: predict motion information (for example, a motion vector) of one or more subblocks of the current picture block based on the determined inter prediction mode, and obtain or generate a prediction block of the current picture block based on the motion information (for example, the motion vector) of the subblock(s) of the current picture block. The inter predictor 110 may locate, in one of reference picture lists, a prediction block pointed by the motion vector. The inter predictor 110 may further generate a syntax element associated with a picture block and a video slice, so that a video decoder 200 uses the syntax element to decode the picture block in the video slice. Alternatively, in an embodiment, the inter predictor 110 performs a motion compensation process based on motion information of each subblock, to generate a prediction block of each subblock, and obtain a prediction block of the current picture block. It should be understood that the inter predictor 110 herein performs a motion estimation process and the motion compensation process.

In an embodiment, after selecting the inter prediction mode for the current picture block, the inter predictor 110 may provide the entropy encoder 103 with information indicating the inter prediction mode selected for the current picture block, so that the entropy encoder 103 encodes the information indicating the selected inter prediction mode.

The intra predictor 109 may perform intra prediction on the current picture block. It is clear that the intra predictor 109 may determine an intra prediction mode used to encode the current block. For example, the intra predictor 109 may calculate rate-distortion values infor various to-be-tested intra prediction modes through rate-distortion analysis, and select an intra prediction mode with an optimal rate-distortion feature from the to-be-tested modes. In any case, after selecting the intra prediction mode for the picture block, the intra predictor 109 may provide the entropy encoder 103 with information indicating the intra prediction mode selected for the current picture block, so that the entropy encoder 103 encodes the information indicating the selected intra prediction mode.

After the prediction processing unit 108 generates the prediction block of the current picture block through inter prediction and intra prediction, the video encoder 100 obtains a residual picture block by subtracting the prediction block from the to-be-encoded current picture block. The summator 112 represents one or more components that perform the subtraction operation. Residual video data in the residual block may be included in one or more TUs, and is applied to the transformer 101. The transformer 101 transforms the residual video data into a residual transform coefficient through transform such as discrete cosine transform (DCT) or conceptually similar transform. The transformer 101 may transform the residual video data from a pixel value domain to a transform domain, for example, a frequency domain.

The transformer 101 may send the obtained transform coefficient to the quantizer 102. The quantizer 102 quantizes the transform coefficient to further reduce the bit rate. In some examples, the quantizer 102 may further scan a matrix including a quantized transform coefficient. Alternatively, the entropy encoder 103 may perform scanning.

After quantization, the entropy encoder 103 performs entropy encoding on the quantized transform coefficient. For example, the entropy encoder 103 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. After performing the entropy encoding, the entropy encoder 103 may transmit an encoded bitstream to the video decoder 200, or archive an encoded bitstream for subsequent transmission or for subsequent retrieval by the video decoder 200. The entropy encoder 103 may further perform entropy encoding on a syntax element of the to-be-encoded current picture block.

The inverse quantizer 104 and the inverse transformer 105 respectively perform inverse quantization and inverse transform, to reconstruct the residual block in the pixel domain, for example, for being subsequently used as a reference block of a reference picture. The summator 111 adds a reconstructed residual block to the prediction block generated by the inter predictor 110 or the intra predictor 109, to generate a reconstructed picture block. The filter unit 106 is applicable to the reconstructed picture block to reduce distortion, for example, a block artifact. Then, the reconstructed picture block is used as a reference block and stored in the decoded picture buffer 107, and may be used by the inter predictor 110 as a reference block to perform inter prediction on a block in a subsequent video frame or picture.

It should be understood that other structural variants of the video encoder 100 may be used to encode a video stream. For example, for some picture blocks or picture frames, the video encoder 100 may directly quantize a residual signal, processing by the transformer 101 is not required, and correspondingly, processing by the inverse transformer 105 is not required either. Alternatively, for some picture blocks or picture frames, the video encoder 100 does not generate residual data, and correspondingly, processing by the transformer 101, the quantizer 102, the inverse quantizer 104, and the inverse transformer 105 is not required. Alternatively, the video encoder 100 may directly store the reconstructed picture block as the reference block, and processing by the filter unit 106 is not required. Alternatively, the quantizer 102 and the inverse quantizer 104 in the video encoder 100 may be combined.

Figure 3:
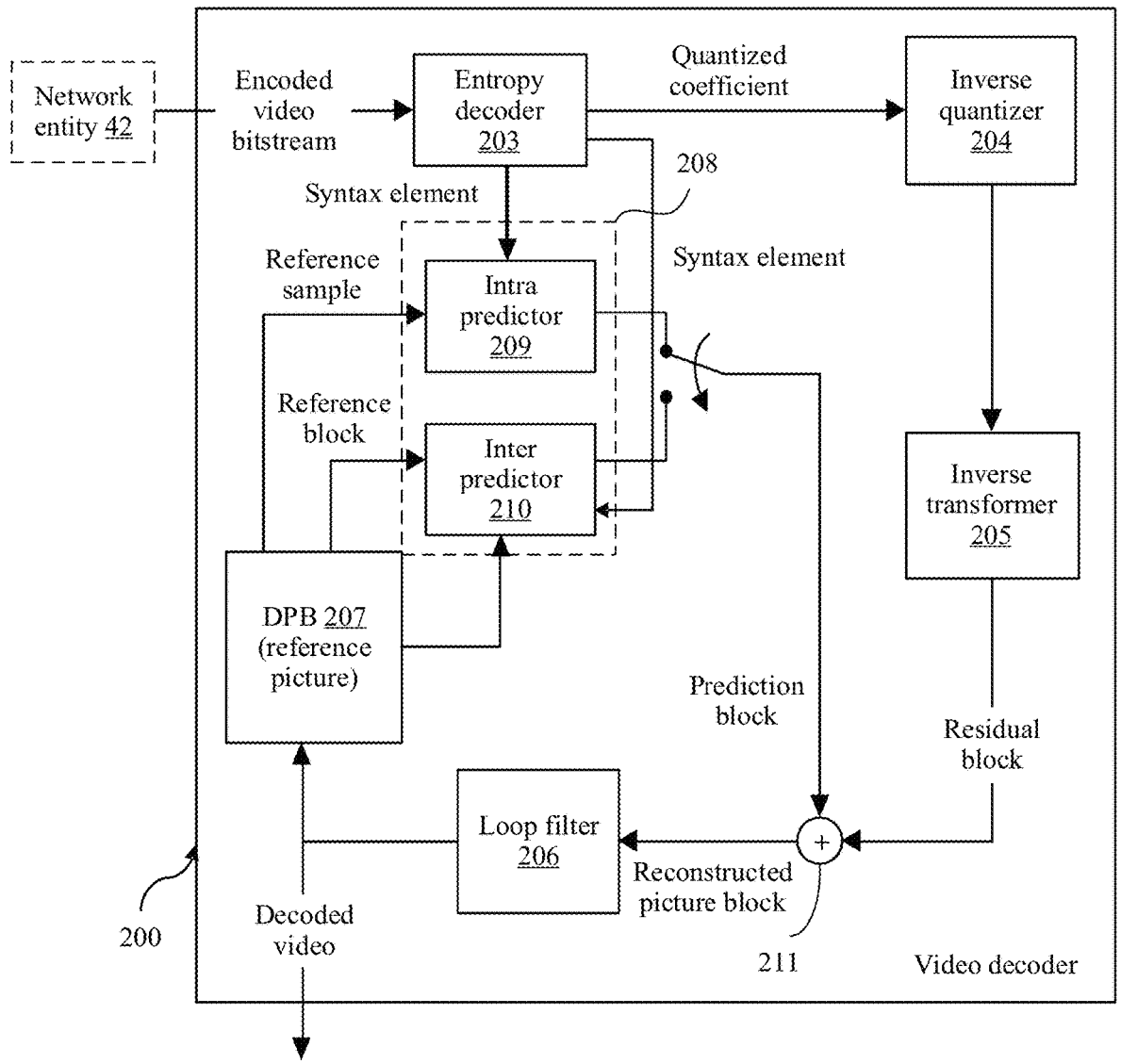
FIG. 3 is a system block diagram of an example of a video decoder according to an embodiment.

FIG. 3 is a block diagram of an example of a video decoder 200 according to an embodiment. In the example in FIG. 3, the video decoder 200 includes an entropy decoder 203, a prediction processing unit 208, an inverse quantizer 204, an inverse transformer 205, a summator 211, a filter unit 206, and a DPB 207. The prediction processing unit 208 may include an inter predictor 210 and an intra predictor 209. In some embodiments, the video decoder 200 may perform a decoding process that is roughly inverse to the encoding process described with reference to the video encoder 100 in FIG. 2.

During decoding, the video decoder 200 receives, from the video encoder 100, an encoded video bitstream that represents a picture block in an encoded video slice and an associated syntax element. The video decoder 200 may receive video data from a network entity 42, and optionally, may further store the video data into a video data memory (which is not shown in the figure). The video data memory may store video data, for example, the encoded video bitstream, that is to be decoded by a component of the video decoder 200. The video data stored in the video data memory may be obtained from, for example, a local video source such as the storage apparatus 40 or a camera through wired or wireless network communication of the video data, or by accessing a physical data storage medium. The video data memory may be used as a decoded picture buffer (CPB) for storing encoded video data from the encoded video bitstream. Therefore, although the video data memory is not shown in FIG. 3, the video data memory and the DPB 207 may be a same memory, or may be memories that are separately disposed. The video data memory and the DPB 207 each may include any one of a plurality of types of memory apparatuses, for example, a dynamic random access memory (DRAM) including a synchronous DRAM (SDRAM), a magnetic RAM (MRAM), a resistive RAM (RRAM), or another type of memory apparatus. In various embodiments, the video data memory may be integrated onto a chip together with other components of the video decoder 200, or may be disposed outside the chip relative to those components.

The network entity 42 may be, for example, a server, a MANE, a video editor/splicer, or another apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technologies described in this application. In some embodiments, the network entity 42 and the video decoder 200 may be components of separate apparatuses. In other cases, functions of the network entity 42 may be performed by a same apparatus including the video decoder 200. In some embodiments, the network entity 42 may be an example of the storage apparatus 40 in FIG. 1.

The entropy decoder 203 in the video decoder 200 performs entropy decoding on the bitstream to generate a quantized coefficient and some syntax elements. The entropy decoder 203 forwards the syntax elements to the prediction processing unit 208. The video decoder 200 may receive syntax elements at a video slice level and/or a picture block level.

When the video slice is decoded into an intra-decoded (I) slice, the intra predictor 209 in the prediction processing unit 208 may generate a prediction block of a picture block in the current video slice based on a signaled intra prediction mode and data of a previously decoded block of a current frame or picture. When the video slice is decoded into an inter-decoded (namely, B or P) slice, the inter predictor 210 in the prediction processing unit 208 may determine, based on the syntax elements received from the entropy decoder 203, an inter prediction mode used to decode a current picture block in the current video slice, and decode (for example, perform inter prediction on) the current picture block based on the determined inter prediction mode. In an embodiment, the inter predictor 210 may determine whether a new inter prediction mode is used to predict the current picture block in the current video slice. If the syntax element indicates that a new inter prediction mode is used to predict the current picture block, motion information of the current picture block in the current video slice or motion information of a subblock of the current picture block is predicted based on the new inter prediction mode (for example, a new inter prediction mode specified by using a syntax element or a default new inter prediction mode), and a prediction block of the current picture block or a prediction block of the subblock of the current picture block is obtained or generated, in a motion compensation process, by using the motion information that is of the current picture block or the subblock of the current picture block and that is predicted. The motion information herein may include reference picture information and a motion vector. The reference picture information may include but is not limited to uni-prediction/bi-prediction information, a reference picture list number, and a reference picture index corresponding to a reference picture list. For inter prediction, the prediction block may be generated from one of reference pictures in one of reference picture lists. The video decoder 200 may construct the reference picture lists, that is, a list 0 and a list 1, based on reference pictures stored in the DPB 207. A reference frame index of a current picture may be included in one of or both a reference frame list 0 and a reference frame list 1. In some examples, the video encoder 100 may signal whether a new inter prediction mode is used to decode a specific syntax element of a specific block, or signal whether a new inter prediction mode is used and which new inter prediction mode is used to decode a specific syntax element of a specific block. It should be understood that the inter predictor 210 herein performs the motion compensation process.

The inverse quantizer 204 performs inverse quantization on, that is, dequantizes a quantized transform coefficient provided in the bitstream and decoded by the entropy decoder 203. An inverse quantization process may include: determining a to-be-applied quantization degree by using a quantization parameter calculated by the video encoder 100 for each picture block in the video slice, and determining a to-be-applied inverse quantization degree in a same manner. The inverse transformer 205 performs inverse transform, for example, inverse DCT, inverse integer transform, or a conceptually similar inverse transform process, on the transform coefficient to generate a pixel-domain residual block.

After the inter predictor 210 generates the prediction block for the current picture block or the subblock of the current picture block, the video decoder 200 adds the residual block from the inverse transformer 205 and the corresponding prediction block generated by the inter predictor 210, to obtain a reconstructed block, namely, a decoded picture block. The summator 211 represents a component that performs the summation operation. When necessary, a loop filter (either in a decoding loop or after a decoding loop) may be further used to smooth pixel transitions, or improve video quality in another manner. The filter unit 206 may represent one or more loop filters, for example, a deblocking filter, an adaptive loop filter (ALF), and a sample adaptive offset (SAO) filter. Although the filter unit 206 is shown as an in-loop filter in FIG. 2, in another embodiment, the filter unit 206 may be implemented as a post-loop filter. In an example, the filter unit 206 is applicable to a reconstructed block to reduce block distortion, and the result is output as a decoded video stream. In addition, a decoded picture block in a given frame or picture may be further stored in the DPB 207, and the DPB 207 stores a reference picture used for subsequent motion compensation.

The DPB 207 may be a part of a memory, and may further store a decoded video for subsequent presentation on a display apparatus (for example, the display apparatus 220 in FIG. 1). Alternatively, the DPB 207 may be separated from such a memory.

It should be understood that other structural variants of the video decoder 200 may be used to decode the encoded video bitstream. For example, the video decoder 200 may generate an output video stream, and processing by the filter unit 206 is not required. Alternatively, for some picture blocks or picture frames, the entropy decoder 203 in the video decoder 200 does not obtain a quantized coefficient through decoding, and correspondingly, processing by the inverse quantizer 204 and the inverse transformer 205 is not required.

As described above, the technologies in this application relate to, for example, inter decoding. It should be understood that the technologies in this application may be performed by any one video codec described in this application, and the video decoder includes, for example, the video encoder 100 and the video decoder 200 shown and described in FIG. 1 to FIG. 3. In an embodiment, the inter predictor 110 described in FIG. 2 may perform a particular technology described below when inter prediction is performed during encoding of a block of video data. In another embodiment, the inter predictor 210 described in FIG. 3 may perform a particular technology described below when inter prediction is performed during decoding of a block of video data. Therefore, a reference to a general "video encoder" or "video decoder" may include the video encoder 100, the video decoder 200, or another video encoding unit or decoding unit.

It should be understood that, in the encoder 100 and the decoder 200 in this application, a processing result of a step may be further processed and then output to a next step. For example, after a step such as interpolation filtering, motion vector derivation, or loop filtering, a further operation, such as clip or shift, is performed on a processing result of the corresponding step.

For example, a value of a motion vector is constrained to be within a specific bit depth range. Assuming that an allowed bit depth of a motion vector is bitDepth, the value of the motion vector ranges from $2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. The value of the motion vector may be constrained in either of the following two manners:

Manner 1: An overflow most significant bit of the motion vector is removed:

$$ux=(vx+2^{bitDepth})\%\, 2^{bitDepth}$$

$$vx=(ux\geq 2^{bitDepth-1})?(ux-2^{bitDepth}):ux$$

$$uy=(vy+2^{bitDepth})\%\, 2^{bitDepth}$$

$$vy=(uy\geq 2^{bitDepth-1})?(uy-2^{bitDepth}):uy$$

For example, a value of vx is −32769, and 32767 is derived according to the foregoing formulas. A value is stored on a computer in a two's complement representation, a two's complement representation of −32769 is 1,0111,1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, and the following formulas are used:

$$vx=\text{Clip3}(-2^{bitDepth-1}, 2^{bitDepth-1}-1, vx)$$

$$vy=\text{Clip3}(-2^{bitDepth-1}, 2^{bitDepth-1}-1, vy)$$

In the foregoing formulas, Clip3 is defined as clipping a value of z to a range [x, y].

$$\text{Clip3}(x, y, z) = \begin{cases} x; & z < x \\ y; & z > y \\ z; & \text{otherwise} \end{cases}$$

Figure 4:
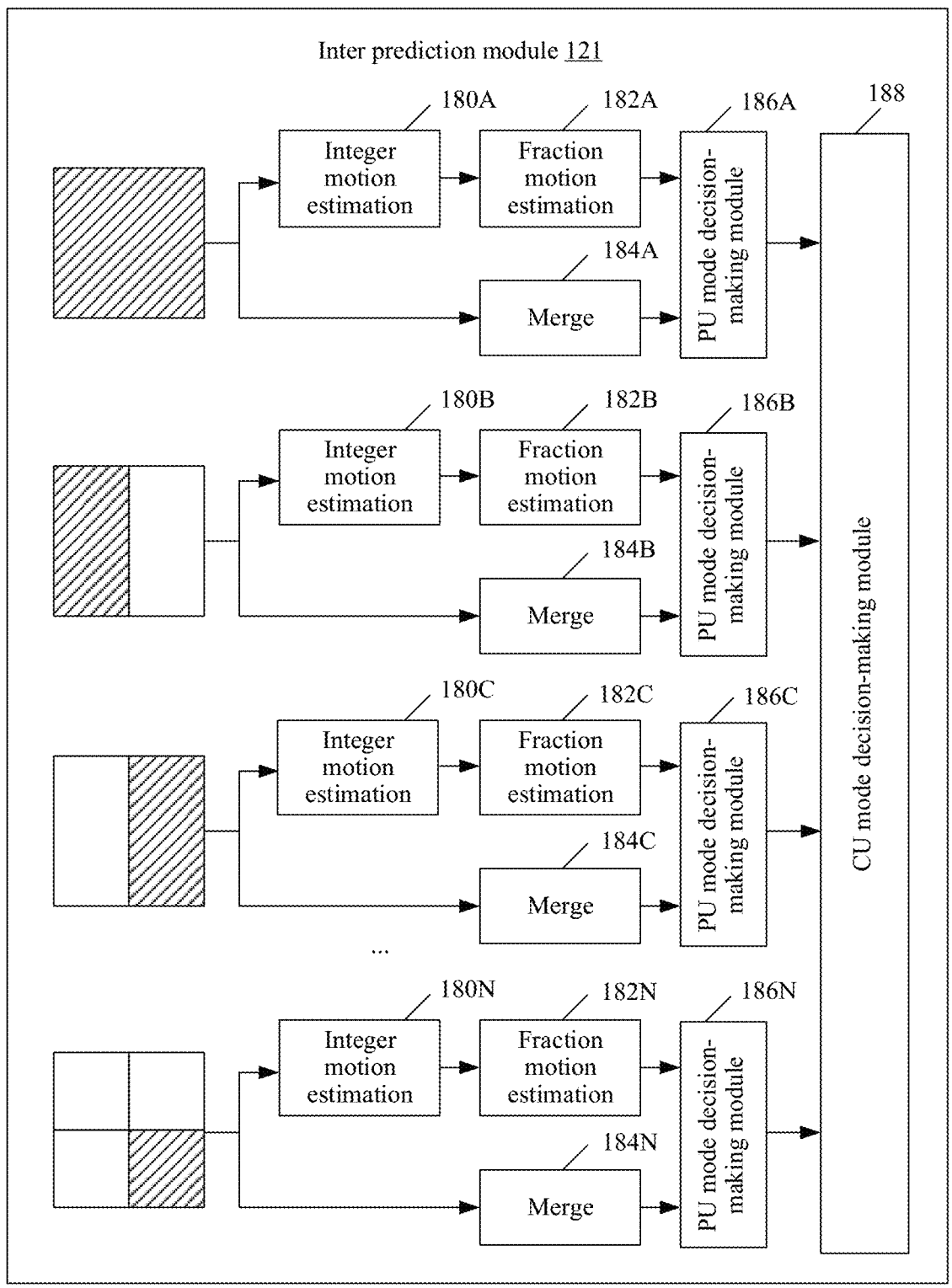
FIG. 4 is a block diagram of an example of an inter prediction module according to an embodiment.

FIG. 4 is a schematic block diagram of an inter prediction module 121 according to an embodiment. For example, the inter prediction module 121 may include a motion estimation unit and a motion compensation unit. A relationship between a PU and a CU varies with a video compression coding standard. The inter prediction module 121 may partition a current CU into PUs based on a plurality of partitioning modes. For example, the inter prediction module 121 may partition the current CU into PUs based on 2N×2N, 2N×N, N×2N, and N×N partitioning modes. In another embodiment, the current CU is a current PU. This is not limited.

The inter prediction module 121 may perform integer motion estimation (IME) and then fraction motion estimation (FME) on each PU. When the inter prediction module 121 performs IME on the PU, the inter prediction module 121 may search one or more reference pictures for a reference block of the PU. After finding the reference block of the PU, the inter prediction module 121 may generate a motion vector that indicates, with integer precision, a spatial displacement between the PU and the reference block of the PU. When the inter prediction module 121 performs FME on the PU, the inter prediction module 121 may improve the motion vector generated by performing IME on the PU. The motion vector generated by performing FME on the PU may have sub-integer precision (for example, ½ sample precision or ¼ sample precision). After generating the motion vector for the PU, the inter prediction module 121 may generate a prediction picture block of the PU by using the motion vector of the PU.

In some embodiments in which the inter prediction module 121 signals motion information of the PU to a decoder side based on an AMVP mode, the inter prediction module 121 may generate a candidate predicted motion vector list for the PU. The candidate predicted motion vector list may include one or more original candidate predicted motion vectors and one or more additional candidate predicted motion vectors derived from the original candidate predicted motion vector(s). After generating the candidate predicted motion vector list for the PU, the inter prediction module 121 may select a candidate predicted motion vector from the candidate predicted motion vector list and generate a motion vector difference (MVD) for the PU. The MVD for the PU may indicate a difference between a motion vector indicated by the selected candidate predicted motion vector and the motion vector generated for the PU through IME and FME. In these embodiments, the inter prediction module 121 may output a candidate predicted motion vector index used to identify a position of the selected candidate predicted motion vector in the candidate predicted motion vector list. The inter prediction module 121 may further output the MVD for the PU. The following describes in detail an embodiment of the advanced motion vector prediction (AMVP) mode in FIG. 6 in this embodiment of this application.

In addition to performing IME and FME on the PU to generate the motion information of the PU, the inter prediction module 121 may further perform a merge operation on each PU. When the inter prediction module 121 performs the merge operation on the PU, the inter prediction module 121 may generate a candidate predicted motion vector list for the PU. The candidate predicted motion vector list for the PU may include one or more original candidate predicted motion vectors and one or more additional candidate predicted motion vectors derived from the original candidate predicted motion vector(s). The original candidate predicted motion vectors in the candidate predicted motion vector list may include one or more spatial candidate predicted motion vectors and temporal candidate predicted motion vectors. The spatial candidate predicted motion vector may indicate motion information of another PU of a current picture. The temporal candidate predicted motion vector may be based on motion information of a corresponding PU of a picture different from the current picture. The temporal candidate predicted motion vector may also be referred to as temporal motion vector prediction (TMVP).

Figure 5:
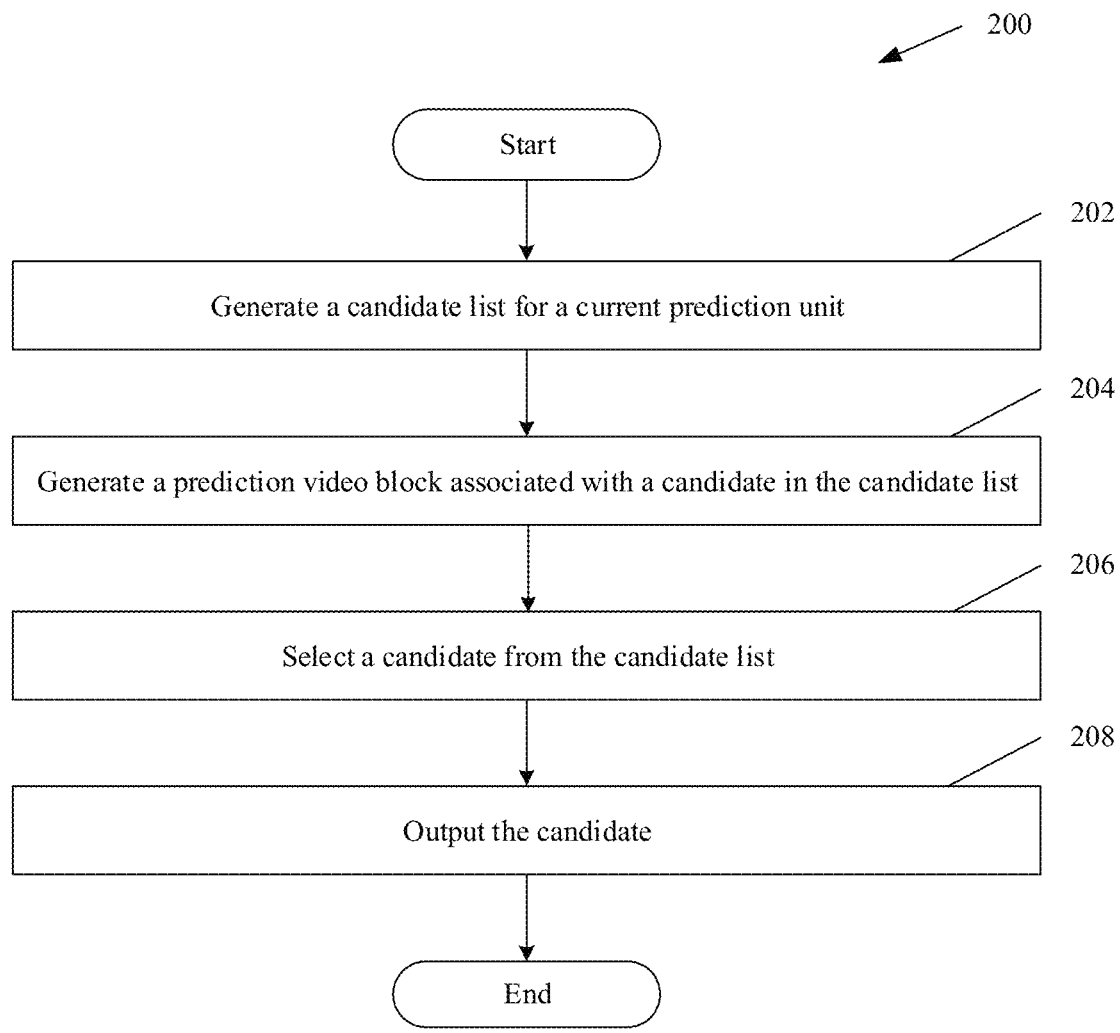
FIG. 5 is a flowchart of an example method of a merge prediction mode.

After generating the candidate predicted motion vector list, the inter prediction module 121 may select one candidate predicted motion vector from the candidate predicted motion vector list. Then, the inter prediction module 121 may generate a prediction picture block of the PU based on a reference block indicated by the motion information of the PU. In a merge mode, the motion information of the PU may be the same as motion information indicated by the selected candidate predicted motion vector. FIG. 5 described below is a flowchart of an example of the merge mode.

After generating the prediction picture block of the PU through IME and FME and generating the prediction picture block of the PU through the merge operation, the inter prediction module 121 may select the prediction picture block generated through the FME operation or the prediction picture block generated through the merge operation. In some embodiments, the inter prediction module 121 may select the prediction picture block of the PU by analyzing rate-distortion costs of the prediction picture block generated through the FME operation and the prediction picture block generated through the merge operation.

After the inter prediction module 121 has selected a prediction picture block of a PU generated by partitioning the current CU based on each partitioning mode (in some embodiments, after a coding tree unit CTU is split into CUs, a CU is not further split into smaller PUs, and in this case, a PU is equivalent to a CU), the inter prediction module 121 may select a partitioning mode for the current CU. In some embodiments, the inter prediction module 121 may select the partitioning mode for the current CU by analyzing a rate-distortion cost of the selected prediction picture block of the PU generated by partitioning the current CU based on each partitioning mode. The inter prediction module 121 may output a prediction picture block associated with a PU that belongs to the selected partitioning mode to a residual generation module 102. The inter prediction module 121 may output, to an entropy encoding module, a syntax element indicating motion information of the PU that belongs to the selected partitioning mode.

In the schematic diagram in FIG. 4, the inter prediction module 121 includes IME modules 180A to 180N (collectively referred to as an "IME module 180"), FME modules 182A to 182N (collectively referred to as an "FME module

182"), merge modules 184A to 184N (collectively referred to as a "merge module 184"), PU mode decision-making modules 186A to 186N (collectively referred to as a "PU mode decision-making module 186"), and a CU mode decision-making module 188 (and may further perform a CTU-to-CU mode decision-making process).

The IME module 180, the FME module 182, and the merge module 184 may respectively perform an IME operation, an FME operation, and a merge operation on the PU of the current CU. In the schematic diagram in FIG. 4, the inter prediction module 121 is described as including a separate IME module 180, a separate FME module 182, and a separate merge module 184 for each PU in each partitioning mode for the CU. In another embodiment, the inter prediction module 121 does not include a separate IME module 180, a separate FME module 182, or a separate merge module 184 for each PU in each partitioning mode for the CU.

As illustrated in the schematic diagram in FIG. 4, the IME module 180A, the FME module 182A, and the merge module 184A may respectively perform an IME operation, an FME operation, and a merge operation on a PU generated by partitioning the CU based on the 2N×2N partitioning mode. The PU mode decision-making module 186A may select one of prediction picture blocks generated by the IME module 180A, the FME module 182A, and the merge module 184A.

The IME module 180B, the FME module 182B, and the merge module 184B may respectively perform an IME operation, an FME operation, and a merge operation on the left PU generated by partitioning the CU based on the N×2N partitioning mode. The PU mode decision-making module 186B may select one of prediction picture blocks generated by the IME module 180B, the FME module 182B, and the merge module 184B.

The IME module 180C, the FME module 182C, and the merge module 184C may respectively perform an IME operation, an FME operation, and a merge operation on the right PU generated by partitioning the CU based on the N×2N partitioning mode. The PU mode decision-making module 186C may select one of prediction picture blocks generated by the IME module 180C, the FME module 182C, and the merge module 184C.

The IME module 180N, the FME module 182N, and the merge module 184N may respectively perform an IME operation, an FME operation, and a merge operation on the bottom-right PU generated by partitioning the CU based on the N×N partitioning mode. The PU mode decision-making module 186N may select one of prediction picture blocks generated by the IME module 180N, the FME module 182N, and the merge module 184N.

The PU mode decision-making module 186 may select a prediction picture block by analyzing rate-distortion costs of a plurality of possible prediction picture blocks, and select a prediction picture block that provides an optimal rate-distortion cost in a given decoding scenario. For example, for an application with limited bandwidth, the PU mode decision-making module 186 may prefer to select a prediction picture block for which a compression ratio is increased, and for another application, the PU mode decision-making module 186 may prefer to select a prediction picture block for which quality of a reconstructed video is improved. After the PU mode decision-making module 186 selects prediction picture blocks for the PUs in the current CU, the CU mode decision-making module 188 selects the partitioning mode for the current CU and outputs the prediction picture block and motion information of the PU that belongs to the selected partitioning mode.

FIG. 5 is a flowchart of an example method of a merge mode according to an embodiment. A video encoder (for example, the video encoder 100) may perform a merge operation 201. The merge operation 201 may include: S202: Generate a candidate list for a current prediction unit. S204: Generate a prediction video block associated with a candidate in the candidate list. S206: Select a candidate from the candidate list. S208: Output the candidate. The candidate is a candidate motion vector or candidate motion information.

In another embodiment, the video encoder may perform a merge operation different from the merge operation 201. For example, in another embodiment, the video encoder may perform a merge operation. In this case, the video encoder performs steps more or fewer than the steps of the merge operation 201 or steps different from the steps of the merge operation 201. In another embodiment, the video encoder may perform the steps of the merge operation 201 in different orders or in parallel. The encoder may further perform the merge operation 201 on a PU encoded based on a skip mode.

After the video encoder starts the merge operation 201, the video encoder may generate a candidate predicted motion vector list for the current PU (S202). The video encoder may generate the candidate predicted motion vector list for the current PU in various manners. For example, the video encoder may generate the candidate predicted motion vector list for the current PU by using one of example technologies described below with reference to FIG. 8 to FIG. 12.

As described above, the candidate predicted motion vector list for the current PU may include a temporal candidate predicted motion vector. The temporal candidate predicted motion vector may indicate motion information of a corresponding temporal (co-located) PU. The co-located PU may be spatially located at a same position as the current PU of a picture frame, but in a reference picture instead of a current picture. In this application, the reference picture including the corresponding temporal PU may be referred to as an associated reference picture. In this application, a reference picture index of the associated reference picture may be referred to as an associated reference picture index. As described above, the current picture may be associated with one or more reference picture lists (for example, a list 0 and a list 1). The reference picture index may indicate the reference picture by indicating a position of the reference picture in a reference picture list. In some embodiments, the current picture may be associated with a combined reference picture list.

In some embodiments, the associated reference picture index is a reference picture index of a PU that covers a reference index source position associated with the current PU. In these video encoders, the reference index source position associated with the current PU is adjacent to the current PU on the left of the current PU or above the current PU. In this application, if a picture block associated with a PU includes a specific position, the PU may "cover" the specific position. In these video encoders, the video encoder may use a reference picture index 0 if the reference index source position is unavailable.

However, in some embodiments, the reference index source position associated with the current PU is within a current CU. In these embodiments, a PU that covers the reference index source position associated with the current PU may be considered to be available if the PU is above or on the left of the current CU. In this case, the video encoder may need to access motion information of another PU of the current CU to determine the reference picture including the co-located PU. Therefore, these video encoders may use motion information (namely, a reference picture index) of a PU belonging to the current CU, to generate the temporal candidate predicted motion vector for the current PU. In other words, these video encoders may use the motion information of the PU belonging to the current CU, to generate the temporal candidate predicted motion vector. Therefore, the video encoder may be incapable of generating, in parallel, candidate predicted motion vector lists for the current PU and the PU that covers the reference index source position associated with the current PU.

According to the technologies in this application, the video encoder may explicitly set the associated reference picture index without referring to a reference picture index of any other PU. In this way, the video encoder can generate, in parallel, candidate predicted motion vector lists for the current PU and another PU of the current CU. Because the video encoder explicitly sets the associated reference picture index, the associated reference picture index is not based on motion information of any other PU of the current CU. In some embodiments in which the video encoder explicitly sets the associated reference picture index, the video encoder may always set the associated reference picture index to a fixed, predefined, and preset reference picture index (for example, 0). In this way, the video encoder may generate a temporal candidate predicted motion vector based on motion information of a co-located PU in a reference frame indicated by the preset reference picture index, where the temporal candidate predicted motion vector may be included in a candidate predicted motion vector list for the current CU.

In an embodiment in which the video encoder explicitly sets the associated reference picture index, the video encoder may explicitly signal the associated reference picture index in a syntax structure (for example, a picture header, a slice header, an APS, or another syntax structure). In this embodiment, the video encoder may signal an associated reference picture index of each LCU (namely, a CTU), CU, PU, TU, or another type of subblock to a decoder side. For example, the video encoder may signal that an associated reference picture index of each PU of the CU is equal to "1".

In some embodiments, the associated reference picture index may be set implicitly rather than explicitly. In these embodiments, the video encoder may generate each temporal candidate predicted motion vector in the candidate predicted motion vector list for the PU of the current CU by using motion information of a PU in a reference picture indicated by a reference picture index of a PU that covers positions outside the current CU, even if these positions are not strictly adjacent to the current PU.

After generating the candidate predicted motion vector list for the current PU, the video encoder may generate a prediction picture block associated with a candidate predicted motion vector in the candidate predicted motion vector list (S204). The video encoder may determine motion information of the current PU based on motion information of an indicated candidate predicted motion vector and then generate a prediction picture block based on one or more reference blocks indicated by the motion information of the current PU, to generate a prediction picture block associated with the candidate predicted motion vector. Then, the video encoder may select one candidate predicted motion vector from the candidate predicted motion vector list (S206). The video encoder may select the candidate predicted motion vector in various manners. For example, the video encoder may select one candidate predicted motion vector by analyzing a rate-distortion cost of each of prediction picture blocks associated with candidate predicted motion vectors.

After selecting the candidate predicted motion vector, the video encoder may output a candidate predicted motion vector index (S208). The candidate predicted motion vector index may indicate a position of the selected candidate predicted motion vector in the candidate predicted motion vector list. In some embodiments, the candidate predicted motion vector index may be represented as "merge_idx".

Figure 6:
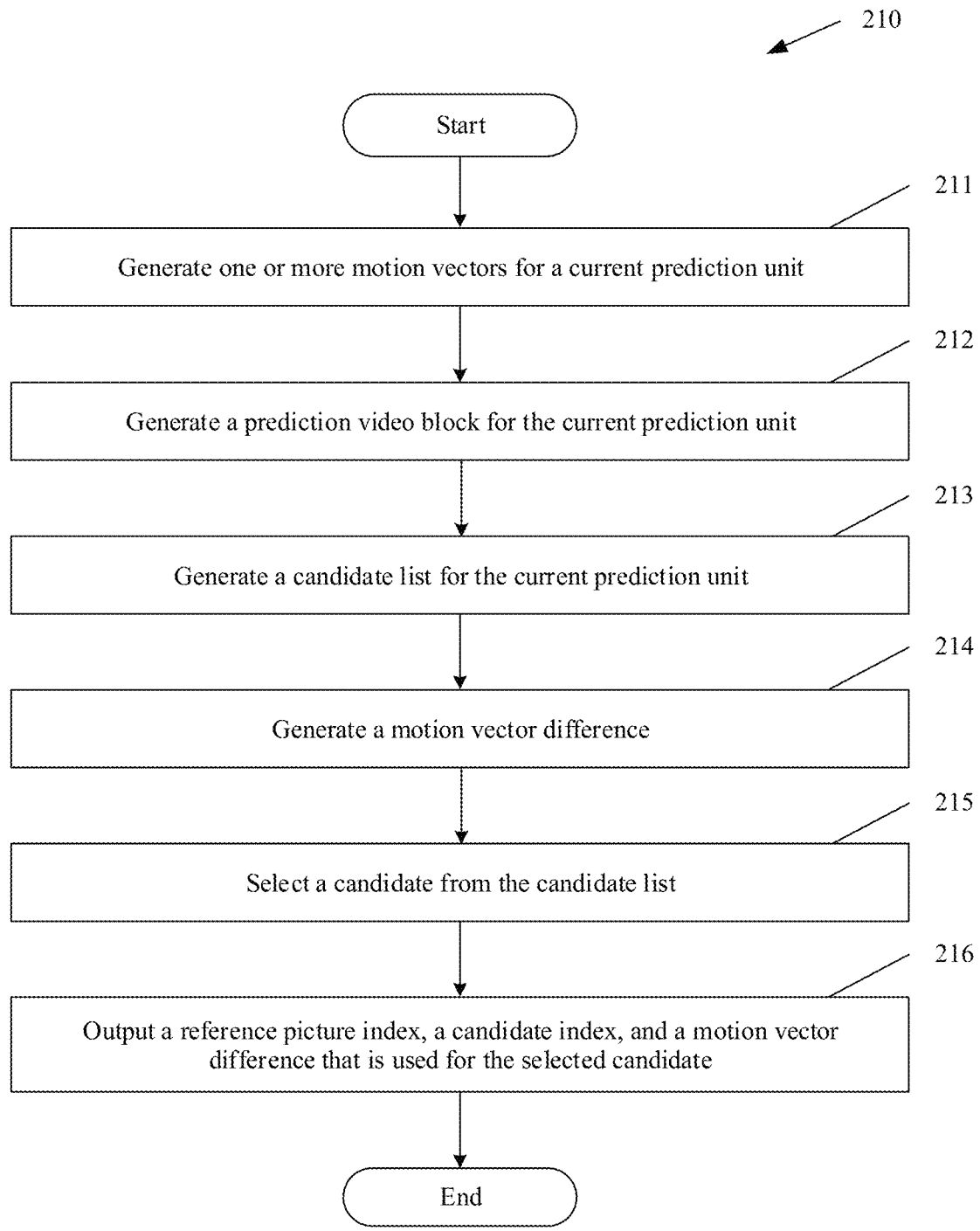
FIG. 6 is a flowchart of an example method of an advanced motion vector prediction mode.

FIG. 6 is a flowchart of an example method of an advanced motion vector prediction (AMVP) mode according to an embodiment. A video encoder (for example, the video encoder 100) may perform an AMVP operation 210. The AMVP operation 210 may include: S211: Generate one or more motion vectors for a current prediction unit. S212: Generate a prediction video block for the current prediction unit. S213: Generate a candidate list for the current prediction unit. S214: Generate a motion vector difference. S215: Select a candidate from the candidate list. S216: Output a reference picture index, a candidate index, and a motion vector difference that is used for the selected candidate. The candidate is a candidate motion vector or candidate motion information.

After the video encoder starts the AMVP operation 210, the video encoder may generate the motion vector(s) for the current PU (S211). The video encoder may perform integer motion estimation and fraction motion estimation to generate the motion vector for the current PU. As described above, a current picture may be associated with two reference picture lists (a list 0 and a list 1). If the current PU is predicted unidirectionally, the video encoder may generate a list-0 motion vector or a list-1 motion vector for the current PU. The list-0 motion vector may indicate a spatial displacement between a picture block corresponding to the current PU and a reference block in a reference picture in the list 0. The list-1 motion vector may indicate a spatial displacement between the picture block corresponding to the current PU and a reference block in a reference picture in the list 1. If the current PU is predicted bidirectionally, the video encoder may generate a list-0 motion vector and a list-1 motion vector for the current PU.

After generating the motion vector(s) for the current PU, the video encoder may generate the prediction picture block for the current PU (S212). The video encoder may generate the prediction picture block for the current PU based on one or more reference blocks indicated by the motion vector(s) of the current PU.

In addition, the video encoder may generate a candidate predicted motion vector list for the current PU (S213). The video encoder may generate the candidate predicted motion vector list for the current PU in various manners. For example, the video encoder may generate the candidate predicted motion vector list for the current PU by using one or more embodiments described below with reference to FIG. 8 to FIG. 12. In some embodiments, when the video encoder generates the candidate predicted motion vector list in the AMVP operation 210, the candidate predicted motion vector list may be limited to two candidate predicted motion vectors. In contrast, when the video encoder generates the candidate predicted motion vector list in a merge operation, the candidate predicted motion vector list may include more candidate predicted motion vectors (for example, five candidate predicted motion vectors).

After generating the candidate predicted motion vector list for the current PU, the video encoder may generate one or more motion vector differences (MVD) for each candidate predicted motion vector in the candidate predicted motion vector list (S214). The video encoder may determine a difference between a motion vector indicated by a candidate predicted motion vector and a corresponding motion vector of the current PU, to generate a motion vector difference for the candidate predicted motion vector.

If the current PU is predicted unidirectionally, the video encoder may generate a single MVD for each candidate predicted motion vector. If the current PU is predicted bidirectionally, the video encoder may generate two MVDs for each candidate predicted motion vector. A first MVD may indicate a difference between a motion vector indicated by the candidate predicted motion vector and the list-0 motion vector of the current PU. A second MVD may indicate a difference between a motion vector indicated by the candidate predicted motion vector and the list-1 motion vector of the current PU.

The video encoder may select one or more candidate predicted motion vectors from the candidate predicted motion vector list (S215). The video encoder may select the candidate predicted motion vector(s) in various manners. For example, the video encoder may select a candidate predicted motion vector that matches, with a minimum error, a motion vector associated with a to-be-encoded motion vector. This can reduce a quantity of bits required for representing a motion vector difference for the candidate predicted motion vector.

After selecting the candidate predicted motion vector(s), the video encoder may output one or more reference picture indexes for the current PU, one or more candidate predicted motion vector indexes for the current PU, and one or more motion vector differences for the selected candidate predicted motion vector(s) (S216).

In an example in which the current picture is associated with the two reference picture lists (the list 0 and the list 1) and the current PU is predicted unidirectionally, the video encoder may output a reference picture index ("ref_idx_l0") for the list 0 or a reference picture index ("ref_idx_l1") for the list 1. The video encoder may further output a candidate predicted motion vector index ("mvp_l0_flag") that indicates a position of a selected candidate predicted motion vector for the list-0 motion vector of the current PU in the candidate predicted motion vector list. Alternatively, the video encoder may output a candidate predicted motion vector index ("mvp_l1_flag") that indicates a position of a selected candidate predicted motion vector for the list-1 motion vector of the current PU in the candidate predicted motion vector list. The video encoder may further output an MVD for the list-0 motion vector or the list-1 motion vector of the current PU.

In an embodiment in which the current picture is associated with the two reference picture lists (the list 0 and the list 1) and the current PU is predicted bidirectionally, the video encoder may output a reference picture index ("ref_idx_l0") for the list 0 and a reference picture index ("ref_idx_l1") for the list 1. The video encoder may further output a candidate predicted motion vector index ("mvp_l0_flag") that indicates a position of a selected candidate predicted motion vector for the list-0 motion vector of the current PU in the candidate predicted motion vector list. In addition, the video encoder may output a candidate predicted motion vector index ("mvp_l1_flag") that indicates a position of a selected candidate predicted motion vector for the list-1 motion vector of the current PU in the candidate predicted motion vector list. The video encoder may further output an MVD for the list-0 motion vector of the current PU and an MVD for the list-1 motion vector of the current PU.

Figure 7:
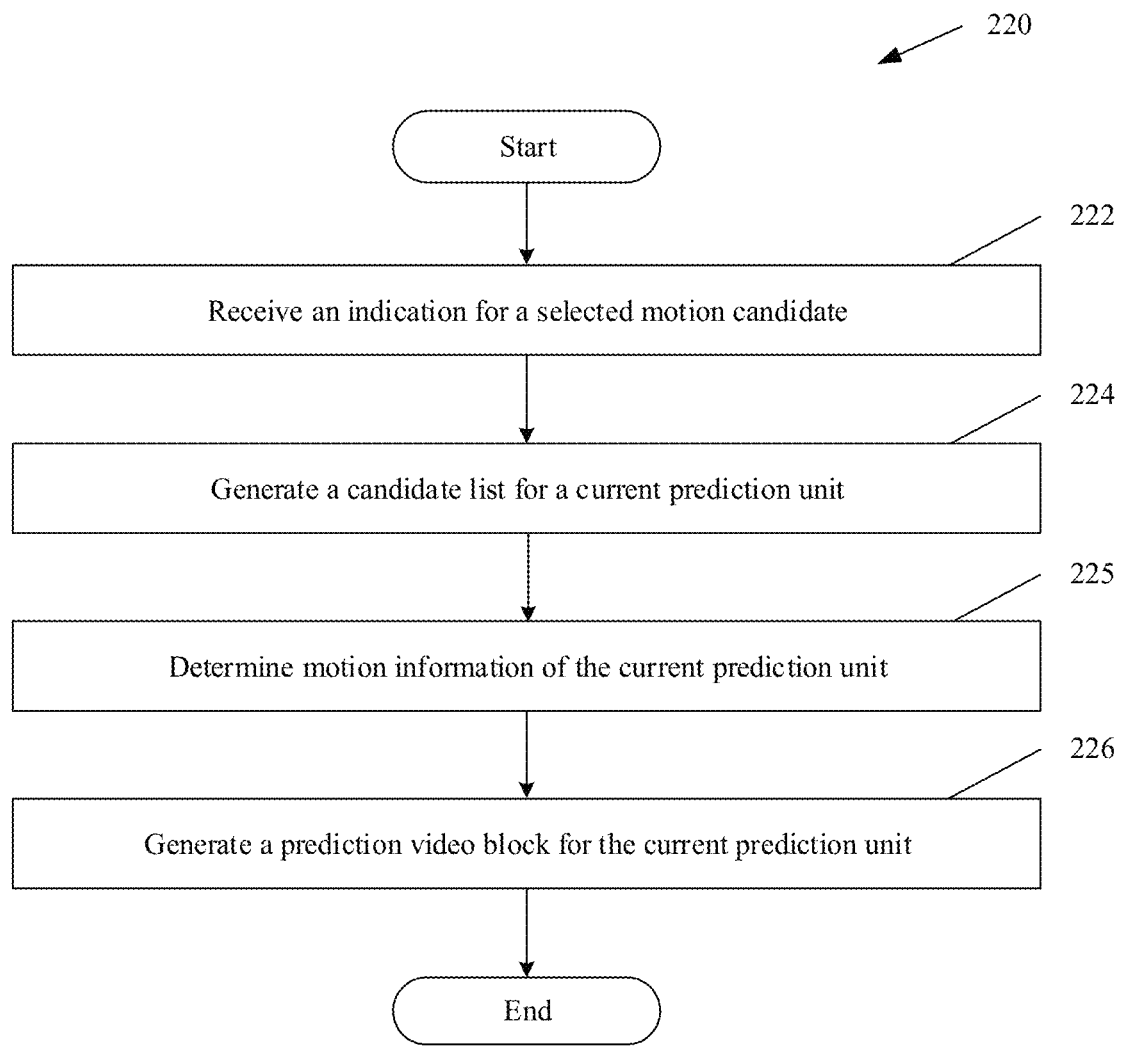
FIG. 7 is a flowchart of an example method of motion compensation performed by a video decoder according to an embodiment.

FIG. 7 is a flowchart of an example method of motion compensation performed by a video decoder (for example, the video decoder 30) according to an embodiment.

When the video decoder performs a motion compensation operation 220, the video decoder may receive an indication used for a selected candidate predicted motion vector of a current PU (S222). For example, the video decoder may receive a candidate predicted motion vector index indicating a position of the selected candidate predicted motion vector in a candidate predicted motion vector list for the current PU.

If motion information of the current PU is encoded based on an AMVP mode and the current PU is predicted bidirectionally, the video decoder may receive a first candidate predicted motion vector index and a second candidate predicted motion vector index. The first candidate predicted motion vector index indicates a position of a selected candidate predicted motion vector for a list-0 motion vector of the current PU in the candidate predicted motion vector list. The second candidate predicted motion vector index indicates a position of a selected candidate predicted motion vector for a list-1 motion vector of the current PU in the candidate predicted motion vector list. In some embodiments, a single syntax element may be used to identify the two candidate predicted motion vector indexes.

In addition, the video decoder may generate the candidate predicted motion vector list for the current PU (S224). The video decoder may generate the candidate predicted motion vector list for the current PU in various manners. For example, the video decoder may generate the candidate predicted motion vector list for the current PU by using technologies described below with reference to FIG. 8 to FIG. 12. When the video decoder generates a temporal candidate predicted motion vector for the candidate predicted motion vector list, the video decoder may explicitly or implicitly set a reference picture index that identifies a reference picture including a co-located PU, as described above with reference to FIG. 5.

After generating the candidate predicted motion vector list for the current PU, the video decoder may determine the motion information of the current PU based on motion information indicated by one or more selected candidate predicted motion vectors in the candidate predicted motion vector list for the current PU (S225). For example, if the motion information of the current PU is encoded based on a merge mode, the motion information of the current PU may be the same as the motion information indicated by the selected candidate predicted motion vector. If the motion information of the current PU is encoded based on the AMVP mode, the video decoder may reconstruct one or more motion vectors of the current PU by using one or more motion vectors indicated by the selected candidate predicted motion vector(s) and one or more MVDs indicated in a bitstream. A reference picture index and a prediction direction indicator of the current PU may be the same as one or more reference picture indexes and prediction direction indicators of the selected candidate predicted motion vector(s). After determining the motion information of the current PU, the video decoder may generate a prediction picture block for the current PU based on one or more reference blocks indicated by the motion information of the current PU (S226).

Figure 8:
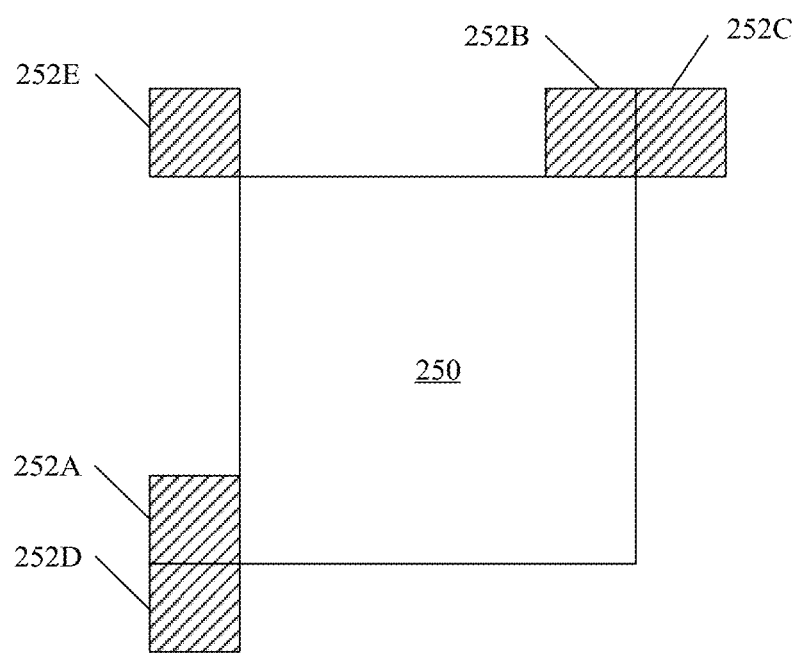
FIG. 8 is a schematic diagram of an example of a coding unit and a neighboring picture block associated with the coding unit.

FIG. 8 is a schematic diagram of an example of a coding unit (CU) and a neighboring picture block associated with the coding unit (CU) according to an embodiment. FIG. 8 is a schematic diagram for describing a CU 250 and example candidate predicted motion vectors at positions 252A to 252E associated with the CU 250. In this application, the candidate predicted motion vectors at positions 252A to 252E may be collectively referred to as a candidate predicted motion vector at position 252. The candidate predicted motion vector at position 252 represents a spatial candidate predicted motion vector that is in a same picture as the CU 250. The candidate predicted motion vector at position 252A is located on the left of the CU 250. The candidate predicted motion vector at position 252B is located above the CU 250. The candidate predicted motion vector at position 252C is located on the top right of the CU 250. The candidate predicted motion vector at position 252D is located on the bottom left of the CU 250. The candidate predicted motion vector at position 252E is located on the top left of the CU 250. In FIG. 8, an inter prediction module 121 and a motion compensation module may generate candidate predicted motion vector lists. In FIG. 8, the example is explained based on the inter prediction module 121. However, it should be understood that the motion compensation module can implement a same technology, and therefore generate a same candidate predicted motion vector list.

Figure 9:
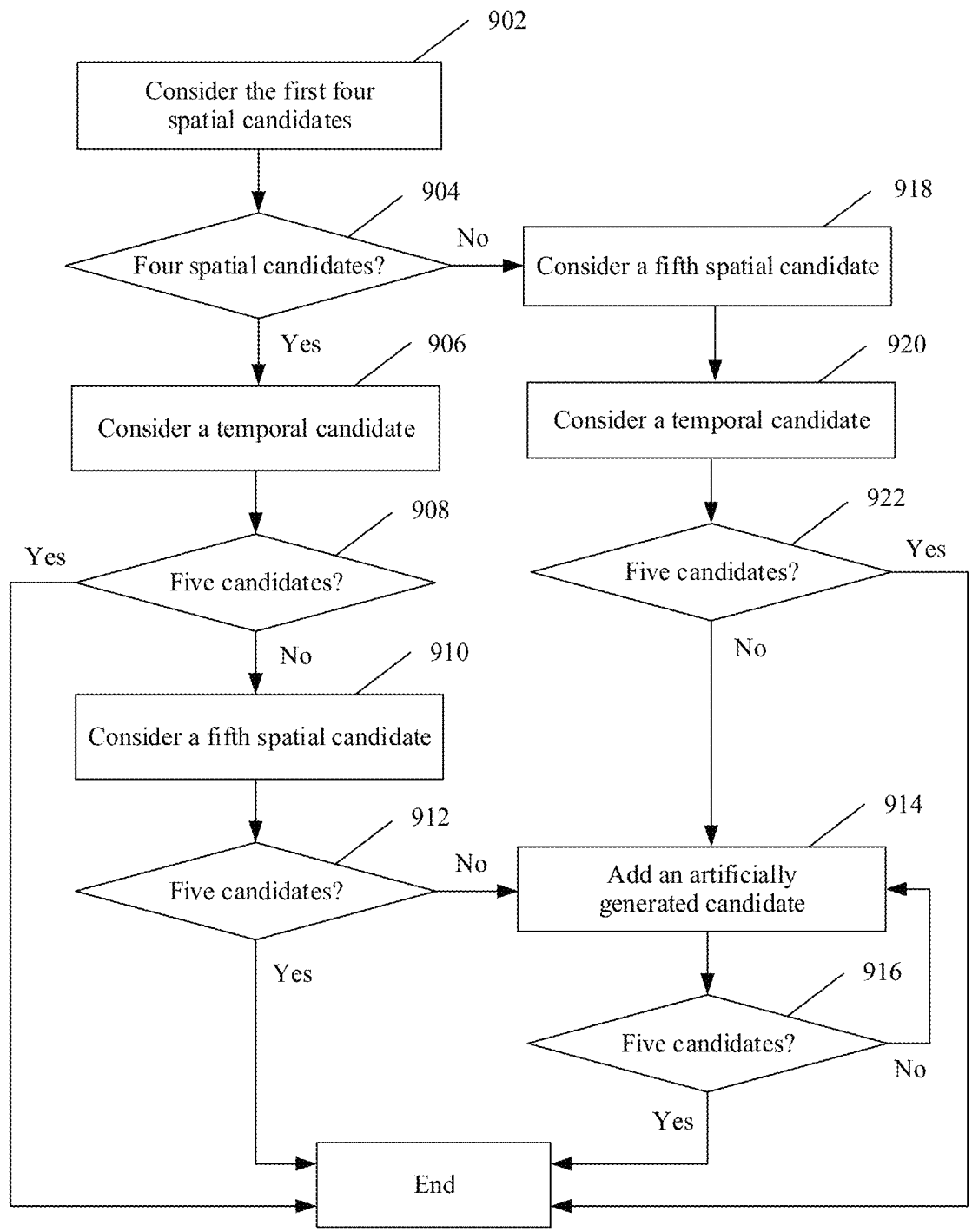
FIG. 9 is a flowchart of an example method of constructing a candidate predicted motion vector list.

FIG. 9 is a flowchart of an example method of constructing a candidate predicted motion vector list according to an embodiment. A technology in FIG. 9 is described based on a list including five candidate predicted motion vectors, but the technologies described in this specification may alternatively be used with a list having another size. The five candidate predicted motion vectors each may have an index (for example, 0 to 4). The technology in FIG. 9 is described based on a general video codec. The general video codec may be, for example, a video encoder (for example, the video encoder 100) or a video decoder (for example, the video decoder 30).

To reconstruct a candidate predicted motion vector list according to the embodiment of FIG. 9, the video decoder first considers four spatial candidate predicted motion vectors (902). The four spatial candidate predicted motion vectors may include candidate predicted motion vectors at positions 252A, 252B, 252C, and 252D. The four spatial candidate predicted motion vectors may correspond to motion information of four PUs that are located in a same picture as a current CU (for example, a CU 250). The video decoder may consider the four spatial candidate predicted motion vectors in the list in a specified order. For example, the candidate predicted motion vector at position 252A may be first considered. If the candidate predicted motion vector at position 252A is available, an index 0 may be assigned to the candidate predicted motion vector at position 252A. If the candidate predicted motion vector at position 252A is unavailable, the video decoder may skip adding the candidate predicted motion vector at position 252A to the candidate predicted motion vector list. A candidate predicted motion vector at position may be unavailable for various reasons. For example, if the candidate predicted motion vector at position does not fall within a current picture, the candidate predicted motion vector at position may be unavailable. In another embodiment, if the candidate predicted motion vector at position undergoes intra prediction, the candidate predicted motion vector at position may be unavailable. In another embodiment, if the candidate predicted motion vector at position is in a slice different from a slice corresponding to the current CU, the candidate predicted motion vector at position may be unavailable.

After considering the candidate predicted motion vector at position 252A, the video decoder may consider the candidate predicted motion vector at position 252B. If the candidate predicted motion vector at position 252B is available and different from the candidate predicted motion vector at position 252A, the video decoder may add the candidate predicted motion vector at position 252B to the candidate predicted motion vector list. In this specific context, the term "same" or "different" means that motion information associated with candidate predicted motion vectors at positions is the same or different. Therefore, if two candidate predicted motion vectors at positions have same motion information, the two candidate predicted motion vectors at positions are considered to be the same; or if two candidate predicted motion vectors at positions have different motion information, the two candidate predicted motion vectors at positions are considered to be different. If the candidate predicted motion vector at position 252A is unavailable, the video decoder may assign the index 0 to the candidate predicted motion vector at position 252B. If the candidate predicted motion vector at position 252A is available, the video decoder may assign an index 1 to the candidate predicted motion vector at position 252B. If the candidate predicted motion vector at position 252B is unavailable or is the same as the candidate predicted motion vector at position 252A, the video decoder skips adding the candidate predicted motion vector at position 252B to the candidate predicted motion vector list.

Similarly, the video decoder considers the candidate predicted motion vector at position 252C to determine whether to add the candidate predicted motion vector at position 252C to the list. If the candidate predicted motion vector at position 252C is available and different from the candidate predicted motion vectors at positions 252B and 252A, the video decoder may assign a next available index to the candidate predicted motion vector at position 252C. If the candidate predicted motion vector at position 252C is unavailable or is the same as at least one of the candidate predicted motion vectors at positions 252A and 252B, the video decoder skips adding the candidate predicted motion vector at position 252C to the candidate predicted motion vector list. Next, the video decoder considers the candidate predicted motion vector at position 252D. If the candidate predicted motion vector at position 252D is available and different from the candidate predicted motion vectors at positions 252A, 252B, and 252C, the video decoder may assign a next available index to the candidate predicted motion vector at position 252D. If the candidate predicted motion vector at position 252D is unavailable or is the same as at least one of the candidate predicted motion vectors at positions 252A, 252B, and 252C, the video decoder skips adding the candidate predicted motion vector at position 252D to the candidate predicted motion vector list. In the foregoing embodiment, an example in which the candidate predicted motion vectors 252A to 252D are considered to determine whether to add the candidate predicted motion vectors 252A to 252D in the candidate predicted motion vector list is generally described. However, in some embodiments, all the candidate predicted motion vectors 252A to 252D may be first added to the candidate predicted motion vector list, and then a repeated candidate predicted motion vector is removed from the candidate predicted motion vector list.

After the video decoder considers the first four spatial candidate predicted motion vectors, the candidate predicted motion vector list may include four spatial candidate predicted motion vectors, or the list may include less than four spatial candidate predicted motion vectors. If the list includes four spatial candidate predicted motion vectors (904, yes), the video decoder considers a temporal candidate predicted motion vector (906). The temporal candidate predicted motion vector may correspond to motion information of a co-located PU of a picture different from the current picture. If the temporal candidate predicted motion vector is available and different from the first four spatial candidate predicted motion vectors, the video decoder assigns an index 4 to the temporal candidate predicted motion vector. If the temporal candidate predicted motion vector is unavailable or is the same as one of the first four spatial candidate predicted motion vectors, the video decoder skips adding the temporal candidate predicted motion vector to the candidate predicted motion vector list. Therefore, after the video decoder considers the temporal candidate predicted motion vector (906), the candidate predicted motion vector list may include five candidate predicted motion vectors (the first four spatial candidate predicted motion vectors considered in 902 and the temporal candidate predicted motion vector considered in 906) or may include four candidate predicted motion vectors (the first four spatial candidate predicted motion vectors considered in 902). If the candidate predicted motion vector list includes five candidate predicted motion vectors (908, yes), the video decoder completes construction of the list.

If the candidate predicted motion vector list includes four candidate predicted motion vectors (908, no), the video decoder may consider a fifth spatial candidate predicted motion vector (910). The fifth spatial candidate predicted motion vector may (for example) correspond to a candidate predicted motion vector at position 252E. If the candidate predicted motion vector at the position 252E is available and different from the candidate predicted motion vectors at the positions 252A, 252B, 252C, and 252D, the video decoder may add the fifth spatial candidate predicted motion vector to the candidate predicted motion vector list, and assign the index 4 to the fifth spatial candidate predicted motion vector. If the candidate predicted motion vector at the position 252E is unavailable or is the same as one of the candidate predicted motion vectors at the positions 252A, 252B, 252C, and 252D, the video decoder may skip adding the candidate predicted motion vector at the position 252E to the candidate predicted motion vector list. Therefore, after the fifth spatial candidate predicted motion vector is considered (910), the list may include five candidate predicted motion vectors (the first four spatial candidate predicted motion vectors considered in 902 and the fifth spatial candidate predicted motion vector considered in 910) or may include four candidate predicted motion vectors (the first four spatial candidate predicted motion vectors considered in 902).

If the candidate predicted motion vector list includes five candidate predicted motion vectors (912, yes), the video decoder completes generation of the candidate predicted motion vector list. If the candidate predicted motion vector list includes four candidate predicted motion vectors (912, no), the video decoder adds an artificially generated candidate predicted motion vector (914) until the list includes five candidate predicted motion vectors (916, yes).

If the list includes less than four spatial candidate predicted motion vectors (904, no) after the video decoder considers the first four spatial candidate predicted motion vectors, the video decoder may consider a fifth spatial candidate predicted motion vector (918). The fifth spatial candidate predicted motion vector may (for example) correspond to a candidate predicted motion vector at position 252E. If the candidate predicted motion vector at the position 252E is available and different from the existing candidate predicted motion vectors in the candidate predicted motion vector list, the video decoder may add the fifth spatial candidate predicted motion vector to the candidate predicted motion vector list, and assign a next available index to the fifth spatial candidate predicted motion vector. If the candidate predicted motion vector at the position 252E is unavailable or is the same as one of the existing candidate predicted motion vectors in the candidate predicted motion vector list, the video decoder may skip adding the candidate predicted motion vector at the position 252E to the candidate predicted motion vector list. Next, the video decoder may consider a temporal candidate predicted motion vector (920). If the temporal candidate predicted motion vector is available and different from the existing candidate predicted motion vectors in the candidate predicted motion vector list, the video decoder may add the temporal candidate predicted motion vector to the candidate predicted motion vector list, and assign a next available index to the temporal candidate predicted motion vector. If the temporal candidate predicted motion vector is unavailable or is the same as one of the existing candidate predicted motion vectors in the candidate predicted motion vector list, the video decoder may skip adding the temporal candidate predicted motion vector to the candidate predicted motion vector list.

If the candidate predicted motion vector list includes five candidate predicted motion vectors (922, yes) after the fifth spatial candidate predicted motion vector (in 918) and the temporal candidate predicted motion vector (in 920) are considered, the video decoder completes generation of the candidate predicted motion vector list. If the candidate predicted motion vector list includes less than five candidate predicted motion vectors (922, no), the video decoder adds an artificially generated candidate predicted motion vector (914) until the list includes five candidate predicted motion vectors (916, yes).

According to the technologies in this application, an additional merge candidate predicted motion vector may be artificially generated after a spatial candidate predicted motion vector and a temporal candidate predicted motion vector, so that a size of a merge candidate predicted motion vector list is fixed and the merge candidate predicted motion vector list includes a specified quantity (for example, five in the foregoing embodiment in FIG. 9) of merge candidate predicted motion vectors. The additional merge candidate predicted motion vector may include examples of a combined bi-predictive merge candidate predicted motion vector (a candidate predicted motion vector 1), a scaled bi-predictive merge candidate predicted motion vector (a candidate predicted motion vector 2), and a zero-vector merge/AMVP candidate predicted motion vector (a candidate predicted motion vector 3).

Figure 10:
FIG. 10 is a schematic diagram of an example process of adding a combined candidate motion vector to a merge-mode candidate predicted motion vector list.
Figure 10:
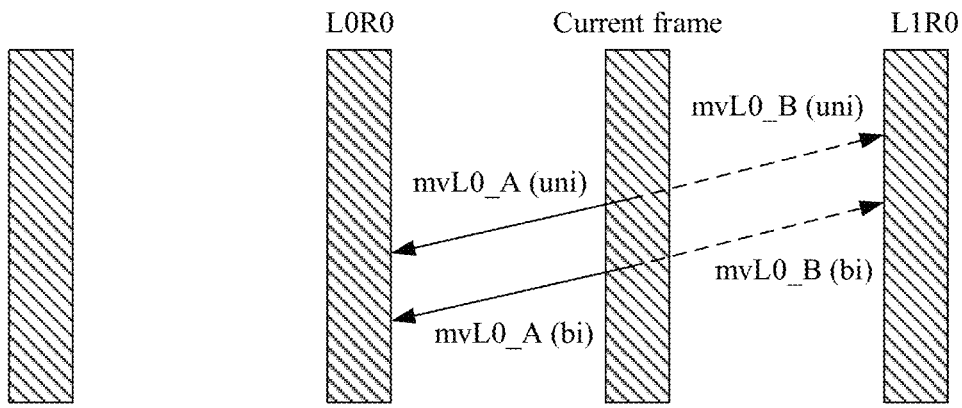

FIG. 10 is a schematic diagram of an example of adding a combined candidate motion vector to a merge-mode candidate predicted motion vector list according to an embodiment. A combined bi-predictive merge candidate predicted motion vector may be generated by combining original merge candidate predicted motion vectors. For example, two original candidate predicted motion vectors (which have mvL0 and refIdxL0 or mvL1 and refIdxL1) may be used to generate the bi-predictive merge candidate predicted motion vector. In FIG. 10, two candidate predicted motion vectors are included in an original merge candidate predicted motion vector list. A prediction type of one candidate predicted motion vector is uni-prediction by using a list 0, and a prediction type of the other candidate predicted motion vector is uni-prediction by using a list 1. In this embodiment, mvL0_A and ref0 are obtained from the list 0, and mvL1_B and ref0 are obtained from the list 1. Then, a bi-predictive merge candidate predicted motion vector (which has mvL0_A and ref0 in the list 0 and mvL1_B and ref0 in the list 1) may be generated, and whether the bi-predictive merge candidate predicted motion vector is different from an existing candidate predicted motion vector in the candidate predicted motion vector list is checked. If the bi-predictive merge candidate predicted motion vector is different from the existing candidate predicted motion vector, a video decoder may add the bi-predictive merge candidate predicted motion vector to the candidate predicted motion vector list.

Figure 11:
FIG. 11 is a schematic diagram of an example process of adding a scaled candidate motion vector to a merge-mode candidate predicted motion vector list.
Figure 11:
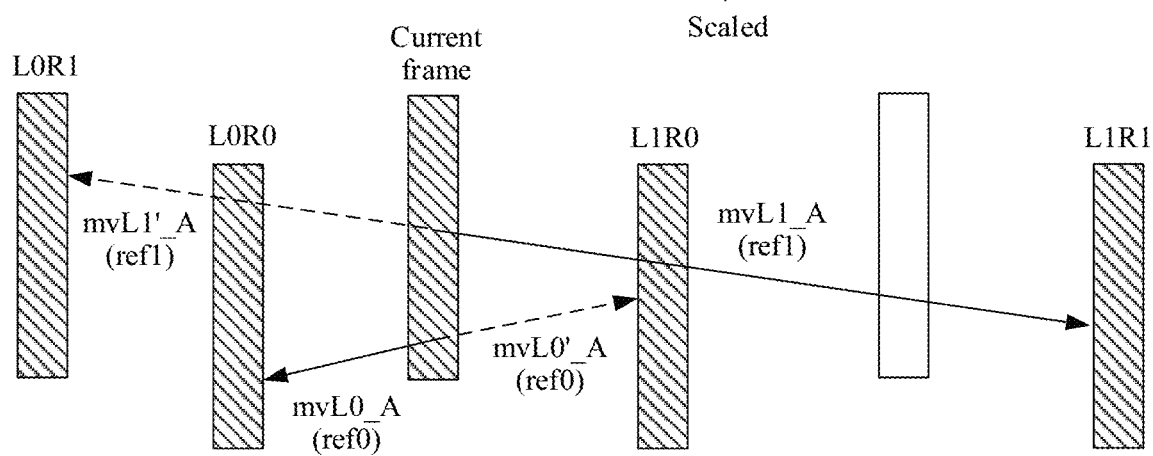

FIG. 11 is a schematic diagram of an example process of adding a scaled candidate motion vector to a merge-mode candidate predicted motion vector list according to an embodiment. A scaled bi-predictive merge candidate predicted motion vector may be generated by scaling an original merge candidate predicted motion vector. Specifically, one original candidate predicted motion vector (which has mvLX and refIdxLX) may be used to generate the bi-predictive merge candidate predicted motion vector. In an embodiment in FIG. 11, two candidate predicted motion vectors are included in an original merge candidate predicted motion vector list. A prediction type of one candidate predicted motion vector is uni-prediction by using a list 0, and a prediction type of the other candidate predicted motion vector is uni-prediction by using a list 1. In this embodiment, mvL0_A and ref0 may be obtained from the list 0, and ref0 may be copied to the list 1 and is denoted as a reference index ref0'. Next, mvL0'_A may be calculated by scaling myL0_A having ref0 and ref0'. Scaling may depend on a POC (Picture Order Count) distance. Then, a bi-predictive merge candidate predicted motion vector (which has myL0_A and ref0 in the list 0 and myL0'_A and ref0' in the list 1) may be generated, and whether the bi-predictive merge candidate predicted motion vector is repeated is checked. If the bi-predictive merge candidate predicted motion vector is not repeated, the bi-predictive merge candidate predicted motion vector may be added to the merge candidate predicted motion vector list.

FIG. 12 is a schematic diagram of an example of adding a zero motion vector to a merge-mode candidate predicted motion vector list according to an embodiment. A zero-vector merge candidate predicted motion vector may be generated by combining a zero vector and a reference index that can be referenced. If the zero-vector merge candidate predicted motion vector is not repeated, the zero-vector merge candidate predicted motion vector may be added to a merge candidate predicted motion vector list. Motion information of each generated merge candidate predicted motion vector may be compared with motion information of a previous candidate predicted motion vector in the list.

In an embodiment, if a newly generated candidate predicted motion vector is different from an existing candidate predicted motion vector in the candidate predicted motion vector list, the generated candidate predicted motion vector is added to the merge candidate predicted motion vector list. A process of determining whether the candidate predicted motion vector is different from the existing candidate predicted motion vector in the candidate predicted motion vector list is sometimes referred to as pruning. Through pruning, each newly generated candidate predicted motion vector may be compared with the existing candidate predicted motion vector in the list. In some embodiments, a pruning operation may include: comparing one or more new candidate predicted motion vectors with the existing candidate predicted motion vector in the candidate predicted motion vector list, and skipping adding a new candidate predicted motion vector that is the same as the existing candidate predicted motion vector in the candidate predicted motion vector list. In some embodiments, a pruning operation may include: adding one or more new candidate predicted motion vectors to the candidate predicted motion vector list, and then removing a repeated candidate predicted motion vector from the list.

The following describes several inter prediction embodiments. A first preset algorithm and a second preset algorithm in this application may include one or more of the inter prediction embodiments.

Inter-picture prediction uses a temporal correlation between pictures to derive a motion-compensated prediction (MCP) for a block of picture samples.

For this block-based MCP, a video picture is divided into rectangular blocks. Assuming that homogeneous motion occurs inside one block and that moving objects are larger than one block, for each block, a corresponding block in a previously decoded picture can be found and serves as a prediction value. Using a translation motion model, a position of the block in the previously decoded picture is indicated by a motion vector ($\Delta x$, $\Delta y$), where $\Delta x$ specifies a horizontal displacement relative to the position of the current block, and $\Delta y$ specifies a vertical displacement relative to the position of the current block. The motion vector ($\Delta x$, $\Delta y$) may have fractional sample accuracy to more accurately capture movement of an underlying object. When the corresponding motion vector has fractional sample accuracy, interpolation is applied on a reference picture to derive a prediction signal. The previously decoded picture is referred to as a reference picture and indicated by a reference index $\Delta t$ corresponding to a reference picture list. These translational motion model parameters, namely, the motion vector and the reference index, are further referred to as motion data. Two types of inter-picture prediction are allowed in modern video coding standards, namely, uni-prediction and bi-prediction.

In case of bi-prediction, two sets of motion data ($\Delta x0$, $\Delta y0$, $\Delta t0$, and $\Delta x1$, $\Delta y1$, $\Delta t1$) are used to generate two MCPs (possibly from different pictures), which are then combined to get a final MCP. Per default, this is done by averaging but in case of weighted prediction, different weights can be applied to each MCP, for example, to compensate for scene fade outs. Reference pictures that can be used in bi-prediction are stored in two separate lists, namely, a list 0 and a list 1. To limit a memory bandwidth in a slice that allows bi-prediction, the HEVC standard restricts a PU with 4×8 or 8×4 luma prediction blocks to using uni-prediction only. Motion data is derived at an encoder by using a motion estimation process. Motion estimation is not specified within video standards, so that different encoders can utilize different complexity-quality tradeoffs during implementations of the encoders.

Motion data of a block is correlated with a neighboring block. To exploit this correlation, the motion data is not directly coded in a bitstream, but predictively coded based on neighboring motion data. In HEVC, two concepts are used for that. Predictive coding of a motion vector was improved in HEVC by introducing a new tool called advanced motion vector prediction (AMVP), where a best prediction value for each motion block is signaled to a decoder. In addition, a new technology called inter-prediction block merging is used to derive all motion data of a block from neighboring blocks. In this way, a direct mode and a skip mode in H.264/AVC are replaced.

Advanced Motion Vector Prediction

As described in previous video coding standards, an HEVC motion vector is coded as a difference to a motion vector prediction value (MVP) based on a horizontal (x) component and a vertical (y) component. Two motion vector difference (MVD) components are calculated according to equations (1.1) and (1.2).

$$MVD_X = \Delta x - MVP_X \quad (1.1)$$

$$MVD_Y = \Delta y - MVP_Y \quad (1.2)$$

A motion vector of a current block is usually correlated with a motion vector of a neighboring block in a current picture or an earlier coded picture. This is because the neighboring block is likely to correspond to a same moving object with similar motion, and the motion of the object is not likely to change abruptly over time. Therefore, using the motion vector of the neighboring block as a prediction value reduces a signaled motion vector difference. An MVP is usually derived from an already decoded motion vector of a spatial neighboring block or a temporal neighboring block in a co-located picture. In some cases, a zero motion vector may alternatively be used as an MVP. In H.264/AVC, this is implemented by executing a component wise median of three spatial neighboring motion vectors. Using this approach, no signaling of the prediction value is required. A temporal MVP from the co-located picture is considered only in the so called temporal direct mode in H.264/AVC. The H.264/AVC direct mode is also used to derive other motion data than the motion vector.

In HEVC, the approach for implicitly deriving the MVP was replaced by a technology known as motion vector competition. The technology explicitly signals which MVP from a list of MVPs is used for motion vector derivation. A variable coding quadtree block structure in HEVC can cause one block having several neighboring blocks with motion vectors to serve as potential MVP candidates. The initial design of advanced motion vector prediction (AMVP) included five MVPs from three different classes of prediction values: three motion vectors from spatial neighbors, a median of the three spatial prediction values, and a scaled motion vector from a co-located temporally neighboring block. Furthermore, a list of prediction values was modified by reordering to place the most probable motion prediction value in the first position and by removing a redundant candidate to assure a minimal signaling overhead. Then, significant simplifications of the AMVP design are developed such as removing the median prediction value, reducing a quantity of candidates in the list from five to two, fixing a candidate order in the list, and reducing a quantity of redundancy checks. A final design of AMVP candidate list construction includes the following two MVP candidates: a. up to two spatial candidate MVPs derived from five spatial neighboring blocks; b. one temporal candidate MVP derived from two temporal co-located blocks when both spatial candidate MVPs are unavailable or identical; and c. a zero motion vector when the spatial candidates, the temporal candidate, or both the spatial candidates and the temporal candidate are unavailable.

As already mentioned, two spatial MVP candidates A and B are derived from the five spatial neighboring blocks. Positions of the spatial candidate blocks are the same for both AMVP and inter-prediction block merging. For a candidate A, motion data of two blocks A0 and A1 at the bottom left corner is taken into account in a two-pass approach. In a first pass, whether any of the candidate blocks includes a reference index that is equal to a reference index of the current block is checked. A first motion vector that is found is used as the candidate A. When all reference indexes from A0 and A1 are pointing to a different reference picture than the reference index of the current block, an associated motion vector cannot be used as is. Therefore, in a second pass, the motion vector needs to be scaled based on a temporal distance between a candidate reference picture and a current reference picture. Equation (1.3) shows how a candidate motion vector $mv_{cand}$ is scaled based on a scale factor. ScaleFactor is calculated based on a temporal distance between the current picture and a reference picture of a candidate block td and a temporal distance between the current picture and a reference picture of the current block tb. The temporal distance is expressed in terms of a difference between picture order count (POC) values that define a display order of pictures. A scaling operation is basically the same as a scheme that is used for the temporal direct mode in H.264/AVC. This factoring allows pre-computation of ScaleFactor at a slice level because this factoring depends only on a reference picture list structure signaled in a slice header. It should be noted that MV scaling is performed only when both the current reference picture and the candidate reference picture are short-term reference pictures. A parameter td is defined as a POC difference between a co-located picture and a reference picture for a co-located candidate block.

$$mv = \text{sign}(mv_{cand} \cdot ScaleFactor)((|mv_{cand} \cdot ScaleFactor| + 27) >> 8) \quad (1.3)$$

$$ScaleFactor = clip(-2^{12}, 2^{12} - 1, (tb \cdot tx + 2^5) >> 6) \quad (1.4)$$

$$tx = \frac{2^{14} + \left|\frac{td}{2}\right|}{td} \quad (1.5)$$

For a candidate B, candidates B0 to B2 are sequentially checked in a manner the same as a manner in which A0 and A1 are checked in the first pass. However, the second pass is performed only when the blocks A0 and A1 do not include any motion information, in other words, when the blocks A0 and A1 are unavailable or coded through intra-picture prediction. Then, if the candidate A is found, the candidate A is set equal to the non-scaled candidate B, and the candidate B is set equal to a second non-scaled or scaled variant of the candidate B. In the second pass, searching is performed to derive a non-scaled MV and a scaled MV from the candidates B0 to B2. Overall, this design allows to process A0 and A1 independently from B0, B1, and B2. Derivation of B should only be aware of availability of both A0 and A1, to perform searching to derive a scaled MV or an additional non-scaled MV from B0 to B2. This dependency is acceptable given that it significantly reduces a complex motion vector scaling operation for the candidate B. Reducing a quantity of motion vector scaling represents a significant complexity reduction in a motion vector prediction value derivation process.

In HEVC, blocks on the bottom right and at a center of the current block have been determined to be the most suitable blocks to provide a good temporal motion vector prediction value (TMVP). Among these candidates, C0 represents a bottom-right neighboring block, and C1 represents a center block. Herein again, motion data of C0 is first considered. If the motion data of C0 is unavailable, motion data of a co-located candidate block at the center is used to derive a temporal MVP candidate C. The motion data of C0 is also considered to be unavailable when an associated PU belongs to a CTU that is beyond a current CTU row. This minimizes a memory bandwidth requirement for storing co-located motion data. In contrast to spatial MVP candidates whose motion vectors may refer to a same reference picture, motion vector scaling is mandatory for the TMVP. Therefore, a scaling operation the same as that for the spatial MVP is used.

Although the temporal direct mode in H.264/AVC always refers to a first reference picture in a second reference picture list, namely, the list 1, and is allowed only in a bi-predictive slice, HEVC provides a possibility of indicating, for each picture, which reference picture is considered as a co-located picture. This is implemented by signaling a co-located reference picture list and a reference picture index in a slice header and by requiring that these syntax elements in all slices in a picture specify a same reference picture.

Because the temporal MVP candidate introduces an additional dependency, use of the temporal MVP candidate may need to be disabled due to error robustness. In H.264/AVC, there is a possibility of disabling the temporal direct mode for the bi-predictive slice in the slice header (direct_spatial_mvpred_flag). HEVC syntax extends this signaling by allowing to disable the TMVP at a sequence level or a picture level (sps/slice_temporal_mvp_enabled_flag). Although a flag is signaled in the slice header, it is a requirement of bitstream conformance that a value of the flag shall be the same for all slices in one picture. Because signaling of a picture-level flag depends on an SPS flag, signaling of the picture-level flag in a PPS may introduce a parsing dependency between an SPS and the PPS. Another advantage of this slice header signaling is as follows: If only a value of this flag in the PPS is desired to be changed without changing another parameter, there is no need to transmit a second PPS.

In general, motion data signaling in HEVC is similar to motion data signaling in H.264/AVC. An inter-picture prediction syntax element, inter_pred_idc, signals whether a reference list 0, a reference list 1, or both a reference list 0 and a reference list 1 are used. For each MCP obtained from one reference picture list, a corresponding reference picture (Δt) is signaled by an index to the reference picture list, ref_idx_l0/1, and an MV (Δx, Δy) is represented by an index to the MVP, mvp_l0/1_flag, and an MVD of the MVP. A newly introduced flag in the slice header, mvd_l1_zero_flag, indicates whether an MVD for the second reference picture list is equal to zero, and therefore is not signaled in a bitstream. When the motion vector is fully reconstructed, a final clipping operation assures that a value of each component of the final motion vector always falls within a range of $-2^{15}$ to $2^{15}-1$, inclusive.

Inter-Picture Prediction Block Merging

An AMVP list includes only a motion vector for one reference list, while a merge candidate includes all motion data including information about whether one or two reference picture lists are used as well as a reference index and a motion vector for each list. Overall, a merge candidate list is constructed based on the following candidates: a. up to four spatial merge candidates derived from five spatial neighboring blocks; b. one temporal merge candidate derived from two temporal co-located blocks; and c. additional merge candidates including a combined bi-predictive candidate and a zero motion vector candidate.

A first candidate in the merge candidate list is a spatial neighbor. A1, B1, B0, A0, and B2 are sequentially checked, and up to four candidates may be inserted in the merge list in this order.

Instead of just checking whether a neighboring block is available and includes motion information, some additional redundancy checks are performed before all motion data of the neighboring block is used as a merge candidate. These redundancy checks can be divided into two categories for two different purposes: a. avoid having a candidate with redundant motion data in the list; and b. prevent merging two partitions that can be expressed by other means which may create redundant syntax.

When N represents a quantity of spatial merge candidates, a complete redundancy check consists of $$\frac{N \cdot (N-1)}{2}$$

motion data comparisons. In case of five potential spatial merge candidates, 10 motion data comparisons need to be performed to assure that all candidates in the merge list have different motion data. During the development of HEVC, the checks for redundant motion data have been reduced to a subset, so that coding efficiency is kept while comparison logic is significantly reduced. In the final design, no more than two comparisons are performed per candidate, and there are a total of five comparisons. Given the order of {A1, B1, B0, A0, B2}, B0 only checks B1, A0 only A1 and B2 only A1 and B1. In an embodiment in which a partitioning redundancy check is performed, a bottom PU of a 2N×N partition is merged with a top PU by selecting the candidate B1. In this case, one CU has two PUs with the same motion data. The CU may be equally signaled as a 2N×2N CU. Overall, this check applies for all second PUs of rectangular and asymmetrical partitions: 2N×N, 2N×nU, 2N×nD, N×2N, nR×2N, and nL×2N. It should be noted that for the spatial merge candidates, only a redundancy check is performed and motion data is copied from the candidate blocks as it is. Therefore, no motion vector scaling is required herein.

A motion vector of a temporal merge candidate is derived in a manner the same as a manner of deriving a TMVP. Because a merge candidate includes all motion data and the TMVP is only one motion vector, derivation of the whole motion data depends only on a slice type. For a bi-predictive slice, a TMVP is derived for each reference picture list. Depending on availability of the TMVP for each list, a prediction type is set to bi-prediction or to a list for which the TMVP is available. All associated reference picture indexes are set equal to zero. Therefore, for a uni-predictive slice, only a TMVP for a list 0 is derived together with the reference picture index equal to zero.

When at least one TMVP is available and the temporal merge candidate is added to the list, no redundancy check is performed. This makes construction of the merge list independent of a co-located picture, and therefore improves error resilience. When a case in which the temporal merge candidate is redundant and therefore not included in the merge candidate list is considered, and the co-located picture is lost, a decoder cannot derive the temporal candidate, and therefore does not check whether the temporal candidate is redundant. This affects indexing of all subsequent candidates.

For the sake of parsing robustness, the merge candidate list has a fixed length. After spatial and temporal merge candidates have been added, the list may still not reach the fixed length. To compensate for a coding efficiency loss that comes along with non-length adaptive list index signaling, an additional candidate is generated. Depending on the slice type, up to two types of candidates can be used to fully populate the list: a. a combined bi-predictive candidate; and b. a zero motion vector candidate.

In the bi-predictive slice, an additional candidate may be generated based on an existing candidate by combining reference picture list-0 motion data of one candidate and reference picture list-1 motion data of another candidate. This is implemented by copying $\Delta x_0$, $\Delta y_0$, and $\Delta t_0$ from one candidate such as a first candidate and copying $\Delta x_1$, $\Delta y_1$, and $\Delta t_1$ from another candidate such as a second candidate. Different combinations are predefined and given in Table 1.1.

TABLE 1.1

| Combination order | 0 | 1 | 2 | 3 | 4 | 5 | 6 | 7 | 8 | 9 | 10 | 11 |
|---|---|---|---|---|---|---|---|---|---|---|---|---|
| $\Delta x_0$, $\Delta y_0$, and $\Delta t_0$ from a candidate | 0 | 1 | 0 | 2 | 1 | 2 | 0 | 3 | 1 | 3 | 2 | 3 |
| $\Delta x_1$, $\Delta y_1$, and $\Delta t_1$ from a candidate | 1 | 0 | 2 | 0 | 2 | 1 | 3 | 0 | 3 | 1 | 3 | 2 |

When the list is still not full after the combined bi-predictive candidate is added or not full for a uni-predictive slice, a zero motion vector candidate is calculated to complete the list. All zero motion vector candidates have one zero displacement motion vector for a uni-predictive slice and two zero displacement motion vectors for a bi-predictive slice. A reference index is set equal to zero and is incremented by one for each additional candidate until a maximum quantity of reference indexes is reached. In this case, if there are still other candidates missing, a reference index equal to zero is used to create these candidates. For all the additional candidates, no redundancy checks are performed because it turned out that omitting these checks does not introduce a coding efficiency loss.

For each PU coded based on an inter-picture prediction mode, merge_flag indicates that block merging is used to derive motion data, and merge_idx is further used to determine a candidate that is in the merge list and that provides all motion data required for an MCP. In addition to this PU-level signaling, a quantity of candidates in the merge list is signaled in a slice header. Because a default value is 5, it is represented as a difference to five (five_minus_max_num_merge_cand). In this way, 5 is signaled with a short codeword for the 0. If only one candidate is used, 5 is signaled with a longer codeword for the 4. Regarding impact on a merge candidate list construction process, the overall process remains the same although the process terminates after the list includes a maximum quantity of merge candidates. In the initial design, a maximum value for coding of a merge index is given by a quantity of available spatial and temporal candidates in the list. For example, when only two candidates are available, the index can be efficiently coded as a flag. However, to parse the merge index, the whole merge candidate list has to be constructed to know an actual quantity of candidates. Assuming that a neighboring block is unavailable due to a transmission error, the merge index can no longer be parsed.

A crucial application of the block merging concept in HEVC is its combination with a skip mode. In previous video coding standards, the skip mode is used to indicate for a block that motion data is inferred instead of explicitly signaled and that a prediction residual is zero. In other words, no transform coefficient is sent. In HEVC, at the beginning of each CU in an inter-picture prediction slice, skip_flag is signaled that implies the following: a. The CU includes only one PU (2N×2N partition type). b. The merge mode is used to derive the motion data (merge_flag equal to 1). c. No residual data is present in a bitstream.

A parallel merge estimation level that indicates a region is introduced in HEVC. A merge candidate list can be independently derived by checking whether a candidate block is located in that merge estimation region (MER). A candidate block in the same MER is not included in the merge candidate list. Therefore, motion data of the candidate block does not need to be available during construction of the list. When this level is, for example, 32, all prediction units in a 32×32 region can be used to construct the merge candidate list in parallel, because all merge candidates in the same 32×32 MER are not inserted in the list. All potential merge candidates for a first PU 0 are available because all the potential merge candidates are outside a first 32×32 MER. For a second MER, merge candidate lists for PUs 2 to 6 cannot include motion data from these PUs when merge estimation inside the MER should be independent. Therefore, for example, when a PU 5 is viewed, a merge candidate is not available and therefore not inserted in the merge candidate list. In this case, the merge list for the PU5 includes only a temporal candidate (if available) and a zero MV candidate. To enable an encoder to trade off parallelism and coding efficiency, the parallel merge estimation level is adaptive and signaled as log 2_parallel_merge_level_minus2 in a picture parameter set.

Sub-CU Based Motion Vector Prediction

During the development of a new video coding technology, with QTBT, each CU can have at most one set of motion parameters for each prediction direction. Two sub-CU level motion vector prediction methods are considered in an encoder by partitioning a large CU into sub-CUs and deriving motion information for all sub-CUs of the large CU. An alternative temporal motion vector prediction (ATMVP) method allows each CU to fetch a plurality of sets of motion information from a plurality of blocks smaller than the current CU in a collocated reference picture. In a spatial-temporal motion vector prediction (STMVP) method, a motion vector of a sub-CU is derived recursively by using a temporal motion vector prediction value and a spatial neighboring motion vector.

To preserve a more accurate motion field for sub-CU motion prediction, motion compression for a reference frame is currently disabled.

Alternative Temporal Motion Vector Prediction

In an alternative temporal motion vector prediction (ATMVP) method, temporal motion vector prediction (TMVP) for a motion vector is modified by fetching a plurality of sets of motion information (including motion vectors and reference indexes) from blocks smaller than a current CU. A sub-CU is a square N×N block (where N is set to 4 by default).

The ATMVP predicts a motion vector of the sub-CU in the CU in two steps. A first step is to identify a corresponding block in a reference picture by using a temporal vector. The reference picture is called a motion source picture. A second step is to partition the current CU into sub-CUs and obtain a motion vector and a reference index of each sub-CU from the block corresponding to the sub-CU.

In the first step, the reference picture and the corresponding block are determined based on motion information of a spatial neighboring block of the current CU. To avoid a repetitive scanning process for a neighboring block, a first merge candidate in a merge candidate list for the current CU is used. A first available motion vector and a reference index associated with the first available motion vector are set to be a temporal vector and an index of the motion source picture. In this way, in comparison with the TMVP, in the ATMVP, the corresponding block may be more accurately identified. In the TMVP, the corresponding block (sometimes called a collocated block) is always located at a bottom right or center position relative to the current CU.

In the second step, the corresponding block of the sub-CU is identified by the temporal vector in the motion source picture by adding the temporal vector to coordinates of the current CU. For each sub-CU, motion information of a corresponding block (the smallest motion grid covering a center sample) of the sub-CU is used to derive motion information for the sub-CU. After motion information of a corresponding N×N block is identified, the motion information is converted into a motion vector and a reference index of the current sub-CU in a manner the same as the TMVP in HEVC, and motion scaling and other procedures apply. For example, a decoder checks whether a low-delay condition (that is, POCs of all reference pictures of a current picture are smaller than a POC of the current picture) is satisfied, and possibly uses a motion vector MVx (a motion vector corresponding to a reference picture list X) to predict a motion vector MVy (with X being equal to 0 or 1 and Y being equal to 1 X) for each sub-CU.

Spatial-Temporal Motion Vector Prediction

In this method, a motion vector of a sub-CU is derived recursively, following a raster scan order. It is considered that an 8×8 CU includes four 4×4 sub-CUs A, B, C, and D. Neighboring 4×4 blocks in a current frame are labeled as a, b, c, and d.

Motion derivation for the sub-CU A starts by identifying two spatial neighbors of the sub-CU A. A first neighbor is an N×N block above the sub-CU A (namely, the block c). If the block c is unavailable or is intra coded, other N×N blocks above the sub-CU A are checked (from left to right, starting at the block c). A second neighbor is a block on the left of the sub-CU A (namely, the block b). If the block b is unavailable or intra coded, other blocks on the left of the sub-CU A are checked (from top to bottom, starting at the block b). Motion information obtained from a neighboring block for each list is scaled to a first reference frame for a given list. Next, a temporal motion vector prediction value (TMVP) of the subblock A is derived by following the same procedure of TMVP derivation as specified in HEVC. Motion information of a collocated block at the position D is fetched and scaled accordingly. Finally, after motion information is retrieved and scaled, all available motion vectors (up to 3) are averaged separately for each reference list. An averaged motion vector is assigned as a motion vector of a current sub-CU.

Combined with Merge Mode

As an additional merge candidate, a sub-CU mode is enabled and no additional syntax element is required to signal the mode. Two additional merge candidates are added to a merge candidate list for each CU to represent an ATMVP mode and an STMVP mode. If a sequence parameter set indicates that ATMVP and STMVP are enabled, up to seven merge candidates are used. Encoding logic of the additional merge candidates is the same as encoding logic of a merge candidate in HM. This means that for each CU in a P or B slice, two more RD checks need to be performed on the two additional merge candidates.

Affine Motion Compensation Prediction

An affine motion field of a block is described by using two control point motion vectors.

A motion vector field (MVF) of a block is described according to the following equation:

$$\begin{cases} v_x = \frac{(v_{1x} - v_{0x})}{W}x - \frac{(v_{1y} - v_{0y})}{W}y + v_{0x} \\ v_x = \frac{(v_{1y} - v_{0y})}{W}x + \frac{(v_{1x} - v_{0x})}{W}y + v_{0y} \end{cases} \quad (1.6)$$

where $(v_{0x}, v_{0y})$ represents a motion vector of a top-left corner control point, and $(v_{1x}, v_{1y})$ represents a motion vector of a top-right corner control point.

To further simplify motion compensation prediction, sub-block-based affine transformation prediction is applied. A subblock size M×N is derived according to Equation (1.7), where MvPre represents motion vector fractional accuracy (for example, 1/16), and $(v_{2x}, v_{2y})$ represents a motion vector of a bottom-left control point calculated according to Equation (1.6).

$$\begin{cases} M = clip3\left(4, w, \frac{w \times Mvpre}{\max(abs(v_{1x} - v_{0x}), abs(v_{1y} - v_{0y}))}\right) \\ N = clip3\left(4, h, \frac{h \times Mvpre}{\max(abs(v_{2x} - v_{0x}), abs(v_{2y} - v_{0y}))}\right) \end{cases} \quad (1.7)$$

After the sub-block size M×N is derived according to Equation (1.7), M and N should be adjusted downward if necessary to make M and N be divisors of w and h, respectively.

To derive a motion vector of each M×N subblock, a motion vector of a center sample of the sub-block is calculated according to Equation (1.6), and rounded to 1/16 fractional accuracy.

Affine Inter Mode

For a CU whose width and height are both larger than 8, the AF_INTER mode can be applied. An affine flag at a CU level is signaled in a bitstream to indicate whether the AF_INTER mode is used. In this mode, a candidate list with a motion vector pair $\{(v_0, v_1)|v_0=\{v_A, v_B, v_C\}, v_1=\{v_D, v_E\}\}$ is constructed by using a neighboring block. $v_0$ is selected from a motion vector of a block A, B, or C. A motion vector from a neighboring block is scaled according to a reference list and a relationship among a POC of a reference for the neighboring block, a POC of a reference for a current CU, and a POC of the current CU. An approach used to select $v_1$ from neighboring blocks D and E is similar. If a quantity of candidate lists is smaller than 2, the list is padded by a motion vector pair composed by duplicating each AMVP candidate. When a quantity of candidate lists is larger than 2, candidates are first sorted according to consistency of neighboring motion vectors (similarity of two motion vectors in a pair candidate) and only the first two candidates are kept. An RD cost check is used to determine which motion vector pair candidate is selected as control point motion vector prediction (CPMVP) of the current CU, and an index indicating a position of the CPMVP in the candidate list is signaled in the bitstream. A difference between a CPMV and the CPMVP is signaled in the bitstream.

Affine Merge Mode

When a CU is applied in the AF_MERGE mode, a first block coded based on the affine mode is obtained from a valid neighboring reconstructed block. A selection order for candidate blocks is from left, top, top right, bottom left, to top left. If a bottom-left neighboring block A is coded based on the affine mode, top-left, top-right, and bottom-left motion vectors $v_2$, $v_3$, and $v_4$ of the CU including the block A are derived. In addition, a top-left motion vector $v_0$ of the current CU is calculated according to $v_2$, $v_3$, and $v_4$. Then, a top-right motion vector $v_1$ of the current CU is calculated.

To identify whether the current CU is coded based on the AF_MERGE mode, when there is at least one neighboring block that is coded based on the affine mode, an affine flag is signaled in a bitstream.

Pattern Matched Motion Vector Derivation

A pattern matched motion vector derivation (PMMVD) mode is based on frame-rate up conversion (FRUC) technologies. In this mode, motion information of a block is not signaled, but derived on a decoder side.

When a merge flag of a CU is true, an FRUC flag of the CU is signaled. When an FRUC flag is false, a merge index is signaled, and a regular merge mode is used. When an FRUC flag is true, an additional FRUC mode flag is signaled to indicate which method (bilateral matching or template matching) is to be used to derive the motion information of the block.

On an encoder side, a decision on whether to use an FRUC merge mode for a CU is based on RD cost selection as done for a normal merge candidate. That is, the two matching modes (bilateral matching and template matching) are both checked for a CU by using RD cost selection. A mode leading to the minimum cost is further compared with other CU modes. If an FRUC matching mode is the most efficient mode, the FRUC flag is set to true for the CU, and the related matching mode is used.

A motion derivation process in the FRUC merge mode includes two steps. A CU-level motion search is first performed, then followed by sub-CU-level motion refinement. At a CU-level, an initial motion vector is derived for the whole CU based on bilateral matching or template matching. First, a list of MV candidates is generated, and a candidate that leads to the minimum matching cost is selected as a starting point for further CU-level refinement. Then, a local search based on bilateral matching or template matching around the starting point is performed and an MV that leads to the minimum matching cost is used as an MV of the whole CU. Subsequently, the motion information is further refined at a sub-CU level by using the derived CU motion vector as a starting point.

For example, the following derivation process is performed for motion information derivation of a W×H CU. At a first stage, an MV of the whole W×H CU is derived. At a second stage, the CU is further partitioned into M×M sub-CUs. A value of M is calculated according to Equation (1.8), D represents a predefined partitioning depth, and is set to 3 by default in JEM. Then, an MV of each sub-CU is derived.

$$M = \max\left\{4, \min\left\{\frac{W}{2^D}, \frac{H}{2^D}\right\}\right\} \quad (1.8)$$

Bilateral matching is used to derive motion information of the current CU by finding the closest match between two blocks along a motion trajectory of the current CU in two different reference pictures. Under the assumption of a continuous motion trajectory, motion vectors MV0 and MV1 pointing to two reference blocks shall be proportional to temporal distances, that is, TD0 and TD1, between a current picture and the two reference pictures. When the current picture is temporally between the two reference pictures and the temporal distances between the current picture and the two reference pictures are the same, bilateral matching becomes a mirror based bidirectional MV.

In a bilateral matching merge mode, bi-prediction is always applied because motion information of a CU is derived based on the closest match between two blocks along a motion trajectory of the current CU in two different reference pictures. There is no such limitation for a template matching merge mode. In the template matching merge mode, an encoder can select uni-prediction from list 0, uni-prediction from list 1, or bi-prediction for a CU. The selection is based on a template matching cost as follows:

If costBi<=factor*min (cost0, cost1),
    bi-prediction is used;
Otherwise, if cost0<=cost1,
    uni-prediction from list 0 is used;
Otherwise,
    uni-prediction from list 1 is used.

cost0 represents an SAD of list-0 template matching, cost1 represents an SAD of list-1 template matching, and costBi represents an SAD of bi-prediction template matching. A value of the factor is equal to 1.25, which means that a selection process is biased toward bi-prediction. Selection of an inter prediction direction is only applied to a CU-level template matching process.

Template matching is used to derive the motion information of the current CU by finding the closest match between a template (top and/or left neighboring blocks of the current CU) in the current picture and a block (with a size the same as the template) in the reference picture. Except the foregoing FRUC merge mode, template matching is also applied to an AMVP mode. A new candidate is derived by using a template matching method. If the new candidate derived through template matching is different from a first existing AMVP candidate, the new candidate is inserted at the very beginning of the AMVP candidate list, and then a size of the list is set to 2 (this means that a second existing AMVP candidate is removed). When template matching is applied to the AMVP mode, only a CU-level search is applied.

MV candidates set at a CU level include: a. an original AMVP candidate selected if the AMVP mode is used for the current CU; b. all merge candidates; c. several MVs in an interpolated MV field; and d. top and left neighboring motion vectors.

It should be noted that the interpolated MV field mentioned above is generated before a whole picture is coded based on unilateral ME. Then, a motion field may be used later as a CU-level or sub-CU-level MV candidate. First, a motion field of each reference picture in two reference lists is traversed at a 4×4 block level. For each 4×4 block, if motion associated with the block passes through a 4×4 block in the current picture, and the block has not been assigned any interpolated motion, motion of a reference block is scaled to the current picture based on the temporal distances TD 0 and TD 1 (in a manner same as that of MV scaling in TMVP in HEVC), and scaled motion is assigned to the block in the current frame. If no scaled MV is assigned to a 4×4 block, the block's motion is marked as unavailable in the interpolated motion field.

When bilateral matching is used, each valid MV of a merge candidate is used as an input to generate an MV pair with the assumption of bilateral matching. For example, one valid MV of a merge candidate is (MVa, refa) in a reference list A. Then, a reference picture refb of its paired bilateral MV is found in the other reference list B. In this way, refa and refb are temporally located on different sides of the current picture. If such refb is unavailable in the reference list B, refb is determined as a reference different from refa, and a temporal distance between refb and the current picture is the minimal one in the list B. After refb is determined, MVb is derived by scaling MVa based on temporal distances between the current picture and refa and between the current picture and refb.

Four MVs from the interpolated MV field are also added to the CU-level candidate list. More specifically, interpolated MVs at positions (0, 0), (W/2, 0), (0, H/2), and (W/2, H/2) of the current CU are added.

When FRUC is applied to the AMVP mode, the original AMVP candidate is also added to a CU-level MV candidate set.

At the CU level, up to 15 MVs of AMVP CUs and up to 13 MVs of merge CUs are added to the candidate list.

MV candidates set at a sub-CU level include: a. an MV determined from a CU-level search; b. top, left, top-left, and top right neighboring MVs; c. a scaled version of a collocated MV from a reference picture; d. up to four ATMVP candidates; and e. up to four STMVP candidates.

The scaled MV from the reference picture is derived as follows: All reference pictures in both lists are traversed, and an MV at a collocated position of a sub-CU in the reference picture is scaled to a reference of a starting CU-level MV.

ATMVP and STMVP candidates are limited to the four first ones.

At the sub-CU-level, up to 17 MVs are added to the candidate list.

Motion Vector Refinement

A motion vector can be refined by using different methods combining with different inter prediction modes.

MV Refinement in FRUC

MV refinement is a pattern based MV search with a criterion of a bilateral matching cost or a template matching cost. In the current development, two search patterns are supported, an unrestricted center-biased diamond search (UCBDS) and an adaptive cross search used for MV refinement at a CU level and a sub-CU level, respectively. For both CU-level and sub-CU-level MV refinement, an MV is directly searched at quarter luma sample MV accuracy, and this is followed by one-eighth luma sample MV refinement. A search range of MV refinement for a CU and a sub-CU step is set equal to 8 luma samples.

Decoder-Side Motion Vector Refinement

In a bi-prediction operation, for prediction of one block region, two prediction blocks, formed using a list-0 MV and a list-1 MV, respectively, are combined to form a single prediction signal. In a decoder-side motion vector refinement (DMVR) method, the two motion vectors of bi-prediction are further refined by using a bilateral template matching process. Bilateral template matching is applied in a decoder, to perform a distortion-based search between a bilateral template and a reconstructed sample in a reference picture, and to obtain a refined MV without sending of additional motion information.

In DMVR, a bilateral template is generated as a weighted combination (namely, average) of the two prediction blocks, from an initial list-0 MV 0 and a list-1 MV 1, respectively. A template matching operation includes calculating a cost measure between the generated template and a sample region (around an initial prediction block) in the reference picture. For each of two reference pictures, an MV that yields the minimum template cost is considered as an updated MV for the list to replace an original MV. In the current development, nine MV candidates are searched for each list. The nine MV candidates include an original MV and eight surrounding MVs with one luma sample offset to the original MV in either of a horizontal direction and a vertical direction or in both a horizontal direction and a vertical direction. Finally, two new MVs, that is, an MV 0' and an MV 1', are used for generating a final bi-prediction result. A sum of absolute differences (SAD) is used as the cost measure.

DMVR is applied for a merge mode of bi-prediction with one MV from a reference picture in the past and another MV from a reference picture in the future, without sending of additional syntax elements.

Motion Data Precision and Storage

Motion Data Storage Reduction

Usage of TMVP in AMVP as well as in a merge mode requires storage of motion data (including a motion vector, a reference index, and a coding mode) in a co-located reference picture. Considering a granularity of motion representation, a memory size needed for storing the motion data is significant. HEVC employs motion data storage reduction (MDSR) to reduce sizes of a motion data buffer and an associated memory access bandwidth by sub-sampling motion data in the reference picture. Although the information is stored on a 4×4 block basis in H.264/AVC, a 16×16 block is used in HEVC. In case of sub-sampling a 4×4 grid, information of a top-left 4×4 block is stored. Due to this sub-sampling, MDSR impacts on quality of temporal prediction.

Furthermore, there is a tight correlation between a position of an MV used in the co-located picture and a position of an MV stored by using MDSR. During the standardization process of HEVC, it turns out that storing the motion data of the top-left block inside the 16×16 region together with bottom-right and center TMVP candidates provides the best tradeoff between coding efficiency and memory bandwidth reduction.

Higher Motion Vector Storage Accuracy

In HEVC, motion vector accuracy is one-quarter pel (one-quarter luma sample and one-eighth chroma sample for a 4:2:0 video). In the current development, accuracy for internal motion vector storage and a merge candidate increases to $\frac{1}{16}$ pel. Higher motion vector accuracy ($\frac{1}{16}$ pel) is used in motion compensation inter prediction for a CU coded based on a skip/merge mode. For a CU coded based on a normal AMVP mode, either integer-pel motion or quarter-pel motion is used.

Adaptive Motion Vector Difference Resolution

In HEVC, a motion vector difference (MVD) is signaled in a unit of quarter luma sample when use_integer_mv_flag is equal to 0 in a slice header. In the current development, a locally adaptive motion vector resolution (LAMVR) is introduced. The MVD can be coded in a unit of quarter luma sample, integer luma sample or four luma samples. The MVD resolution is controlled at a coding unit (CU) level, and an MVD resolution flag is conditionally signaled for each CU that has at least one non-zero MVD component.

For a CU that has at least one non-zero MVD component, a first flag is signaled to indicate whether quarter luma sample MV precision is used for the CU. When the first flag (which is equal to 1) indicates that quarter luma sample MV precision is not used, another flag is signaled to indicate whether integer luma sample MV precision or four luma sample MV precision is used.

When a first MVD resolution flag of a CU is zero, or not coded for a CU (this means that all MVDs for the CU are zero), a quarter luma sample MV resolution is used for the CU. When integer-luma sample MV precision or four-luma-sample MV precision is used for a CU, an MVP in an AMVP candidate list for the CU is rounded to corresponding precision.

In an encoder, a CU-level RD check is used to determine which MVD resolution is to be used for a CU. That is, the CU-level RD check is performed three times for each MVD resolution.

Fractional Sample Interpolation Module

When a motion vector points to a fractional sample position, motion compensated interpolation is needed. For luma interpolation filtering, an 8-tap separable DCT-based interpolation filter is used for a 2/4 precision sample, and a 7-tap separable DCT-based interpolation filter is used for a 1/4 precision sample, as shown in Table 1.2

TABLE 1.2

| Position | Filter coefficients |
|---|---|
| 1/4 | {-1, 4, -10, 58, 17, -5, 1} |
| 2/4 | {-1, 4, -11, 40, 40, -11, 4, -1} |
| 3/4 | {1, -5, 17, 58, -10, 4, -1} |

Similarly, a 4-tap separable DCT-based interpolation filter is used for a chroma interpolation filter, as shown in Table 1.3.

TABLE 1.3

| Position | Filter coefficients |
|---|---|
| 1/8 | {-2, 58, 10, -2} |
| 2/8 | {-4, 54, 16, -2} |
| 3/8 | {-6, 46, 28, -4} |
| 4/8 | {-4, 36, 36, -4} |
| 5/8 | {-4, 28, 46, -6} |
| 6/8 | {-2, 16, 54, -4} |
| 7/8 | {-2, 10, 58, -2} |

For vertical interpolation for 4:2:2 and horizontal and vertical interpolation for 4:4:4 chroma channels, odd positions in Table 1.3 are not used, resulting in $1/4^{th}$ chroma interpolation.

For bi-prediction, a bit depth of an output of an interpolation filter is maintained to 14-bit accuracy, regardless of a source bit depth, before averaging of two prediction signals. An actual averaging process is performed implicitly with a bit-depth reduction process as follows:

$$predSamples[x,y]=(predSamplesL0[x,y]+predSamplesL1[x,y]+offset)>>shift \quad (1.9)$$

$$shift=15-BitDepth \quad (1.10)$$

$$offset=1<<(shift-1) \quad (1.11)$$

To reduce complexity, bi-linear interpolation instead of regular 8-tap HEVC interpolation is used for both bilateral matching and template matching.

Calculation of a matching cost is a bit different at different steps. When a candidate is selected from a candidate set at a CU level, the matching cost is an SAD of bilateral matching or template matching. After a starting MV is determined, a matching cost C of bilateral matching at a sub-CU-level search is calculated as follows:

$$C=SAD+w \cdot (|MV_x-MV_x^s|+|MV_y-MV_y^s|) \quad (1.12)$$

w represents a weighting factor that is empirically set to 4, and MV and $MV^s$ indicate a current MV and the starting MV, respectively. An SAD is still used as a matching cost of template matching at a sub-CU level search.

In a FRUC mode, an MV is derived by using a luma sample only. The derived motion vector is to be used for both luma and chroma for MC inter prediction. After the MV is determined, final MC is performed by using an 8-tap interpolation filter for luma and a 4-tap interpolation filter for chroma.

Motion Compensation Module

Overlapped Block Motion Compensation

Overlapped block motion compensation (OBMC) is performed for all motion compensation (MC) block boundaries except right and bottom boundaries of a CU in the current development. Moreover, overlapped block motion compensation is applied for both luma and chroma components. An MC block corresponds to a coding block. When a CU is coded based on a sub-CU mode (including sub-CU merge, affine, and FRUC modes), each subblock of the CU is an MC block. To process a CU boundary in a uniform fashion, OBMC is performed at a subblock level for all MC block boundaries, where a subblock size is set equal to 4×4.

When OBMC applies to a current subblock, in addition to a current motion vector, if motion vectors of four connected neighboring subblocks are available and not identical to the current motion vector, the motion vectors of the four connected neighboring subblocks are also used to derive a prediction block for the current subblock. A plurality of these prediction blocks based on a plurality of motion vectors are combined to generate a final prediction signal of the current subblock.

A prediction block based on a motion vector of a neighboring subblock is denoted as PN, where N represents an index of a top, bottom, left, or right neighboring subblock, and a prediction block based on the motion vector of the current subblock is denoted as PC. When PN is based on motion information of a neighboring subblock that includes same motion information as the current subblock, OBMC is not performed from PN. Otherwise, every sample of PN is added to a same sample in PC. That is, four rows/columns of PN are added to PC. Weighting factors {1/4, 1/8, 1/16, 1/32} are used for PN and weighting factors {3/4, 7/8, 15/16, 31/32} are used for PC. An exception is a small MC block (that is, when a height or width of a coding block is equal to 4 or a CU is coded based on the sub-CU mode), and for such a block, only two rows/columns of PN are added to PC. In this case, weighting factors {1/4, 1/8} are used for PN, and weighting factors {3/4, 7/8} are used for PC. For PN generated based on a motion vector of a vertically (or horizontally) neighboring subblock, samples in a same row (or column) of PN are added to PC with a same weighting factor.

In the current development, for a CU with a size less than or equal to 256 luma samples, a CU-level flag is signaled to indicate whether OBMC is applied or not for the current CU. For a CU with a size greater than 256 luma samples or a CU not coded based on an AMVP mode, OBMC is applied by default. At an encoder, when OBMC is applied for a CU, impact of OBMC is taken into account at a motion estimation stage. A prediction signal formed through OBMC by using motion information of a top neighboring block and a left neighboring block is used to compensate top and left boundaries of an original signal of the current CU, and then normal motion estimation processing is applied.

Optimization Tools

Local Illumination Compensation

Local illumination compensation (LIC) is based on a linear model for illumination changes, using a scaling factor a and an offset b. Local illumination compensation is enabled or disabled adaptively for each inter-mode coded coding unit (coding unit, CU).

When LIC is applied for a CU, a least square error method is employed to derive the parameters a and b by using a neighboring sample of a current CU and a corresponding reference sample. A sub-sampled (2:1 sub-sampling) neighboring sample of the CU and a corresponding sample (identified by motion information of the current CU or sub-CU) in a reference picture are used. The LIC parameters are derived and applied for each prediction direction separately.

When a CU is coded based on a merge mode, an LIC flag is copied from a neighboring block in a manner similar to motion information copy in the merge mode. Otherwise, an LIC flag is signaled for the CU to indicate whether LIC is applied or not.

When LIC is enabled for a picture, an additional CU-level RD check is needed to determine whether LIC is applied or not for a CU. When LIC is enabled for a CU, a mean-removed sum of absolute difference (MR-SAD) and a mean-removed sum of absolute Hadamard-transformed difference (mean-removed sum of absolute Hadamard-transformed difference, MR-SATD) are used, instead of SAD and SATD, for an integer pel motion search and a fractional pel motion search, respectively.

Bi-Directional Optical Flow

Bi-directional optical (BIO) flow is sample-wise motion refinement performed on top of block-wise motion compensation for bi-prediction. The sample-level motion refinement does not use signaling.

Let $I^{(k)}$ be a luma value from a reference k (where k=0, 1) after block motion compensation, and $\partial I^{(k)}/\partial x$ and $\partial I^{(k)}/\partial y$ represent a horizontal component and a vertical component of the $I^{(k)}$ gradient, respectively. Assuming that the optical flow is valid, a motion vector field $(v_x, v_y)$ is given according to Equation (1.13):

$$\partial I^{(k)}/\partial t + v_x \partial I^{(k)}/\partial x + v_y \partial I^{(k)}/\partial y = 0 \quad (1.13)$$

Combining this optical flow equation with Hermit interpolation for a motion trajectory of each sample results in a unique third-order polynomial that matches both a function value $I^{(k)}$ and derivatives $\partial I^{(k)}/\partial x$ and $\partial I^{(k)}/\partial y$ at the ends. A value of this polynomial at t=0 is a BIO prediction value:

$$\text{pred}_{BIO}=1/2\cdot(I^{(0)}+I^{(1)}+v_x/2\cdot(\tau_1\partial I^{(1)}/\partial x-\tau_0\partial I^{(0)}/\partial x)v_y/2\cdot(\tau_1\partial I_{(1)}/\partial y-\tau_0\partial I^{(0)}/\partial y)) \quad (1.14)$$

Herein, $\tau_0$ and $\tau_1$ denote distances to a reference frame. The distances $\tau_0$ and $\tau_1$ are calculated based on POCs for Ref0 and Ref1: $\tau_0$=POC (current)−POC (Ref0), $\tau_1$=POC (Ref1)−POC (current). If both the predictions come from a same time direction (either both from the past or both from the future), signs are different (that is, $\tau_0 \cdot \tau_1 < 0$). In this case, BIO is applied only if the predictions are not from the same time moment (that is, $\tau_0 \neq \tau_1$), both referenced r egions have non-zero motion vectors $(MVx_0, MVy_0, MVx_1, MVy_1 \neq 0)$, and the blockmotion vectors are proportional to the temporal distances $(MVx_0/MVx_1 = MVy_0/MVy_1 = -\tau_0/\tau_1)$.

The motion vector field $(v_x, v_y)$ is determined by minimizing a difference $\Delta$ between values in points A and B (intersection of a motion trajectory and reference frame planes). Model uses only a first linear term of a local Taylor expansion for $\Delta$:

$$\Delta = (I^{(0)} - I_0^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (1.15)$$

All values in Equation (1.15) depend on a sample location (i,j), which was omitted from the notation so far. Assuming that motion is consistent in a local surrounding region, $\Delta$ is minimized inside a $(2M+1)\times(2M+1)$ square window $\Omega$ centered on a current predicted point (i,j), where M is equal to 2:

$$(v_x, v_y) = \arg\min_{v_x, v_y} \sum_{[i', j'] \in \Omega} \Delta^2[i', j'] \quad (1.16)$$

For this optimization problem, the current development uses a simplified approach making minimization first in a vertical direction and then in a horizontal direction. The following is obtained:

$$v_x = (s_1 + r) > m\,?\,clip3\left(-thBIO, thBIO, -\frac{s_3}{(s_1 + r)}\right) : 0 \quad (1.17)$$

$$v_y = (s_5 + r) > m\,?\,clip3\left(-thBIO, thBIO, -\frac{s_6 - v_x s_2/2}{(s_5 + r)}\right) : 0 \quad (1.18)$$

where $$s_1 = \sum_{[i',j] \in \Omega} (\tau_1 \partial I^{(1)}/\partial x + \tau_0 \partial I^{(0)}/\partial x)^2 \quad (1.19)$$

$$s_3 = \sum_{[i',j] \in \Omega} (I^{(1)} - I^{(0)})(\tau_1 \partial I^{(1)}/\partial x + \tau_0 \partial I^{(0)}/\partial x)$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y)$$

$$s_5 = \sum_{[i',j] \in \Omega} (\tau_1 \partial I^{(1)}/\partial y + \tau_0 \partial I^{(0)}/\partial y)^2$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

To avoid division by zero or a very small value, regularization parameters r and m are introduced in Equations (1.17) and (1.18).

$$r = 500 \cdot 4^{d-8} \quad (1.20)$$

$$m = 700 \cdot 4^{d-8} \quad (1.21)$$

Herein d represents a bit depth of a video sample.

To keep memory access for BIO the same as memory access for regular bi-predictive motion compensation, all predictions and gradient values $I^{(k)}$, $\partial I^{(k)}/\partial x$, $\partial I^{(k)}/\partial y$ are calculated only for positions inside a current block. In Equation (1.19), the $(2M+1)\times(2M+1)$ square window $\Omega$ centered on the current prediction point on a boundary of a prediction block needs to access a position outside the block. In the current development, values of $I^{(k)}$, $\partial I^{(k)}/\partial x$, $\partial I^{(k)}/\partial y$ outside the block are set equal to the nearest available value inside the block. For example, this can be implemented as padding.

With BIO, it is possible that a motion field is refined for each sample. However, to reduce computational complexity, a block-based design of BIO may be used. Motion refinement is calculated based on a 4×4 block. In the block-based BIO, values of $s_n$ in Equation (1.19) of all samples in a 4×4 block are aggregated, and then the aggregated values of $s_n$ are used to derive a BIO motion vector offset for the 4×4 block. The following formula is used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2 \quad (1.22)$$

$$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x)$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y)$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

$b_k$ denotes a set of samples belonging to a $k^{th}$ 4×4 block of the prediction block. $s_n$ in Equations (1.17) and (1.18) is replaced by $((s_n, b_k) >> 4)$ to derive an associated motion vector offset.

In some cases, MV regiment of BIO may be unreliable due to noise or irregular motion. Therefore, in BIO, a magnitude of the MV regiment is clipped to a threshold thBIO. The threshold is determined based on whether reference pictures of a current picture are all from one direction. If all the reference pictures of the current picture are from one direction, a value of the threshold is set to $12 \times 2^{14-d}$; otherwise, the value is set to $12 \times 2^{13-d}$.

A gradient for BIO is calculated at the same time with motion compensation interpolation by using an operation consistent with an HEVC motion compensation process (a 2D separable FIR). An input of the 2D separable FIR is the same reference frame sample as a motion compensation process and a fractional position (fracX, fracY) according to a fractional part of a block motion vector. In case of a horizontal gradient ∂I/∂x signal, first, vertical interpolation is performed by using BIOfilterS corresponding to the fractional position fracY with de-scaling shift d−8, and then, a gradient filter BIOfilterG is applied in a horizontal direction corresponding to the fractional position fracX with de-scaling shift by 18−d. In case of a vertical gradient ∂I/∂y, first, a gradient filter is applied vertically by using BIOfilterG corresponding to the fractional position fracY with de-scaling shift d−8, and then, signal displacement is performed by using BIOfilterS in a horizontal direction corresponding to the fractional position fracX with de-scaling shift by 18−d. Lengths of interpolation filters for gradient calculation BIOfilterG and signal displacement BIOfilterS are shorter (6-tap) to maintain proper complexity. Table 1.4 shows a filter used for gradient calculation at different fractional positions of a block motion vector in BIO. Table 1.5 shows an interpolation filter for prediction signal generation in BIO.

TABLE 1.4

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |

TABLE 1.4-continued

| Fractional pel position | Interpolation filter for gradient (BIOfilterG) |
|---|---|
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 1.5

| Fractional pel position | Interpolation filter for prediction signal (BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the current development, BIO is applied to all bi-predictive blocks when two predictions are from different reference pictures. When LIC is enabled for a CU, BIO is disabled. OBMC is applied for a block after a normal MC process. To reduce computational complexity, BIO is not applied in an OBMC process. This means that BIO is only applied in the MC process for a block when an MV of the block is used but is not applied in the MC process when an MV of a neighboring block is used in the OBMC process.

Weighted Sample Prediction Module

As an optional tool, a weighted prediction (weighted prediction, WP) tool is provided in HEVC. A principle of WP is to replace an inter prediction signal P by a linear weighted prediction signal P' (with a weight w and an offset o):

$$\text{uni-prediction: } P' = w \times P + o \quad (1.23)$$

$$\text{bi-prediction: } P' = (w0 \times P0 + o0 + w1 \times P1 + o1)/2 \quad (1.24)$$

An applicable weight and an applicable offset are selected by an encoder and are conveyed within a bitstream. L0 and L1 suffixes define a list 0 and a list 1 of reference picture lists, respectively. For an interpolation filter, a bit depth is maintained to 14-bit accuracy before prediction signals are averaged.

In a case of bi-prediction with at least one reference picture available in each of the lists L0 and L1, the following formula is applied to explicit signaling of a weighted prediction parameter relating to a luma channel. A corresponding formula is applied to a chroma channel and to a case of uni-prediction.

$$predSamples[x][y] = Clip3\bigg(0, (1 << bitDepth) - 1, \quad (1.25)$$
$$\bigg(\frac{predSamplesL0[x][y] * w0 + predSamplesL1[x][y] * w1 +}{((o0 + o1 + 1) << \log 2WD)}\bigg)$$
$$>> (\log 2WD + 1)\bigg)$$

where
log 2WD=luma_log 2_weight_denom+14−bitDepth
W0=LumaWeightL0[refIdxL0], w1=LumaWeightL1[refIdxL1], o0=luma_offset_l0[redIdxL0]*highPrecisionScaleFactor,
o1=luma_offset_l1[refIdxL1]*highPrecisionScaleFactor,
highPrecisionScaleFactor=(1<<(bitDepth−8)).

A boundary prediction filter is an intra coding method used to further adjust prediction samples in a leftmost column and a topmost row. In HEVC, after an intra prediction block has been generated for a vertical or horizontal intra mode, the prediction samples in the leftmost column and the topmost row are further adjusted, respectively. This method may be further extended to several diagonal intra modes, and boundary samples up to four columns or rows are further adjusted by using a 2-tap filter (for intra modes 2 and 34) or a 3-tap filter (for intra modes 3 to 6 and 30 to 33).

In the HEVC standard and previous standards, reference frames are classified into two groups: a forward reference frame and a backward reference frame, and are respectively placed in two reference frame lists (e.g., reference picture list). The two reference frame lists are usually named a list 0 and a list 1. An inter prediction direction is used to indicate which prediction direction in forward prediction, backward prediction, or bi-prediction is used for a current block, and a different reference frame list, that is, the list 0, the list 1, or both the list 0 and the list 1, is selected based on the prediction direction. A reference frame in the selected reference frame list is indicated by a reference frame index. A motion vector is used to indicate a position offset of a reference block of a prediction block of the current block in the selected reference frame, relative to the current block in a current frame. Then, a final prediction block is generated based on the prediction direction by using a prediction block obtained from a reference frame in the list 0, the list 1, or both the list 0 and the list 1. When the prediction direction is uni-prediction, the prediction block obtained from the reference frame in the list 0 or the list 1 is directly used. When the prediction direction is bi-prediction, the prediction blocks obtained from the reference frames in both the list 0 and the list 1 are synthesized through weighted averaging to obtain the final prediction block.

To resolve problems in the conventional technology that prediction samples obtained based on an inter prediction mode are spatially discontinuous, prediction efficiency is affected, and prediction residual energy is relatively high, the embodiments of this application provide an inter prediction method, to filter a prediction sample by using a neighboring reconstructed sample after the prediction sample is generated, and improve coding efficiency.

Figure 13:
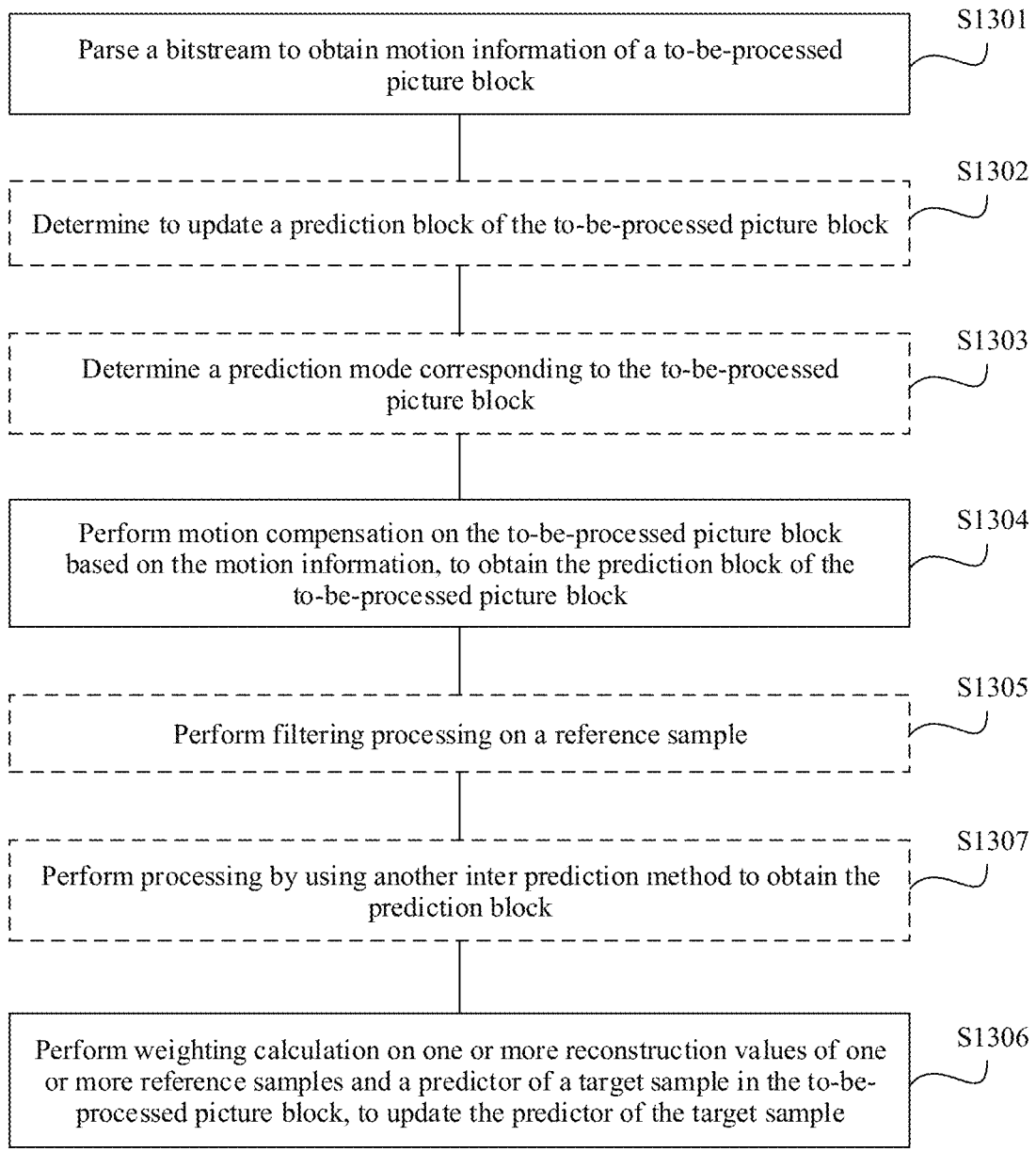
FIG. 13 is a schematic flowchart of an inter prediction method according to an embodiment.

FIG. 13 is a schematic flowchart of an inter prediction method according to an embodiment. As shown in FIG. 13, the method includes steps S1301 to S1307.

S1301: Parse a bitstream to obtain motion information of a to-be-processed picture block.

The to-be-processed picture block may be referred to as a current block or a current CU.

It may be understood that step S1301 may be performed by the video decoder 200 in FIG. 1.

For example, in this embodiment of this application, a block-based motion compensation technology may be used to search encoded blocks for an optimal matching block of a current coding block, so that a residual between a prediction block and the current block is as small as possible; and used to calculate an offset MV of the current block.

For example, the to-be-processed picture block may be any block in a picture, and a size of the to-be-processed picture block may be 2×2, 4×4, 8×8, 16×16, 32×32, 64×64, or 128×128. This is not limited in this embodiment of this application.

For example, if the to-be-processed picture block (e.g., a current block) is encoded at an encoder side based on a merge mode, a spatial candidate and a temporal candidate of the current block may be added to a merge motion information candidate list for the current block. A method is the same as a method in HEVC. For example, any one of the technologies described in FIG. 8 to FIG. 12 may be used as a specific method for obtaining a merge motion information candidate list.

For example, if a merge mode is used for the current block, the motion information of the current block is determined based on a merge index carried in the bitstream. If an inter MVP mode is used for the current block, the motion information of the current block is determined based on an inter prediction direction, a reference frame index, a motion vector prediction value index, and a motion vector residual value that are transmitted in the bitstream.

Step S1301 may be performed by using a method in HEVC or VTM, or may be performed by using another method for generating a motion vector prediction candidate list. This is not limited in this embodiment of this application.

S1302: (Optional in some embodiments) Determine to update a prediction block of the to-be-processed picture block.

It may be understood that step S1302 may be performed by the video decoder 200 in FIG. 1.

The prediction block of the to-be-processed picture block is a prediction block of the current block, and may be obtained based on one or more encoded blocks.

For example, whether to update the prediction block of the to-be-processed picture block may be determined based on an update determining indicator of the to-be-processed picture block. In other words, whether to perform spatial filtering on the to-be-processed picture block may be determined based on the update determining indicator of the to-be-processed picture block.

In an embodiment, the bitstream may be parsed to obtain update determining indication information of the to-be-processed picture block, where the update determining indication information is used to indicate whether to update the prediction block of the to-be-processed picture block; and it is further determined, based on the update determining indication information of the to-be-processed picture block, that the prediction block of the to-be-processed picture block is to be updated.

In another embodiment, preset update determining indication information of the to-be-processed picture block may be obtained, where the preset update determining indication information is used to indicate whether to update the prediction block of the to-be-processed picture block; and it is further determined, based on the preset update determining indication information that the prediction block of the to-be-processed picture block is to be updated.

For example, if the update determining indicator is true, it may be determined that the prediction block of the to-be-processed picture block is to be updated. In other words, it is determined that spatial filtering is to be performed on the prediction block of the to-be-processed picture block. If the update determining indicator is false, it is determined that the prediction block of the to-be-processed picture block does not need to be updated. A specific form of the update determining indicator is not limited in this embodiment of this application. Herein, that the update determining indicator is true or false is merely used as an example for description.

S1303: (Optional in some embodiments) Determine a prediction mode corresponding to the to-be-processed picture block.

It may be understood that step S1303 may be performed by the video decoder 200 in FIG. 1.

For example, the prediction mode corresponding to the to-be-processed picture block may be a merge mode and/or an inter advanced motion vector prediction (inter AMVP) mode. This is not limited in this embodiment of this application. It may be understood that the prediction mode corresponding to the to-be-processed picture block may be only the merge mode, only the inter AMVP mode, or a combination of the merge mode and the inter AMVP mode.

It should be noted that the inter advanced motion vector prediction (inter AMVP) mode may also be referred to as an inter motion vector prediction (inter MVP) mode.

For example, a method for determining the prediction mode corresponding to the to-be-processed picture block may be: parsing the bitstream to obtain the prediction mode corresponding to the to-be-processed picture block, and determining that the prediction mode corresponding to the to-be-processed picture block is the merge mode and/or the inter AMVP mode.

It may be understood that, in this embodiment of this application, a spatial filtering method may be performed on an inter-coded block that has been encoded based on the merge mode and/or the inter AMVP mode. In other words, filtering processing may be performed, on a decoder side during decoding, on a block that has been encoded based on the merge mode and/or the inter AMVP mode.

S1304: Perform motion compensation on the to-be-processed picture block based on the motion information, to obtain the prediction block of the to-be-processed picture block.

The prediction block of the to-be-processed picture includes a prediction value of a target sample.

It may be understood that step S1304 may be performed by the video decoder 200 in FIG. 1.

For example, during motion compensation, a current partial picture is predicted and compensated based on a reference picture. This can reduce redundancy information of a frame sequence.

For example, when motion compensation is performed based on the motion information, the prediction block of the to-be-processed picture block may be obtained from a reference frame based on a reference frame direction, a reference frame sequence number, and a motion vector. The reference frame direction may be forward prediction, backward prediction, or bi-prediction. This is not limited in this embodiment of this application.

For example, when the reference frame direction is forward prediction, a reference picture may be selected from a forward reference picture set for a current coding unit (CU) to obtain a reference block. When the reference frame direction is backward prediction, a reference picture may be selected from a backward reference picture set for a current coding unit (CU) to obtain a reference block. When the reference frame direction is bi-prediction, a reference picture may be selected from each of a forward reference picture set and a backward reference picture set for a current coding unit (CU) to obtain a reference block.

It should be noted that, in step S1304, a method for performing motion compensation on the to-be-processed picture block based on the motion information may be a method in HEVC or VTM, or may be another method for obtaining the prediction block of the to-be-processed picture block. This is not limited in this embodiment of this application.

S1306: Perform weighting calculation on one or more reconstructed values of one or more reference samples and the prediction value of the target sample, to update the prediction value of the target sample.

The reference sample has a preset spatial position relationship with the target sample.

It may be understood that step S1306 may be performed by the video decoder 200 in FIG. 1.

For example, the target sample is a sample in the prediction block of the to-be-processed picture block, and the prediction value of the target sample may be determined based on a sample value of a sample in the reference block.

For example, the reference sample may be a reconstructed sample that is spatially adjacent to the current CU (the to-be-processed picture block). In an embodiment, the reference sample may be a reconstructed sample in a block other than the current CU block in the picture. For example, the reference sample may be a reconstructed sample in a CU block above or on the left of the current CU. This is not limited in this embodiment of this application.

It may be understood that, in step S1306, spatial filtering is performed on a prediction sample of the target sample by using the reconstructed sample that is spatially adjacent to the current CU. Specifically, weighting calculation is performed on the prediction sample of the target sample in the current block and a sample value of the reconstructed sample that is spatially adjacent to the current CU, to obtain an updated prediction sample of the target sample.

In an embodiment, the reference sample(s) may include a reconstructed sample that has a same horizontal coordinate as the target sample and has a preset vertical coordinate difference to the target sample, or a reconstructed sample that has a same vertical coordinate as the target sample and has a preset horizontal coordinate difference to the target sample.

Figure 14:
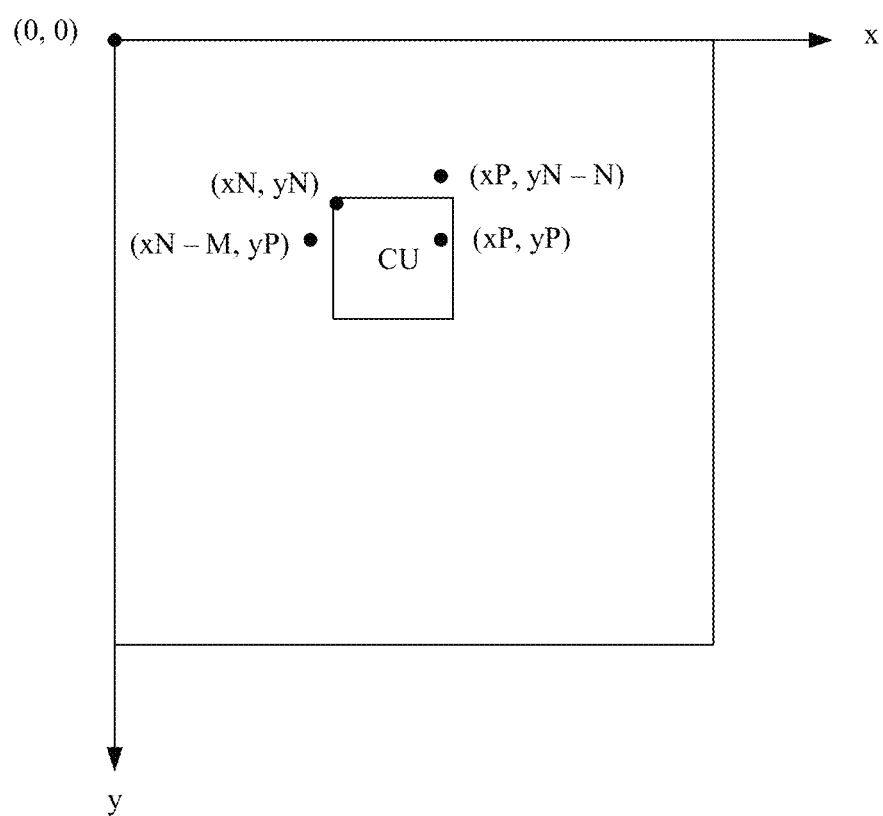
FIG. 14 is a schematic diagram 1 of application of an inter prediction method according to an embodiment.

For example, as shown in FIG. 14, a top-left corner of the picture is used as an origin of a coordinate system, an X-axis direction of the coordinate system extends rightward along a top side of the picture, and a Y-axis direction of the coordinate system extends downward along a left side of the picture. If coordinates of the target sample in the to-be-processed picture block (e.g., a current CU) are (xP,yP), and coordinates of a top-left sample of the to-be-processed picture block are (xN,yN), a reference sample of the target sample may be a reconstructed sample in a block above or on the left of the to-be-processed picture block. If the reference sample is a reconstructed sample in a block above the to-be-processed picture block, because the reference sample is a reconstructed sample in a block other than the to-be-processed picture block, a vertical coordinate of the reference sample is a value obtained by subtracting a preset position relationship N from a vertical coordinate of a top side of the to-be-processed picture block, and a horizontal coordinate of the reference sample is the same as a horizontal coordinate of the target sample in the to-be-processed picture block. To be specific, coordinates of the reference sample are (xP,yN−N). If the reference sample is a reconstructed sample in a block on the left of the to-be-processed picture block, because the reference sample is a reconstructed sample in a block other than the to-be-processed picture block, a horizontal coordinate of the reference sample is a value obtained by subtracting a preset position relationship M from a leftmost horizontal coordinate of the to-be-processed picture block, and a vertical coordinate of the reference sample is the same as a vertical coordinate of the target sample in the to-be-processed picture block. To be specific, coordinates of the reference sample are (xN−M, yP). Specific spatial position relationships (e.g., specific values of M and N) between the reference sample and the target sample are not limited in this embodiment of this application.

In an embodiment, the prediction value of the target sample may be updated according to the following formula:

$$predQ(xP, yP) = \begin{cases} \dfrac{w1*predP(xP,yP) + w2*recon(xN-M1,yP) + ((w1+w2)/2)}{w1+w2}, & xN > 0, \text{ and } yN = 0 \\ \dfrac{w3*predP(xP,yP) + w4*recon(xP,yN-M2) + ((w3+w4)/2)}{w3+w4}, & xN = 0, \text{ and } yN > 0 \\ \dfrac{w5*predP(xP,yP) + w6*recon(xN-M1,yP) + w7*recon(xP,yN-M2) + ((w5+w6+w7)/2)}{w5+w6+w7} \\ \quad xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon (xN−M1,yP) and recon(xP,yN−M2) represent reconstructed values of reference samples at coordinate positions (xN−M1,yP) and (xP,yN−M2), respectively, w1, w2, w3, w4, w5, and w6 are preset constants, and M1 and M2 are preset positive integers.

The following describes specific methods for calculating the updated prediction value of the target sample based on different cases of the coordinates (xN,yN) of the top-left sample of the to-be-processed picture block.

In a first case, if xN is greater than 0, yN is equal to 0, and the reference sample at the position (xN−M1,yP) has been encoded and reconstructed, the updated prediction value of the target sample may be obtained according to the following formula:

$$predQ(xP, yP) = \frac{w1*predP(xP, yP) + w2*recon(xN - M1, yP)}{w1 + w2}$$

Figure 15:
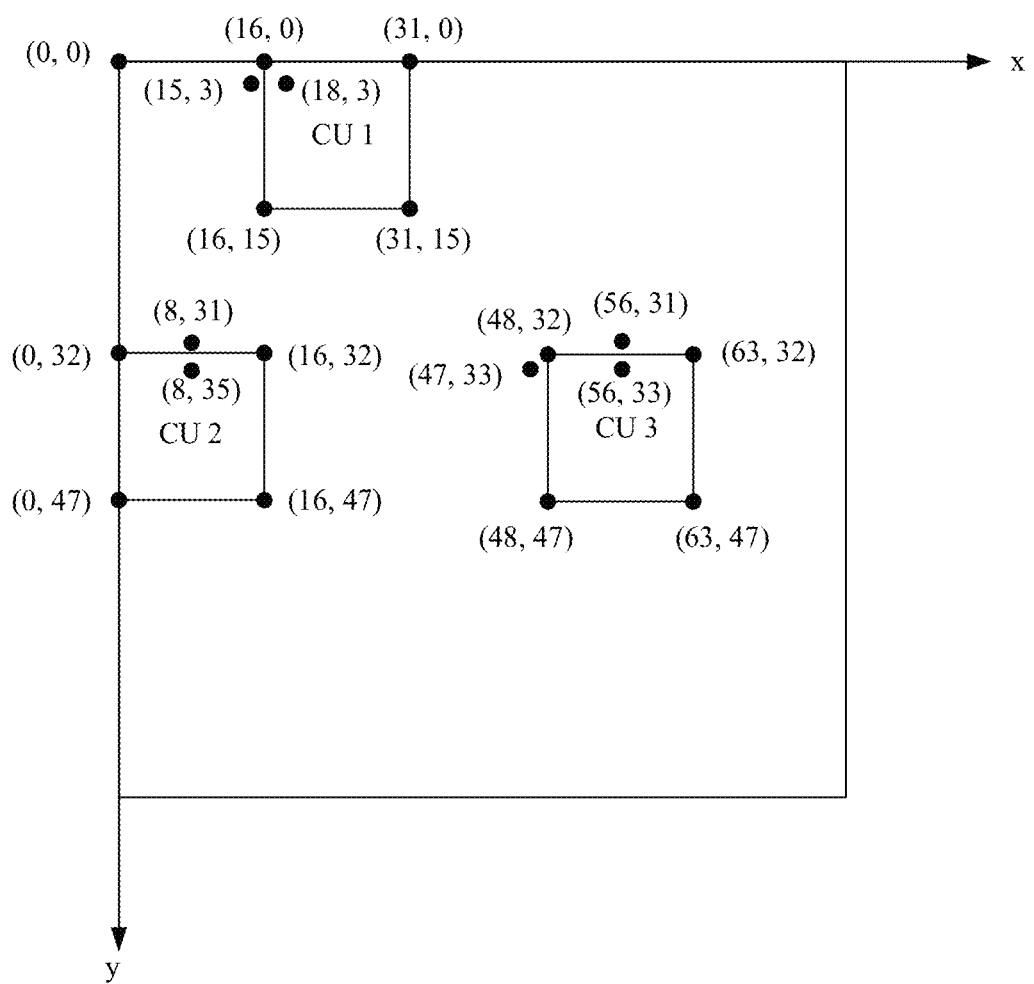
FIG. 15 is a schematic diagram 2 of application of an inter prediction method according to an embodiment.

For example, as shown in FIG. 15, that a size of the to-be-processed picture block is 16×16 is used as an example for description. If the to-be-processed picture block is a CU 1, a top-left sample (xN,yN) of the to-be-processed picture block (the CU 1) is (16, 0), and coordinates of the target sample (xP,yP) in the to-be-processed picture block are (18'3) Because the horizontal coordinate xN of the top-left sample of the current CU (the CU 1) is greater than 0 and the vertical coordinate yN of the top-left sample of the current CU (the CU 1) is equal to 0, it can be determined that the current CU is located on the top side of the picture. When spatial filtering is performed on the target sample in the current CU, because the current CU is located on the top side of the picture, and there is no reconstructed sample above the current CU, the reference sample is a reconstructed sample on the left of the current CU. The reference sample has a same vertical coordinate as the target sample, and may be denoted as (16−M1,3), where M1 represents a preset spatial position relationship between the reference sample and the target sample. Herein, that M1 is equal to 1 is used as an example for description. When M1 is equal to 1, the reference sample of the target sample (18, 3) may be (15, 3). Likewise, any reference sample of the target sample (xP,yP) may be (xN−1,yP).

If the reference sample at the position (xN−1,yP) has been encoded and reconstructed, weighting calculation may be performed on the reconstructed value recon(xN−1,yP) of the reference sample and the prediction value predP(xP,yP) of the target sample, to obtain the updated prediction value predQ(xP,yP) of the target sample.

In a second case, if xN is equal to 0, yN is greater than 0, and the reference sample at the position (xP,yN−M2) has been encoded and reconstructed, the updated prediction value of the target sample may be obtained according to the following formula:

$$predQ(xP, yP) = \frac{w3*predP(xP, yP) + w4*recon(xP, yN - M2)}{w3 + w4}$$

For example, as shown in FIG. 15, if the to-be-processed picture block is a CU 2, a top-left sample (xN,yN) of the to-be-processed picture block (the CU 2) is (0,32), and coordinates of the target sample (xP,yP) are (8, 35). Because the horizontal coordinate xN of the top-left sample of the current CU (the CU 2) is equal to 0, and the vertical coordinate yN of the top-left sample of the current CU (the CU 2) is greater than 0, it can be determined that the current CU is located on the left side of the picture. When spatial filtering is performed on the target sample in the current CU, because the current CU is located on the left side of the picture, and there is no reconstructed sample on the left of the current CU, the reference sample is a reconstructed sample above the current CU. The reference sample has a same horizontal coordinate as the target sample, and may be denoted as (8,32−M2), where M2 represents a preset spatial position relationship between the reference sample and the target sample. Herein, that M2 is equal to 1 is used as an example for description. When M2 is equal to 1, the reference sample of the target sample (8,35) be (8,31) Likewise, any reference sample of the target sample (xP,yP) be (xP, yN−M2)

If the reference sample at the position (xP,yN−M2) has been encoded and reconstructed, weighting calculation may be performed on the reconstructed value recon(xP,yN−M2) of the reference sample and the prediction value predP(xP, yP) of the target sample, to obtain the updated prediction value predQ(xP,yP) of the target sample.

In a third case, if xN is greater than 0, yN is greater than 0, and the reference samples at the positions (xN−ML,yP) and (xP,yN−M2) have been encoded and reconstructed, the updated prediction value of the target sample may be obtained according to the following formula:

$$predQ(xP, yP) = \frac{w5*predP(xP, yP) + w6*recon(xN - M1, yP) + w7*recon(xP, yN - M2)}{w5 + w6 + w7}$$

For example, as shown in FIG. 15, if the to-be-processed picture block is a CU 3, a top-left sample (xN,yN) of the to-be-processed picture block (the CU 3) is (48,32), and coordinates of the target sample (xP,yP) are (56,33) Because the horizontal coordinate xN of the top-left sample of the current CU (the CU 3) is greater than 0, and the vertical coordinate yN of the top-left sample of the current CU (the CU 3) is greater than 0, it can be determined that the current CU is not located on an edge of the picture. When spatial filtering is performed on the target sample in the current CU, the reference samples may be a reconstructed sample above the current CU and a reconstructed sample on the left of the current CU. When the reference sample is a reconstructed sample on the left of the current CU, the reconstructed sample has a same vertical coordinate as the target sample, and may be (xN−M1,33); and when the reference sample is a reconstructed sample above the current CU, the reconstructed sample has a same horizontal coordinate as the target sample, and may be (56,yN−M2), where M1 and M2 each represent a preset spatial position relationship between each of the reference samples and the target sample. Herein, that both M1 and M2 are equal to 1 is used as an example for description. When both M1 and M2 are equal to 1, the reference samples of the target sample (56,33) may be (47,33) and (56,31). Likewise, any reference samples of the target sample (xP,yP) may be (xN−M1,yP) and (xP,yN−M2).

If the reference samples at the positions (xN−M1,yP) and (xP,yN−M2) have been encoded and reconstructed, weighting calculation may be performed on the reconstructed values recon(xN−M1,yP) and recon(xP,yN−M2) of the reference samples and the prediction value predP(xP,yP) of the target sample, to obtain the updated prediction value predQ(xP,yP) of the target sample.

It should be noted that values of the weighted coefficients w1, w2, w3, w4, w5, and w6 and values of M1 and M2 are not limited in this embodiment of this application, and that both M1 and M2 are equal to 1 is merely used as an example.

For example, a weighted coefficient set (w1, w2), (w3, w4), or (w5, w6, w7) may be a value combination of w1+w2, w3+w4, or w5+w6+w7, where w1+w2, w3+w4, or w5+w6+w7 is equal to 2 raised to the power of an integer. In this way, a division operation is no longer performed. For example, a value combination such as (6, 2), (5, 3), (4, 4), (6, 1, 1), or (5, 2, 1) may be used. This is not limited in this embodiment of this application, and the value combination enumerated herein is merely used as an example for description.

In another embodiment, the prediction value of the target sample may be updated according to the following formula $$predQ(xP, yP) = \frac{w1 * predP(xP, yP) + w2 * recon(xN - M1, yP) + w3 * recon(xP, yN - M2)}{w1 + w2 + w3}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP) and recon(xP,yN−M2) represent reconstructed values of reference samples at coordinate positions (xN−M1,yP) and (xP,yN−M2), respectively, w1, w2, and w3 are preset constants, and M1 and M2 are preset positive integers.

For example, a weighted coefficient set (w1, w2, w3) may be a value combination of w1+w2+w3, where w1+w2+w3 is equal to 2 raised to the power of an integer. In this way, a division operation is no longer performed. For example, a value combination such as (6, 1, 1) or (5, 2, 1) may be used. This is not limited in this embodiment of this application, and the value combination enumerated herein is merely used as an example for description.

It should be noted that a difference between this embodiment and the previous embodiment lies in that a sample on the left of the to-be-processed picture block and a sample above the to-be-processed picture block are not considered in this embodiment. When this embodiment is used to update the prediction value of the target sample, and the reconstructed values of the reference samples are unavailable, a method in the following steps S13061 and S13062 may be used to obtain a new reference sample and update the prediction value of the target sample based on the new reference sample.

In another embodiment, the prediction value of the target sample may be updated according to the following formula $$predQ(xP, yP) = \begin{cases} \dfrac{\begin{array}{l}w1 * predP(xP, yP) + w2 * \\ recon(xN - M1, yP) + \\ w3 * recon(xN - M2, yP) + ((w1 + w2 + w3)/2)\end{array}}{w1 + w2 + w3}, xN > 0, \text{ and } yN = 0 \\[2ex] \dfrac{\begin{array}{l}w4 * predP(xP, yP) + w5 * \\ recon(xP, yN - M3) + \\ w6 * recon(xP, yN - M4) + ((w4 + w5 + w6)/2)\end{array}}{w4 + w5 + w6}, xN = 0, \text{ and } yN > 0 \\[2ex] \dfrac{\begin{array}{l}w7 * predP(xP, yP) + w8 * recon(xN - M1, yP) + \\ w9 * recon(xN - M2, yP) + w10 * recon(xP, yN - M3) + \\ w11 * recon(xP, yN - M4) + ((w7 + w8 + w9 + w10 + w11)/2)\end{array}}{w7 + w8 + w9 + w10 + w11} \\ xN > 0, \text{ and } yN > 0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP), recon(xN−M2,yP), recon(xP,yN−M3), and recon(xP,yN−M4) represent reconstructed values of reference samples at coordinate positions (xN−M1,yP), (xN−M2,yP), (xP,yN−M3), and (xP,yN−M4), respectively, w1, w2, w3, w4, w5, w6, w7, w8, w9, w10, and w11 are preset constants, and M1, M2, M3, and M4 are preset positive integers.

The following specifically describes methods for calculating the updated prediction value of the target sample based on different cases of the coordinates (xN,yN) of the top-left sample of the to-be-processed picture block.

In a first case, if xN is greater than 0, yN is equal to 0, and the reference samples at the positions (xN−M1,yP) and (xN−M2,yP) have been encoded and reconstructed, the updated prediction value of the target sample may be obtained according to the following formula:

$$predQ(xP, yP) = \frac{w1 * predP(xP, yP) + w2 * recon(xN - M1, yP) + w3 * recon(xN - M2, yP)}{w1 + w2 + w3}$$

It may be understood that, a difference between this case in this embodiment and the first case in the first embodiment lies in that there are two reference samples in this embodiment. If the to-be-processed picture block is a CU 1, a top-left sample (xN,yN) of the to-be-processed picture block (the CU 1) is (16,0), and coordinates of the target sample (xP,yP) in the to-be-processed picture block are (18,3). The reference samples are reconstructed samples on the left of the current CU. The reference samples each have a same vertical coordinate as the target sample, and may be denoted as (16−M1,3) and (16−M2,3), where M1 and M2 each represent a preset spatial position relationship between each of the reference samples and the target sample. Herein, that M1 is equal to 1 and M2 is equal to 2 is used as an example for description. When M1 is equal to 1, and M2 is equal to 2, the reference samples of the target sample (18,3) may be (15,3) and (14,3). Likewise, any reference samples of the target sample (xP,yP) may be (xN−1,yP) and (xN−2,yP).

If the reference samples at the positions (xN−1,yP) and (xN−2,yP) have been encoded and reconstructed, weighting calculation may be performed on the reconstructed values recon(xN−1,yP) and re x−2,yP) of the reference samples and the prediction value predP(xP,yP) of the target sample, to obtain the updated prediction value predQ(xP,yP) of the target sample.

In a second case, if xN is equal to 0, yN is greater than 0, and the reference samples at the positions (xP,yN−M3) and (xP,yN−M4) have been encoded and reconstructed, the updated prediction value of the target sample may be obtained according to the following formula:

$$predQ(xP, yP) = \frac{w4 * predP(xP, yP) + w5 * recon(xP, yN - M3) + w6 * recon(xP, yN - M4)}{w4 + w5 + w6}$$

For example, a difference between this case in this embodiment and the second case in the first embodiment lies in that there are two reference samples in this embodiment. If the to-be-processed picture block is a CU 2, a top-left sample (xN,yN) of the to-be-processed picture block (the CU 2) is (0,32), and coordinates of the target sample (xP,yP) are (8,35). The reference samples are reconstructed samples above the current CU. The reference samples each have a same horizontal coordinate as the target sample, and may be denoted as (8,32−M3) and (8,32−M4), where M3 and M4 each represent a preset spatial position relationship between each of the reference samples and the target sample. Herein, that M3 is equal to 1 and M4 is equal to 2 is used as an example for description. When M3 is equal to 1, and M4 is equal to 2, the reference samples of the target sample (8,35) may be (8,31) and (8,30). Likewise, any reference samples of the target sample (xP,yP) may be (xP,yN−1) and (xP,yN−2)

If the reference samples at the positions (xP,yN−1) and (xP,yN−2) have been encoded and reconstructed, weighting calculation may be performed on the reconstructed values recon(xP,yN−1) and recon(xP,yN−2) of the reference samples and the prediction value predP(xP,yP) of the target sample, to obtain the updated prediction value predQ(xP,yP) of the target sample.

In a third case, if xN is greater than 0, yN is greater than 0, and the reference samples at the positions (xN−M1,yP) (xN−M2,yP) (xP,yN−M3) and (xP,yN−M4) have been encoded and reconstructed, the updated prediction value of the target sample may be obtained according to the following formula:

$$predQ(xP, yP) = \frac{w7 * predP(xP, yP) + w8 * recon(xN - M1, yP) + w9 * recon(xN - M2, yP) + w10 * recon(xP, yN - M3) + w11 * recon(xP, yN - M4)}{w7 + w8 + w9 + w10 + w11}$$

For example, a difference between this case in this embodiment and the third case in the first embodiment lies in that there are two reconstructed samples as reference samples above the current CU and there are two reconstructed samples as reference samples on the left of the current CU in this embodiment. If the to-be-processed picture block is a CU 3, a top-left sample (xN,yN) of the to-be-processed picture block (the CU 3) is (48,32), and coordinates of the target sample (xP,yP) are (56,33) When the reference samples are reconstructed samples on the left of the current CU, the reconstructed samples each have a same vertical coordinate as the target sample, and may be (48−M1,33) and (48−M2,33); and when the reference samples are reconstructed samples above the current CU, the reconstructed samples each have a same horizontal coordinate as the target sample, and may be (56,32−M3) and (56,32−M4), where M1, M2, M3, and M4 each represent a preset spatial position relationship between each of the reference samples and the target sample. Herein, that both M1 and M3 are equal to 1 and both M2 and M4 are equal to 2 is used as an example for description. When both M1 and M3 are equal to 1, and both M2 and M4 are equal to 2, the reference samples of the target sample (56,33) may (47,33), (46,33), (56,31), and (56,30). Likewise, any reference samples of the target sample (xP,yP) may be (xN−M1, yP), (xN−M2,yP), (xP,yN−M3), and (xP,yN−M4).

If the reference samples at the positions (xN−M1,yP), (xN−M2,yP), (xP,yN−M3), and (xP,yN−M4) have been encoded and reconstructed, weighting calculation may be performed on the reconstructed values recon(xN−M1,yP), recon(xN−M2,yP), recon(xP,yN−M3), and recon(xP,yN−M4) of the reference samples and the prediction value PredP(xP,yP) of the target sample, to obtain the updated prediction value PredQ(xP,yP) of the target sample.

It should be noted that values of the weighted coefficients w1, w2, w3, w4, w5, w6, w7, w8, w9, w10, and w11 and values of M1, M2, M3, and M4 are not limited in this embodiment of this application. That both M1 and M3 are equal to 1 and both M2 and M4 are equal to 2 is merely used as an example for description. It may be understood that, in actual application, values of M1 and M3 may be the same or different, values of M2 and M4 may be the same or different, values of M1 and M2 may be different, and values of M3 and M4 may be different.

For example, a weighted coefficient set (w1, w2, w3), (w4, w5, w6), or (w7, w8, w9, w10, w11) may be a value combination of w1+w2+w3, w4+w5+w6, or w7+w8+w9+w10+w1, where w1+w2+w3, w4+w5+w6, or w7+w8+w9+w10+w1 is equal to 2 raised to the power of an integer. In this way, a division operation is no longer performed. For example, a value combination such as (6, 1, 1), (5, 2, 1), or (3, 2, 1, 1, 1) may be used. This is not limited in this embodiment of this application, and the value combination enumerated herein is merely used as an example for description.

In another embodiment, the prediction value of the target sample may be updated according to the following formula:

$$predQ(xP, yP) = \frac{w1 * predP(xP, yP) + w2 * recon(xN - M1, yP) + w3 * recon(xN - M2, yP) + w4 * recon(xP, yN - M3) + w5 * recon(xP, yN - M4)}{w1 + w2 + w3 + w4 + w5}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−M1,yP), recon(xN−M2,yP), recon(xP,yN−M3), and recon(xP,yN−M4) represent reconstructed values of reference samples at coordinate positions (xN−M1,yP), (xN−M2,yP), (xP,yN−M3), and (xP,yN−M4), respectively, w1, w2, w3, w4, and w5 are preset constants, and M1, M2, M3, and M4 are preset positive integers.

For example, a weighted coefficient set (w1, w2, w3, w4, w5) may be a value combination of w1+w2+w3+w4+w5, where w1+w2+w3+w4+w5 is equal to 2 raised to the power of an integer. In this way, a division operation is no longer performed. For example, a value combination such as (3, 2, 1, 1, 1) may be used. This is not limited in this embodiment of this application, and the value combination enumerated herein is merely used as an example for description. It should be noted that a difference between this embodiment and the previous embodiment lies in that a sample on the left of the to-be-processed picture block and a sample above the to-be-processed picture block are not considered in this embodiment. When this embodiment is used to update the prediction value of the target sample, and the reconstructed values of the reference samples are unavailable, a method in the following steps S13061 and S13062 may be used to obtain an available reference sample and update the prediction value of the target sample based on the available reference sample.

In an embodiment, the reference sample(s) include one or more of the following samples: a reconstructed sample that has a same horizontal coordinate as the target sample and that is adjacent to atop side of the to-be-processed picture block, a reconstructed sample that has a same vertical coordinate as the target sample and that is adjacent to a left side of the to-be-processed picture block, a top-right reconstructed sample of the to-be-processed picture block, a bottom-left reconstructed sample of the to-be-processed picture block, or a top-left reconstructed sample of the to-be-processed picture block.

In another embodiment, the prediction value of the target sample may be updated according to the following formula:

predQ(xP,yP)=(w1*predP(xP,yP)+w2*predP1(xP,yP)+ ((w1+w2)/2))/(w1+w2)

where coordinates of the target pixel are (xP,yP), predP (xP,yP) represents the prediction value of the target sample before the updating, predQ(xP,yP) represents the updated prediction value of the target pixel, and w1 and w2 are preset constants.

In an embodiment, a second prediction sample value predP1(xP, yP) may be first obtained based on a spatial neighboring sample and a planar (PLANAR) intra prediction mode. It may be understood that, in the PLANAR mode, two linear filters in a horizontal direction and a vertical direction are used, and an average value obtained by the two linear filters is used as a prediction value of a sample in the current block.

Figure 16:
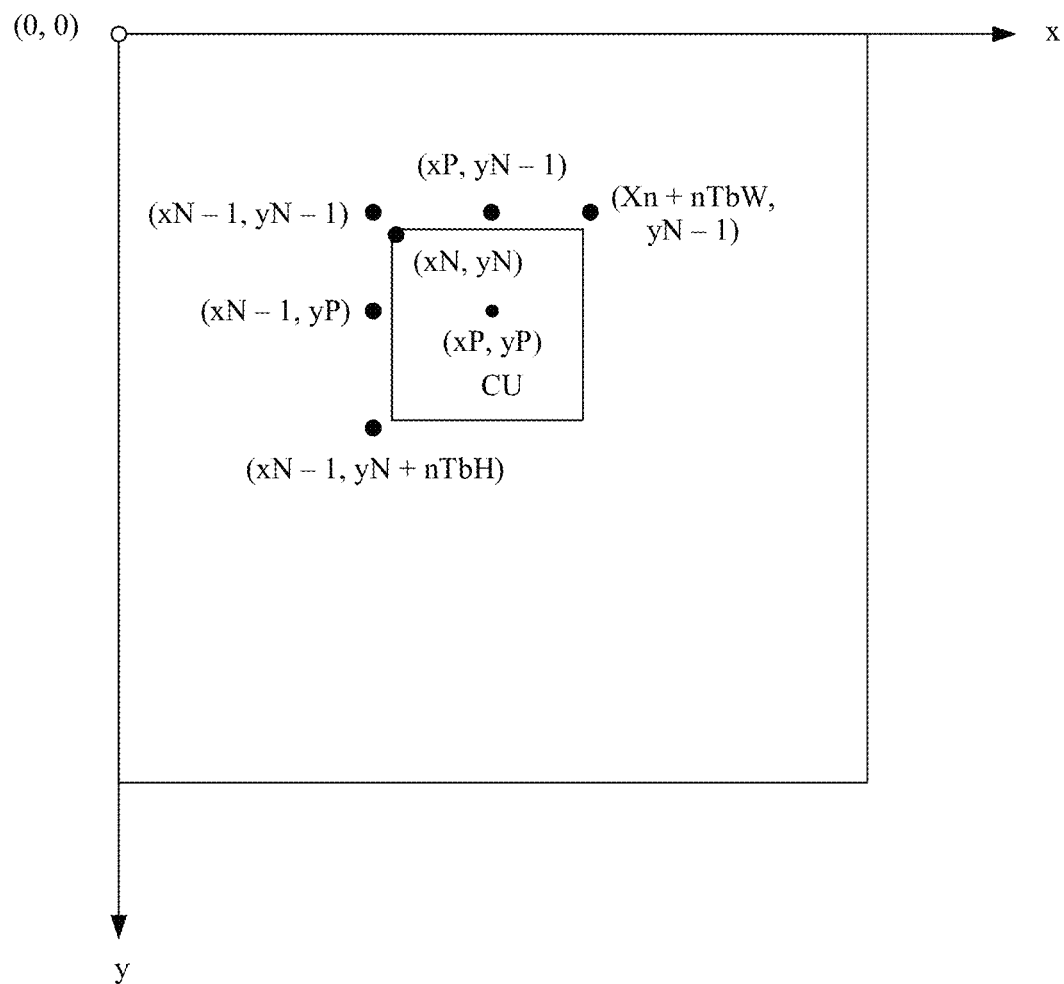
FIG. 16 is a schematic diagram 3 of application of an inter prediction method according to an embodiment.

For example, the second prediction sample value predP1 (xP,yP) may be obtained based on the PLANAR mode:
predP1(xP,yP)=(predV(xP,yP)+predH(xP,yP)+ nTbW*nTbH)>>(Log 2(nTbW)+Log 2(nTbH)+1), predV (xP,yP)=((nTbH−1−(yP−yN)*recon(xP,yN−1)+(yP−yN+1) *recon(xN−1,yN+nTbH))<<Log 2(nTbW), predH(xP,yP)= ((nTbW−1−(xP−zN))*recon(xN−1,yP)+(xP−x+1)*recon (xN+nTbW,yN−1))<<Log 2(nTbH), where, as shown in FIG. 16, coordinates of a top-left sample of the to-be-processed picture block are (xN,yN), recon(xP,yN−1), recon(xN−1,yN+nTbH), recon(xN−1,yP), and recon(xN+nTbW,yN−1) represent reconstructed values of reference samples at coordinate positions, (xP,yN−1), (xN−1,yN+nThH), (xN−1,yP), and (xN+nTbW,yN−1), respectively, and nTbW and nTbH represent a width and a height of the current CU (the to-be-processed picture block).

In another embodiment, the prediction value of the target sample is updated according to the following formula:

predQ(xP,yP)=(w1*predP(xP,yP)+w2*predV(xP,yP)+ w3*predH(xP,yP)+((w1+w2+w3)/2))/(w1+w2+ w3)

where predV(xP,yP)=((nTbH−1−yP)*p(xP, −1)+(yP+1) *p(−1, nTbH)+nTbH/2)>>Log 2(nTbH), predH(xP,yP)= ((nTbW−1−xP)*p(−1, yP)+(xP+1)*p(nTbW, −1)+nTbW/2) >>Log 2(nTbW), coordinates of the target sample are (xP, yP), coordinates of a top-left sample of the to-be-processed picture block are (0, 0), predP(xP,yP) represents the prediction value of the target sample before the updating, predQ (xP,yP) represents the updated prediction value of the target sample, p(xP, −1), p(−1, nTbH), p(−, yP), and p(nTbW, −1) represent reconstructed values of the reference samples at coordinate positions (xP, −1), (−1, nTbH), (−1, yP), and (nTbW, −1), respectively, w1 and w2 are preset constants, and nTbW and nTbH represent a width and a height of the to-be-processed picture block.

In another embodiment, the prediction value of the target sample is updated according to the following formula:

predQ(xP,yP)=(((w1*predP(xP,yP))<<(Log 2(nTbW)+ Log 2(nTbH)+1))+w2*predV(xP,yP)+w3*predH (xP,yP)+((w1+w2+w3)/2)<<(Log 2(nTbW)+Log 2(nTbH)+1)))/(((w1+w2+w3)<<(Log 2(nTbW)+ Log 2(nTbH)+1)))

where predV(xP,yP)=((nTbH−1−yP)*p(xP, −1)+(yP+1) *p(−1, nTbH))<<Log 2(nTbW), predH(xP,yP)=((nTbW−1− xP)*p(−1, yP)+(xP+1)*p(nTbW, −1))<<Log 2(nTbH), coordinates of the target sample are (xP,yP), coordinates of a top-left sample of the to-be-processed picture block are (0, 0), predP(xP,yP) represents the prediction value of the target sample before the updating, predQ(xP,yP) represents the updated prediction value of the target sample, p(xP, −1), p(−1, nTbH), p(−1, yP), and p(nTbW, −1) represent reconstructed values of the reference samples at coordinate positions (xP, −1), (−1, nTbH), (−1, yP), and (nTbW, −1), respectively, w1 and w2 are preset constants, and nTbW and nTbH represent a width and a height of the to-be-processed picture block.

It should be noted that a planar (PLANAR) mode algorithm used to generate the second prediction sample value predP1(xP,yP) is not limited to an algorithm in VTM, and a PLANAR algorithm in HEVC or H.264 may alternatively be used. This is not limited in this embodiment of this application.

It should be noted that values of the weighted coefficients w1 and w2 are not limited in this embodiment of this application. For example, a weighted coefficient set (w1, w2) may be a value combination of w1+w2, where w1+w2 is equal to 2 raised to the power of an integer. In this way, a division operation is no longer performed. For example, a value combination such as (6, 2), (5, 3), or (4, 4) may be used. This is not limited in this embodiment of this application, and the value combination enumerated herein is merely used as an example for description.

In another embodiment, the prediction value of the target sample may be updated according to the following formula predQ(xP,yP)=(w1*predP(xP,yP)+w2*predP1(xP,yP)+ ((w1+w2)/2))/(w1+w2)

where predP1(xP,yP)=(predV(xP,yP)+predH(xP,yP)+1)>>1, predV(xP,yP)=((nTbH−1−(yP−yN))*recon(xP,yN−1))+(yP−yN+1)*recon(xN−1,yN+nTbH)+(nTbH>>1))>>Log 2(nTbH), predH(xP,yP)=((nTbW−1−(xP−xN))*recon(xN−1,yP)+(xP−xN+1))*recon(xN+nTbW,yN−1)+(nTbW>>1))>>Log 2(nTbW), coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP,yN−1), recon(xN−1,yN+nThH), recon(xN−1,yP), and recon(xN+nTbW,yN−1) represent reconstructed values of reference samples at coordinate positions (xP,yN−1), (xN−1,yN+nTbH), (xN−1,yP), and (xN+nTbW,yN−1) respectively, w1 and w2 are preset constants, and nTbW and nTbH represent a width and a height of the to-be-processed picture block.

In another embodiment, an inter prediction block may be processed by using a position-dependent intra prediction combination processing technology that is used in intra prediction, and the updated prediction value predQ(xP,yP) of the target sample may be obtained by using a DC mode method in the intra prediction combination processing technology in VTM. It may be understood that when the DC mode is used, a prediction value of the current block may be obtained based on an average value of reference samples on the left of and above the current block.

For example, the updated prediction value predQ(xP,yP) of the target sample may be obtained according to the following formula:

$$predQ(xP, yP) = clip1Cmp\left(\left(\begin{array}{c} refL(xP, yP)*wL(xP) + refT(xP, yP)* \\ wT(yP) - p(xN-1, yN-1)*wTL(xP, yP) + \\ (64 - wL(xP) - wT(yP) + wTL(xP, yP))*predP(xP, yP) + 32 \end{array}\right) >> 6\right)$$

where refL(xP,yP)=recon(xN−1,yP), refT(xP,yP)=recon(xP,yN−1),wT(yP)=32>>(yP<<1)>>nScale), wL(xP)=32>>((xP<<1)>>nScale), wTL(xP,yP)=((wL(xP)>>4)+(wT(yP)>>4)), nScale=((Log 2(nTbW)+Log 2(nTbH)−2)>>2), as shown in FIG. 16, coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xP,yN−1), recon(xN−1,yP), and (xN−1,yN−1) represent reconstructed values of reference samples at coordinate positions (xP,yN−1), (xN−1,yP), and (xN−1,yN−1), respectively, nTbW and nTbH represent a width and a height of the to-be-processed picture block, and clip1Cmp represents a clipping operation.

It should be noted that the updated prediction value predQ(xp,yP) of the target sample may be obtained by using not only the intra prediction combination processing technology in VTM, but also an algorithm in JEM.

In an embodiment, an inter prediction block may be processed by using a position-dependent intra prediction combination processing technology that is used in intra prediction, and the updated prediction value predQ(xP,yP) of the target sample may be obtained by using a PLANAR mode method in the intra prediction combination processing technology in VTM. The following formula is used:

$$predQ(xP, yP) = clip1Cmp\left(\left(\begin{array}{c} refL(xP, yP)*wL(xP) + refT(xP, yP)*wT(yP) + \\ (64 - wL(xP) - wT(yP))*predP(xP, yP) + 32 \end{array}\right) >> 6\right)$$

where refL(xP,yP)=recon(xN−1,yP), refT(xP,yP)=recon(xP,yN−1),wT(yP)=32>>(yP<<1)>>nScale), wL(xP)=32>>((xP<<1)>>nScale), nScale=((Log 2(nTbW)+Log 2(nTbH)−2)>>2), as shown in FIG. 16, coordinates of the target sample are (xP,yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−1,yP) and recon(xP,yN−1) represent reconstructed values of reference samples at coordinate positions (xN−1,yP) and (xP,yN−1), respectively, nTbW and nTbH represent a width and a height of the to-be-processed picture block, and clip1Cmp represents a clipping operation.

It should be noted that the updated prediction value predQ(xP,yP) of the target sample may be obtained by using not only an algorithm in VTM, but also an algorithm in JEM.

In an embodiment, filtering processing may be performed on an inter prediction sample by using an intra prediction boundary filtering technology. For details of the boundary filtering technology, refer to a method in HEVC. Details are not described herein.

It should be noted that when the prediction value of the target sample is updated in any one of the foregoing manners, if the reconstructed value of the reference sample is unavailable, step S1306 may further include the following steps S13061 and S13062.

S13061: When the reconstructed value of the reference sample is unavailable, determine, in a preset order, availability of samples adjacent to the top side and the left side of the to-be-processed picture block until a preset quantity of available reference samples are obtained.

It may be understood that a case in which the reconstructed value of the reference sample is unavailable may include the following: When the to-be-processed picture block is located on a top side of the picture, there is no reconstructed value of a reference sample at the coordinate position (xP,yN−M); or when the to-be-processed picture block is located on a left side of the picture, there is no reconstructed value of a reference sample at the coordinate position (xN−N,yP); or a reconfiguration value cannot be obtained for the reference sample. A specific case in which the reconstructed value of the reference sample is unavailable is not limited in this embodiment of this application, and the case herein is merely used as an example for description.

Figure 17:
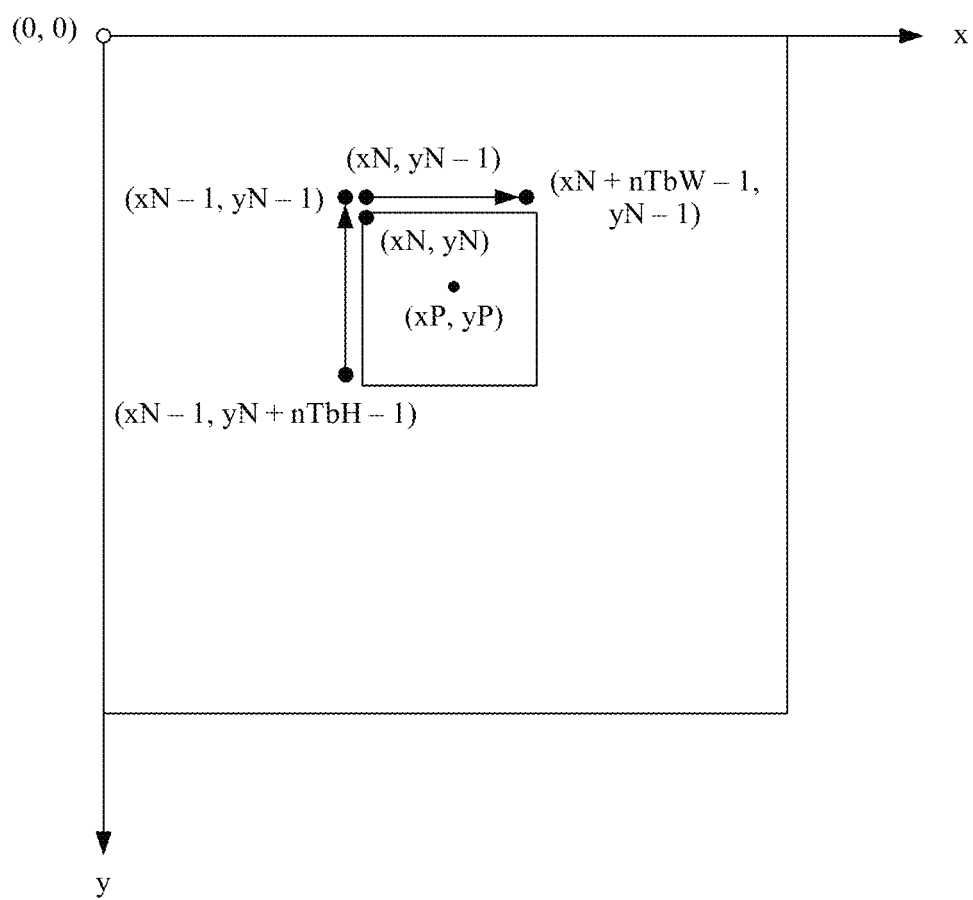
FIG. 17 is a schematic diagram 4 of application of an inter prediction method according to an embodiment.

In an embodiment, as shown in FIG. 17, the preset order may be an order from coordinates (xN−1, yN+nTbH−1) to coordinates (xN−1, yN−1) and then from coordinates (xN, yN−1) to coordinates (xN+nTbW−1, yN−1). For example, all samples may be traversed in the order from the coordinates (xN−1, yN+nTbH−1) to the coordinates (xN−1, yN−1) and then from the coordinates (xN, yN−1) to the coordinates (xN+nTbW−1, yN−1), to search for an available reference sample from the samples adjacent to the top side and the left side of the to-be-processed picture block. It should be noted that a specific preset order is not limited in this embodiment of this application, and the preset order herein is merely used as an example for description.

For example, when there is at least one available reference sample in all reference samples, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If the reconstructed value of the reference sample (x, y) is unavailable in a set including a reference sample (xN−1, yN+nTbH−M), the reconstructed value of the reference sample (x, y) is set to a reconstructed value of a sample (x, y+1), where M is greater than or equal to 2 and less than or equal to nTbH+1. If the reconstructed value of the reference sample (x, y) is unavailable in a set including a reference sample (xN+N, yN−1), the reconstructed value of the reference sample (x, y) is set to a reconstructed value of a reference sample (x−1, y), where N is greater than or equal to 0 and less than or equal to nTbW−1.

For example, if a reconstructed value of a reference sample (xN−1, yN+nTbH−M) is unavailable, an available reference sample may be searched for in the preset order starting from the coordinates (xN−1, yN+nTbH−M), where M is greater than or equal to 1 and less than or equal to nTbH+1. If the available reference sample is B, the reconstructed value of the reference sample (xN−1, yN+nTbH−M) may be set to a reconstructed value of the reference sample B. If a reconstructed value of a reference sample with coordinates (xN+N, yN−1) is unavailable, an available reference sample may be searched for in the preset order starting from the coordinates (xN+N, yN−1), where N is greater than or equal to 0 and less than or equal to nTbW−1. If the available reference sample is C, the reconstructed value of the reference sample (xN+N, yN−1) may be set to a reconstructed value of the reference sample C.

For example, if a reconstructed value of a reference sample (xN−1, yN+nTbH−3) is unavailable, the availability of the samples adjacent to the top side and the left side of the to-be-processed picture block may be determined in an order from the coordinates (xN−1, yN+nTbH−3) to the coordinates (xN−1, yN−1) until the preset quantity of available reference samples are obtained, and the reconstructed value of the reference sample (xN−1, yN+nTbH−3) may be set to a reconstructed value of the available reference sample. If a reconstructed value of a reference sample with coordinates (xN+3, yN−1) is unavailable, an available sample is searched for in an order from the coordinates (xN+3, yN−1) to the coordinates (xN+nTbW−1, yN−1), and the reconstructed value of the reference sample (xN+3, yN−1) may be set to a reconstructed value of the available reference sample.

For example, if a reconstructed value of a reference sample (xN−1, yN+nTbH−1) is unavailable, an available sample is searched for in the preset order from the coordinates (xN−1, yN+nTbH−1) to the coordinates (xN−1, yN−1) and then from the coordinates (xN, yN−1) to the coordinates (xN+nTbW−1, yN−1). Once an available sample is found, the search ends. If the available sample is (x, y), the reconstructed value of the reference sample (xN−1, yN+nTbH−1) is set to a reconstructed value of the sample (x, y). If a reconstructed value of a reference sample (xN−1, yN+nTbH−M) is unavailable, an available reference sample may be searched for, in an order reverse to the preset order, starting from the coordinates (xN−1, yN+nTbH−M), where M is greater than 1 and less than or equal to nTbH+1. If the available reference sample is C, the reconstructed value of the reference sample (xN−1, yN+nTbH−M) may be set to a reconstructed value of the reference sample C. If a reconstructed value of a reference sample with coordinates (xN+N, yN−1) is unavailable, an available reference sample may be searched for, in an order reverse to the preset order, starting from the coordinates (xN+N, yN−1), where N is greater than or equal to 0 and less than or equal to nTbW−1. If the available reference sample is D, the reconstructed value of the reference sample (xN+N, yN−1) may be set to a reconstructed value of the reference sample D.

For example, if a reconstructed value of a reference sample (xN−1, yN+nTbH−3) is unavailable, the availability of the samples adjacent to the top side and the left side of the to-be-processed picture block may be determined in an order from the coordinates (xN−1, yN+nTbH−3) to the coordinates (xN−1, yN−1) until the preset quantity of available reference samples are obtained, and the reconstructed value of the reference sample (xN−1, yN+nTbH−3) may be set to a reconstructed value of the available reference sample. If a reconstructed value of a reference sample with coordinates (xN+3, yN−1) is unavailable, an available sample is searched for in an order from the coordinates (xN+3, yN−1) to the coordinates (xN, yN−1), and the reconstructed value of the reference sample (xN+3, yN−1) may be set to a reconstructed value of the available reference sample.

It should be noted that the new reference sample may be the first available reference sample found in the preset order, or may be any available reference sample found in the preset order. This is not limited in this embodiment of this application.

It may be understood that, according to the method, when a reference sample is unavailable, an available reference sample may be searched for from the samples adjacent to the top side and the left side of the to-be-processed picture block in the preset order, and a reconstructed value of the available reference sample is used as a reconstructed value of the unavailable reference sample.

S13062: Perform weighting calculation on a reconstructed value of the available reference sample and the prediction value of the target sample, to update the prediction value of the target sample.

For example, the prediction value of the target sample may be updated based on a reconstructed value of a new reference sample by using any one of the foregoing embodiments.

It should be noted that, if the reconstructed value of the reference sample is unavailable, and it is determined, in step S13061, that all the samples adjacent to the top side and the left side of the to-be-processed picture block are unavailable, the reconstructed value of the reference sample may be set to $1<<(bitDepth-1)$, where bitDepth represents a bit depth of a sample value of the reference sample. For example, when the to-be-processed picture block is located in a top-left corner of the picture, and coordinates in a top-left corner of the to-be-processed picture block are (0, 0), all the samples adjacent to the top side and the left side of the to-be-processed picture block are unavailable. In this case, the reconstructed value of the reference sample corresponding to the target sample in the to-be-processed picture block may be set to $1<<(bitDepth-1)$.

In the foregoing embodiments, spatial filtering is performed on an inter prediction sample in a process of generating the inter prediction sample. In comparison with the conventional technology, coding efficiency is improved.

In an embodiment, before step S1306, the method may further include step S1305.

S1305: (Optional in some embodiments) Perform filtering processing on a reference sample.

It may be understood that step S1305 may be performed by the filter unit 206 in the video decoder in FIG. 3.

For example, the performing filtering processing on a reference sample may include: when the reference sample is located above the to-be-processed picture block, performing weighting calculation on a reconstructed value of the reference sample and reconstructed values of a left neighboring sample and a right neighboring sample of the reference sample; when the reference sample is located on the left of the to-be-processed picture block, performing weighting calculation on a reconstructed value of the reference sample and reconstructed values of a top neighboring sample and a bottom neighboring sample of the reference sample; and updating the reconstructed value of the reference sample by using a result of the weighting calculation.

It may be understood that, after filtering processing is performed on the reference sample in step S1305, when step S1306 is performed, weighting calculation may be performed on an updated reconstructed value of the reference sample after the filtering processing and the prediction value of the target sample, to update the prediction value of the target sample.

It should be noted that, for a specific method for performing filtering processing on the reference sample, reference may be made to a filtering method in step S1306. Details are not described herein.

It may be understood that filtering processing is performed on the reference sample to update the reconstructed value of the reference sample, and filtering processing is performed on the target sample based on the updated reconstructed value of the reference sample. This can further improve coding efficiency, and reduce a prediction residual.

In an embodiment, before step S1306 or after step S1306, step S1307 may be further included.

S1307: (Optional in some embodiments) Continue to perform inter prediction based on the motion information and bitstream information by using an inter coding technology other than this method.

It may be understood that step S1307 may be performed by the inter predictor 210 in the video decoder in FIG. 3.

For example, technologies in HEVC or VTM may be used, including but not limited to a bi-directional optical flow method, a decoder-side motion vector refinement method, a local illuminance compensation (LIC) technology, general weighted prediction (GBI), overlapped block motion compensation (OBMC), and a decoder-side motion vector compensation (DMVD) technology. A method in HEVC or VTM, or another method for generating a motion vector prediction candidate list may be used. This is not limited in this embodiment of this application.

It should be noted that an order of performing steps S1301 to S1307 in the foregoing method is not limited in this embodiment of this application. For example, step S1305 may be performed before step S1307, or may be performed after step S1307. This is not limited in this embodiment of this application.

In an embodiment, before the performing motion compensation on the to-be-processed picture block based on the motion information, the method may further include: initially updating the motion information by using a first preset algorithm; and correspondingly, the performing motion compensation on the to-be-processed picture block based on the motion information includes: performing motion compensation on the to-be-processed picture block based on initially updated motion information.

In another embodiment, after the prediction block of the to-be-processed picture block is obtained, the method may further include: pre-updating the prediction block by using a second preset algorithm; and correspondingly, the performing weighting calculation on one or more reconstructed values of one or more reference samples and the prediction value of the target sample includes: performing weighting calculation on the reconstructed value(s) of the reference sample(s) and a pre-updated prediction value of the target sample.

In another embodiment, after the performing weighting calculation on one or more reconstructed values of one or more reference samples and the prediction value of the target sample, to update the prediction value of the target sample, the method further includes: updating the prediction value of the target sample by using a second preset algorithm.

It should be further understood that, after the updated prediction value of the target sample is obtained, the method may further include: adding a final inter prediction picture and a residual picture, to obtain a reconstructed picture of the current block. For example, if the current block has a residual, residual information is added to the prediction picture to obtain the reconstructed picture of the current block. If the current block has no residual, the prediction picture is the reconstructed picture of the current block. In the foregoing process, a same method as in HEVC or VTM, or another motion compensation or picture reconstruction method may be used. This is not limited.

According to the inter prediction method provided in this embodiment of this application, the bitstream is parsed to obtain the motion information of the to-be-processed picture block; motion compensation is performed on the to-be-processed picture block based on the motion information, to obtain the prediction block of the to-be-processed picture block; and weighting calculation is performed on the reconstructed value(s) of the reference sample(s) and the prediction value of the target sample, to update the prediction value of the target sample, where the reference sample has the preset spatial position relationship with the target sample. In this embodiment of this application, after the prediction value of the target sample in the to-be-processed picture block is obtained, filtering processing is performed on the prediction value of the target sample by using a neighboring reconstructed sample. In this way, coding compression efficiency can be improved, and a PSNR BDrate decreases by 0.5%. In comparison with the conventional technology, spatial filtering performed on an inter prediction sample in a process of generating the inter prediction sample improves coding efficiency.

An embodiment of this application provides an inter prediction apparatus. The apparatus may be a video decoder. In an embodiment, the inter prediction apparatus is configured to perform steps performed by the decoding apparatus in the foregoing inter prediction method. The inter prediction apparatus provided in this embodiment of this application may include modules corresponding to the corresponding steps.

In this embodiment of this application, the inter prediction apparatus may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. In this embodiment of this application, division into the modules is an example, is merely logical function division, and may be other division in an actual implementation.

Figure 18:
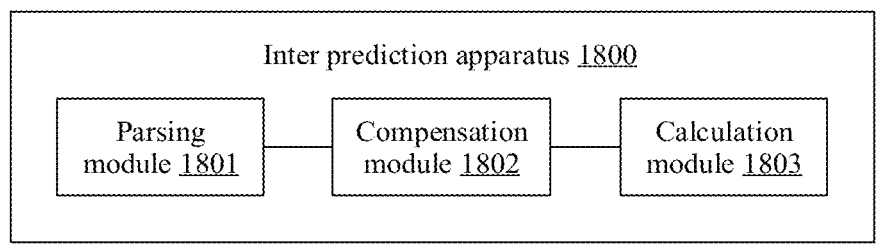
FIG. 18 is a schematic block diagram of an inter prediction apparatus according to an embodiment.

When the functional modules are obtained through division based on the corresponding functions, FIG. 18 is a possible schematic structural diagram of an inter prediction apparatus 1800 in the foregoing embodiment. As shown in FIG. 18, the inter prediction apparatus 1800 may include a parsing module 1801, a compensation module 1802, and a calculation module 1803. In an embodiment, functions of the modules are as follows:

The parsing module 1801 is configured to parse a bitstream to obtain motion information of a to-be-processed picture block.

The compensation module 1802 is configured to perform motion compensation on the to-be-processed picture block based on the motion information, to obtain a prediction block of the to-be-processed picture block, where the prediction block of the to-be-processed picture block comprises a prediction value of a target sample.

The calculation module 1803 is configured to perform weighting calculation on one or more reconstructed values of one or more reference samples and the prediction value of the target sample, to update the prediction value of the target sample, where the reference sample has a preset spatial position relationship with the target sample.

In an embodiment, the reference sample(s) include a reconstructed sample that has a same horizontal coordinate as the target sample and has a preset vertical coordinate difference to the target sample, or a reconstructed sample that has a same vertical coordinate as the target sample and has a preset horizontal coordinate difference to the target sample.

In an embodiment, the calculation module 1803 updates the prediction value of the target sample according to the following formula:

$$predQ(xP, yP) = \begin{cases} \dfrac{w1*predP(xP, yP) + w2*recon(xN-M1, yP) + ((w1+w2)/2)}{w1+w2}, xN>0, \text{ and } yN=0 \\ \dfrac{w3*predP(xP, yP) + w4*recon(xP, yN-M2) + ((w3+w4)/2)}{w3+w4}, xN=0, \text{ and } yN>0 \\ \dfrac{w5*predP(xP, yP) + w6*recon(xN-M1, yP) + w7*recon(xP, yN-M2) + ((w5+w6+w7)/2)}{w5+w6+w7} \\ xN>0, \text{ and } yN>0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents an updated prediction value of the target sample, recon(xN–M1,yP) and recon(xP,yN–M2) represent reconstructed values of the reference samples at coordinate positions (xN–M1,yP) and (xP,yN–M2), respectively, w1, w2, w3, w4, w5, and w6 are preset constants, and M1 and M2 are preset positive integers.

In an embodiment, w1+w2=R, w3+w4=R, or w5+w6+w7=R, where R is 2 raised to the power of n, and n is a non-negative integer.

In an embodiment, the calculation module 1803 updates the prediction value of the target sample according to the following formula:

$$predQ(xP, yP) = \begin{cases} \dfrac{w1*predP(xP, yP) + w2*recon(xN-M1, yP) + w3*recon(xN-M2, yP) + ((w1+w2+w3)/2)}{w1+w2+w3}, xN>0, \text{ and } yN=0 \\ \dfrac{w4*predP(xP, yP) + w5*recon(xP, yN-M3) + w6*recon(xP, yN-M4) + ((w4+w5+w6)/2)}{w4+w5+w6}, xN=0, \text{ and } yN>0 \\ \dfrac{w7*predP(xP, yP) + w8*recon(xN-M1, yP) + w9*recon(xN-M2, yP) + w10*recon(xP, yN-M3) + w11*recon(xP, yN-M4) + ((w7+w8+w9+w10+w11)/2)}{w7+w8+w9+w10+w11} \\ xN>0, \text{ and } yN>0 \end{cases}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents an updated prediction value of the target sample, recon(xN–M1,yP), recon(xN–M2,yP), recon(xP,yN–M3), and recon(xP,yN–M4) represent reconstructed values of the reference samples at coordinate positions (xN–M1,yP), (xN–M2,yP), (xP,yN–M3), and (xP,yN–M4), respectively, w1, w2, w3, w4, w5, w6, w7, w8, w9, w10, and w11 are preset constants, and M1, M2, M3, and M4 are preset positive integers.

In an embodiment, w1+w2+w3=S, w4+w5+w6=S, or w7+w8+w9+w10+w11=S, where S is 2 raised to the power of n, and n is a non-negative integer.

In an embodiment, the calculation module 1803 updates the prediction value of the target sample according to the following formula:

$$predQ(xP, yP) = \dfrac{w1*predP(xP, yP) + w2*recon(xN-M1, yP) + w3*recon(xP, yN-M2)}{w1+w2+w3}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents an updated prediction value of the target sample, recon(xN–M1,yP) and recon(xP,yN–M2) represent reconstructed values of the reference samples at coordinate positions (xN–M1,yP) and (xP,yN–M2), respectively, w1, w2, and w3 are preset constants, and M1 and M2 are preset positive integers.

In an embodiment, w1+w2+w3=R, where R is 2 raised to the power of n, and n is a non-negative integer.

In an embodiment, the calculation module 1803 updates the prediction value of the target sample according to the following formula:

$$predQ(xP, yP) = \dfrac{w1*predP(xP, yP) + w2*recon(xN-M1, yP) + w3*recon(xN-M2, yP) + w4*recon(xP, yN-M3) + w5*recon(xP, yN-M4)}{w1+w2+w3+w4+w5}$$

where coordinates of the target sample are (xP,yP), coordinates of a top-left sample of the to-be-processed picture block are (xN,yN), predP(xP,yP) represents the prediction value of the target sample before the updating, predQ(xP,yP) represents an updated prediction value of the target sample, recon(xN−M1,yP), recon(xN−M2,yP), recon(xP,yN−M3), and recon(xP,yN−M4) represent reconstructed values of the reference samples at coordinate positions (xN−M1,yP), (xN−M2,yP), (xP,yN−M3), and (xP,yN−M4), respectively, w1, w2, w3, w4, and w5 are preset constants, and M1, M2, M3, and M4 are preset positive integers.

In an embodiment, w1+w2+w3+w4+w5=S, where S is 2 raised to the power of n, and n is a non-negative integer.

In an embodiment, the reference sample(s) include one or more of the following samples: a reconstructed sample that has a same horizontal coordinate as the target sample and that is adjacent to a top side of the to-be-processed picture block, a reconstructed sample that has a same vertical coordinate as the target sample and that is adjacent to a left side of the to-be-processed picture block, a top-right reconstructed sample of the to-be-processed picture block, a bottom-left reconstructed sample of the to-be-processed picture block, or a top-left reconstructed sample of the to-be-processed picture block.

In an embodiment, the calculation module 1803 updates the prediction value of the target sample according to the following formula:

$$predQ(xP,yP)=(w1*predP(xP,yP)+w2*predP1(xP,yP)+((w1+w2)/2))/(w1+w2)$$

where $predP1(xP,yP)=(predV(xP,yP)+predH(xP,yP)+nTbW*nTbH)>>(Log\ 2(nTbW)+Log\ 2(nTbH)+1)$, $predV(xP,yP)=((nTbH-1-yP)*p(xP,\ -1)+(yP+1)*p(-1,\ nTbH))>>Log\ 2(nTbW)$, $predH(xP,yP)=((nTbW-1-xP)*p(-1,yP)+(xP+1)*p(nTbW,\ -1))<<Log\ 2(nTbH)$, coordinates of the target sample are (xP,yP), coordinates of a top-left sample of the to-be-processed picture block are (0, 0), predP(xP,yP) represents the prediction value of the target sample before the updating, predQ(xP,yP) represents an updated prediction value of the target sample, $p(xP,\ -1)$, $p(-1,\ nTbH)$, $p(-1,\ yP)$, and $p(nTbW,\ -1)$ represent reconstructed values of the reference samples at coordinate positions $(xP,\ -1)$, $(-1,\ nTbH)$, $(-1,\ yP)$, and $(nTbW,\ -1)$, respectively, w1 and w2 are preset constants, and nTbW and nTbH represent a width and a height of the to-be-processed picture block.

In an embodiment, the prediction value of the target sample is updated according to the following formula:

$$predQ(xP,yP)=(w1*predP(xP,yP)+w2*predV(xP,yP)+w3*predH(xP,yP)+((w1+w2+w3)/2))/(w1+w2+w3)$$

where $predV(xP,yP)=((nTbH-1-yP)*p(xP,\ -1)+(yP+1)*p(-1,\ nTbH)+nTbH/2)>>Log\ 2(nTbH)$, $predH(xP,yP)=((nTbW-1-xP)*p(-1,\ yP)+(xP+1)*p(nTbW,\ -1)+nTbW/2)>>Log\ 2(nTbW)$, coordinates of the target sample are (xP, yP), coordinates of a top-left sample of the to-be-processed picture block are (0, 0), predP(xP,yP) represents the prediction value of the target sample before the updating, predQ(xP,yP) represents an updated prediction value of the target sample, $p(xP,\ -1)$, $p(-1,\ nTbH)$, $p(-,\ yP)$, and $p(nTbW,\ -1)$ represent reconstructed values of the reference samples at coordinate positions $(xP,\ -1)$, $(-1,\ nTbH)$, $(-1,\ yP)$, and $(nTbW,\ -1)$, respectively, w1 and w2 are preset constants, and nTbW and nTbH represent a width and a height of the to-be-processed picture block.

In an embodiment, the prediction value of the target sample is updated according to the following formula:

$$predQ(xP,yP)=(((w1*predP(xP,yP))<<(Log\ 2(nTbW)+Log\ 2(nTbH)+1))+w2*predV(xP,yP)+w3*predH(xP,yP)+(((w1+w2+w3)/2)<<(Log\ 2(nTbW)+Log\ 2(nTbH)+1)))/(((w1+w2+w3)<<(Log\ 2(nTbW)+Log\ 2(nTbH)+1)))$$

where $predV(xP,yP)=((nTbH-1-yP)*p(xP,\ -1)+(yP+1)*p(-1,\ nTbH))<<Log\ 2(nTbW)$, $predH(xP,yP)=((nTbW-1-xP)*p(-1,\ yP)+(xP+1)*p(nTbW,\ -1))\ Log\ 2(nTbH)$, coordinates of the target sample are (xP,yP), coordinates of a top-left sample of the to-be-processed picture block are (0, 0), predP(xP,yP) represents the prediction value of the target sample before the updating, predQ(xP,yP) represents an updated prediction value of the target sample, $p(xP,\ -1)$, $p(-1,\ nTbH)$, $p(-1,\ yP)$, and $p(nTbW,\ -1)$ represent reconstructed values of the reference samples at coordinate positions $(xP,\ -1)$, $(-1,\ nTbH)$, $(-1,\ yP)$, and $(nTbW,\ -1)$, respectively, w1 and w2 are preset constants, and nTbW and nTbH represent a width and a height of the to-be-processed picture block.

In an embodiment, the calculation module 1803 updates the prediction value of the target sample according to the following formula:

$$predQ(xP,yP)=(w1*predP(xP,yP)+w2*predP1(xP,yP)+((w1+w2)/2))/(w1+w2)$$

where $predP1(xP,yP)=(predV(xP,yP)+predH(xP,yP)+1)>>1$, $predV(xP,yP)=((nTbH-1-(yP-yN))*recon(xP,yN-1))+(yP-yN+1)*recon(xN-1,yN+nTbH)+(nTbH>>1))>>Log\ 2(nTbH)$, $predH(xP,yP)=((nTbW-1-(xP-xN))*recon(xN-1,yP)+(xP-xN+1)*recon(xN+nTbW,yN-1)+(nTbW>>1))>>Log\ 2(nTbW)$, coordinates of the target sample are (xP,yP), coordinates of a top-left sample of the to-be-processed picture block are (xN,yN), predP(xP,yP) represents the prediction value of the target sample before the updating, predQ(xP,yP) represents an updated prediction value of the target sample, recon(xP,yN−1), recon(xN−1, yN+nTbH), recon(xN−1,yP), and recon(xN+nTbW,yN−1) represent reconstructed values of the reference samples at coordinate positions (xP,yN−1), (xN−1,yN+nTbH), (xN−1, yP), and (xN+nTbW,yN−1), respectively, w1 and w2 are preset constants, and nTbW and nTbH represent a width and a height of the to-be-processed picture block.

In an embodiment, a sum of w1 and w2 is 2 raised to the power of n, and n is a non-negative integer.

In an embodiment, the calculation module 1803 updates the prediction value of the target sample according to the following formula:

$$predQ(xP,\ yP) = clip1Cmp$$
$$\left(\left(\begin{array}{c}refL(xP,\ yP)*wL(xP)+refT(xP,\ yP)*\\wT(yP)-p(xN-1,\ yN-1)*wTL(xP,\ yP)+\\(64-wL(xP)-wT(yP)+wTL(xP,\ yP))*predP(xP,\ yP)+32\end{array}\right)>>6\right)$$

where $refL(xP,yP)=recon(xN-1,yP)$, $refT(xP,yP)=recon(xP,yN-1)$, $wT(yP)=32>>((yP<<1)>>nScale)$, $wL(xP)=32>>(xP<<1)>>nScale)$, $wTL(xP,yP)=((wL(xP)>>4)+(wT(yP)>>4))$, $nScale=((Log\ 2(nTbW)+log\ 2(nTbH)-2)>>2)$, coordinates of the target sample are (xP,yP), coordinates of a top-left sample of the to-be-processed picture block are (xN,yN), represents the prediction value of the target sample before the updating. predP(xP,yP) represents an updated prediction value of the target sample before the updating, predQ(xP,yP) represents an updated prediction value of the target sample, recon(xP,yN−1), recon(xN−1,yP), and recon (xN−1,yN−1) represent reconstructed values of the reference samples at coordinate positions (xP,yN−1), (xN−1,yP), and (xN−1,yN−1), respectively, nTbW and nTbH represent a width and a height of the to-be-processed picture block, and clip1Cmp represents a clipping operation.

In an embodiment, the calculation module 1803 updates the prediction value of the target sample according to the following formula:

$$predQ(xP, yP) = clip1Cmp\left(\left(\begin{array}{c} refL(xP, yP)*wL(xP) + refT(xP, yP)*wT(yP) + \\ (64 - wL(xP) - wT(yP))*predP(xP, yP) + 32 \end{array}\right) >> 6\right)$$

where refL(xP,yP)=recon(xN−1,yP), refT(xP,yP)=recon(xP,yN−1),wT(yP)=32>>(yP<<1)>>nScale), wL(xP)=32>>((xP<<1)>>nScale), nScale=((Log 2(nTbW)+Log 2(nTbH)−2)>>2), coordinates of the target sample are (xP, yP), coordinates of a top-left sample of the to-be-processed picture block are (xN,yN), predP(xP,yP) represents the prediction value of the target sample before the updating, predQ(xP,yP) represents the updated prediction value of the target sample, recon(xN−1,yP) and recon(xP,yN−1) represent reconstructed values of the reference samples at coordinate positions (xN−1,yP) and (xP,yN−1), respectively, nTbW and nTbH represent a width and a height of the to-be-processed picture block, and clip1Cmp represents a clipping operation.

In an embodiment, the calculation module 1803 is further configured to: when the reconstructed value of the reference sample is unavailable, determine, in a preset order, availability of samples adjacent to the top side and the left side of the to-be-processed picture block until a preset quantity of available reference samples are obtained; and perform weighting calculation on a reconstructed value of the available reference sample and the prediction value of the target sample.

In an embodiment, the calculation module 1803 is further configured to: when the reference sample is located above the to-be-processed picture block, perform weighting calculation on the reconstructed value of the reference sample and reconstructed values of a left neighboring sample and a right neighboring sample of the reference sample; when the reference sample is located on the left of the to-be-processed picture block, perform weighting calculation on the reconstructed value of the reference sample and reconstructed values of a top neighboring sample and a bottom neighboring sample of the reference sample; and update the reconstructed value of the reference sample by using a result of the weighting calculation.

In an embodiment, the calculation module 1803 is further configured to initially update the motion information by using a first preset algorithm. Correspondingly, the compensation module 1802 is configured to perform motion compensation on the to-be-processed picture block based on initially updated motion information.

In an embodiment, the calculation module 1803 is further configured to pre-update the prediction block by using a second preset algorithm. Correspondingly, the calculation module 1803 is specifically configured to perform weighting calculation on the reconstructed value(s) of the reference sample(s) and a pre-updated prediction value of the target sample.

In an embodiment, the calculation module 1803 is further configured to update the prediction value of the target sample by using a second preset algorithm.

In an embodiment, the parsing module 1801 is further configured to: parse the bitstream to obtain a prediction mode corresponding to the to-be-processed picture block; and determine that the prediction mode is a merge mode and/or an inter advanced motion vector prediction (inter AMVP) mode.

In an embodiment, the parsing module 1801 is further configured to: parse the bitstream to obtain update determining indication information of the to-be-processed picture block; and determine that the update determining indication information is used to indicate to update the prediction block of the to-be-processed picture block.

In an embodiment, the calculation module 1803 is further configured to: obtain preset update determining indication information of the to-be-processed picture block; and determine that the update determining indication information is used to indicate to update the prediction block of the to-be-processed picture block.

Figure 19:
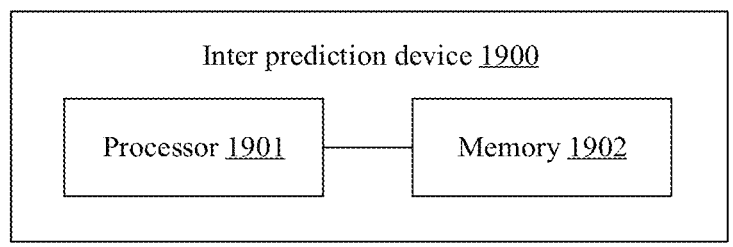
FIG. 19 is a schematic block diagram of another inter prediction apparatus according to an embodiment.

FIG. 19 is a schematic structural block diagram of an inter prediction device 1900 according to an embodiment. In an embodiment, the apparatus includes a processor 1901 and a memory 1902 that is coupled to the processor. The processor 1901 is configured to perform the inter prediction method shown in FIG. 13.

The processor 1901 may be a central processing unit (CPU), a general-purpose processor, a digital signal processor (DSP), an ASIC, an FPGA or another programmable logic device, a transistor logic device, a hardware component, or any combination thereof. The processor 1901 may implement or execute various example logical blocks, modules, and circuits described with reference to content disclosed in this application. The processor may alternatively be a combination of processors implementing a computing function, for example, a combination of one or more microprocessors or a combination of a DSP and a microprocessor.

All related content of each scenario in the foregoing method embodiment may be cited in function descriptions of corresponding functional modules. Details are not described herein again.

Although specific aspects of this application have been described with reference to the video encoder 100 and the video decoder 200, it should be understood that the technologies of this application may be used by many other video encoding and/or decoding units, processors, processing units, and hardware-based encoding units and the like, for example, encoders/decoders (CODEC). In addition, it should be understood that the steps shown and described in FIG. 13 are merely provided as examples. In other words, the steps shown in the example in FIG. 13 are not necessarily performed in the order shown in FIG. 13, and fewer, additional, or alternative steps may be performed.

Further, it should be understood that depending on the embodiments, specific actions or events in any of the methods described in this specification may be performed in different sequences, an action or event may be added, or the actions or events may be combined, or omitted (for example, not all of the described actions or events are necessary for implementing the method). Further, in an embodiment, the actions or events may, for example, undergo multi-threading processing or interrupt processing, or may be processed by a plurality of processors simultaneously instead of sequentially. Further, although specific aspects of this application are described as being performed by a single module or unit for the purpose of clarity, it should be understood that the technologies of this application may be performed by a combination of units or modules associated with the video decoder.

In some embodiments, the described functions may be implemented by using hardware, software, firmware, or any combination thereof. If the functions are implemented by using software, the functions may be stored in a computer-readable medium as one or more instructions or code or be transmitted through a computer-readable medium, and be performed by a hardware-based processing unit. The computer-readable medium may include a computer-readable storage medium or a communications medium. The computer-readable storage medium corresponds to a tangible medium such as a data storage medium. The communications medium includes any medium that facilitates transmission of a computer program, for example, from one location to another location according to a communications protocol.

In this manner, the computer-readable medium may correspond to, for example, (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of an embodiment rather than a limitation, the computer-readable storage medium may include a RAM, a ROM, an EEPROM, a CD-ROM or another optical disk storage apparatus, a magnetic disk storage apparatus or another magnetic storage apparatus, a flash memory, or any other medium that can be used to store required code in a form of an instruction or a data structure and that can be accessed by a computer. Likewise, any connection may be appropriately referred to as a computer-readable medium. For example, if an instruction is transmitted from a website, server, or another remote source through a coaxial cable, a fiber optic cable, a twisted pair, a digital subscriber line (DSL), or wireless technologies such as infrared, radio, and microwave, the coaxial cable, fiber optic cable, twisted pair, DSL, or wireless technologies such as infrared, radio, and microwave are included in a definition of the medium.

However, it should be understood that the computer-readable storage medium and the data storage medium may not include a connection, a carrier, a signal, or another transitory medium, but alternatively mean non-transitory tangible storage media. A magnetic disk and an optical disc used in this specification include a compact disc (CD), a laser disc, an optical disc, a digital versatile disc (DVD), a floppy disk, and a Blu-ray disc. The magnetic disk usually reproduces data magnetically, and the optical disc reproduces data optically through a laser. A combination of the foregoing magnetic disk and optical disc shall also be included in a scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or another structure that is used to implement the technologies described in this specification. In addition, in some aspects, the functions described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless mobile phone, an integrated circuit (IC), or a set of ICs (for example, a chip set). Various components, modules, or units are described in this application to emphasize functional aspects of an apparatus configured to perform the disclosed technologies, but are not necessarily implemented by different hardware units. More precisely, as described above, various units may be combined into a codec hardware unit or provided by interoperable hardware units (including one or more processors described above) in combination with an appropriate software and/or firmware set.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of inter prediction in video coding, the method comprising:
    parsing a bitstream to obtain motion information of a to-be-processed picture block;
    performing motion compensation on the to-be-processed picture block based on the obtained motion information, to obtain a prediction block of the to-be-processed picture block, wherein the prediction block of the to-be-processed picture block comprises a prediction value of a target sample; and
    performing weighting calculation on one or more reconstructed values of one or more reference samples and the prediction value of the target sample, to update the prediction value of the target sample, wherein the one or more reference samples have a preset spatial position relationship with the target sample.

2. The method according to claim 1,
    further comprising: before performing the motion compensation on the to-be-processed picture block, initially updating the obtained motion information by using a first preset algorithm; and
    wherein performing the motion compensation on the to-be-processed picture block comprises: performing motion compensation on the to-be-processed picture block based on the initially updated motion information.

3. The method according to claim 1,
    further comprising: after the prediction block of the to-be-processed picture block is obtained, pre-updating the prediction block by using a second preset algorithm to obtain a pre-updated prediction value of the target sample; and
    wherein performing the weighting calculation on the one or more reconstructed values of the one or more reference samples and the prediction value of the target sample comprises: performing weighting calculation on the one or more reconstructed values of the one or more reference samples and the pre-updated prediction value of the target sample.

4. The method according to claim 1, further comprising: after performing the weighting calculation on the one or more reconstructed values of the one or more reference samples and the prediction value of the target sample, updating the prediction value of the target sample by using a second preset algorithm.

5. The method according to claim 1, further comprising: before performing the weighting calculation on the one or more reconstructed values of the one or more reference samples and the prediction value of the target sample, parsing the bitstream to obtain update determining indication information of the to-be-processed picture block; and determining that the update determining indication information indicating to update the prediction block of the to-be-processed picture block.

6. An apparatus for inter prediction in video coding, the apparatus comprising:
- one or more processors; and
- a memory coupled to the one or more processors to store instructions, which when executed by the one or more processors, cause the one or more processors to:
- parse a bitstream to obtain motion information of a to-be-processed picture block;
- perform motion compensation on the to-be-processed picture block based on the obtained motion information, to obtain a prediction block of the to-be-processed picture block, wherein the prediction block of the to-be-processed picture block comprises a prediction value of a target sample; and
- perform weighting calculation on one or more reconstructed values of one or more reference samples and the prediction value of the target sample, to update the prediction value of the target sample, wherein the one or more reference samples have a preset spatial position relationship with the target sample.

7. The apparatus according to claim 6, wherein the one or more reference samples comprise:
- a reconstructed sample that has a same horizontal coordinate as the target sample and has a preset vertical coordinate different from the target sample, or
- a reconstructed sample that has a same vertical coordinate as the target sample and has a preset horizontal coordinate different from the target sample, or
- a reconstructed sample that has a same horizontal coordinate as the target sample and that is adjacent to a top side of the to-be-processed picture block, or
- a reconstructed sample that has a same vertical coordinate as the target sample and that is adjacent to a left side of the to-be-processed picture block, or
- a top-right reconstructed sample of the to-be-processed picture block, a bottom-left reconstructed sample of the to-be-processed picture block, or a top-left reconstructed sample of the to-be-processed picture block.

8. The apparatus according to claim 6, wherein the one or more processors is further configured to:
- parse the bitstream to obtain update determining indication information of the to-be-processed picture block; and
- determine that the update determining indication information indicating to update the prediction block of the to-be-processed picture block.

9. The apparatus according to claim 6, wherein a weighted coefficient of the one or more reconstructed values of the one or more reference samples is different from a weighted coefficient of the prediction value of the target sample.

10. The apparatus according to claim 6, wherein the one or more reconstructed values of the one or more reference samples are obtained based on a spatial neighboring sample by using a planar intra prediction mode.

11. The apparatus according to claim 9, wherein the updated prediction value is obtained based on $w1*predP(xP, yP)$ and $w2*predP1(xP, yP)$, wherein
- (xP, yP) represents coordinates of the target sample, predP(xP, yP) represents the prediction value of the target sample, predP1(xP, yP) represents the one or more reconstructed values of the one or more reference samples, w1 represents the weighted coefficient of the one or more reconstructed values of the one or more reference samples, w2 represents the weighted coefficient of the prediction value of the target sample, w1 and w2 are preset constants, and w1 is unequal to w2.

12. The apparatus according to claim 11, wherein a weighted coefficient set (w1, w2) is (6, 2) or (5, 3).

13. The apparatus according to claim 11, wherein a sum of w1 and w2 is 2 raised to the power of n, and n is 2 or 3.

14. A non-transitory computer-readable storage medium having instructions stored therein, which when executed by one or more processors, cause the one or more processors to perform operations, the operations comprising:
- parsing a bitstream to obtain motion information of a to-be-processed picture block;
- performing motion compensation on the to-be-processed picture block based on the obtained motion information, to obtain a prediction block of the to-be-processed picture block, wherein the prediction block of the to-be-processed picture block comprises a prediction value of a target sample; and
- performing weighting calculation on one or more reconstructed values of one or more reference samples and the prediction value of the target sample, to update the prediction value of the target sample, wherein the one or more reference samples have a preset spatial position relationship with the target sample.

* * * * *

UNITED STATES PATENT AND TRADEMARK OFFICE
CERTIFICATE OF CORRECTION

PATENT NO. : 11,647,207 B2
APPLICATION NO. : 17/249189
DATED : May 9, 2023
INVENTOR(S) : Weiwei Xu, Haitao Yang and Yin Zhao Page 1 of 1

It is certified that error appears in the above-identified patent and that said Letters Patent is hereby corrected as shown below:

On the Title Page

In the Foreign Application Priority Data section, delete "Oct. 1, 2018 (WO) ............... PCT/CN2018/109233" and insert --Oct. 1, 2018 (CN) ............... PCT/CN2018/109233--.

Signed and Sealed this
Ninth Day of July, 2024

Katherine Kelly Vidal
*Director of the United States Patent and Trademark Office*